United States Patent
Yamada

(10) Patent No.: US 6,969,118 B2
(45) Date of Patent: Nov. 29, 2005

(54) HEADREST SUPPORT STRUCTURE

(75) Inventor: Nobuo Yamada, Kariya (JP)

(73) Assignee: Nihon Technica Co., Ltd., Kariya (JP)

( * ) Notice: Subject to any disclaimer, the term of this patent is extended or adjusted under 35 U.S.C. 154(b) by 126 days.

(21) Appl. No.: 10/682,922

(22) Filed: Oct. 14, 2003

(65) Prior Publication Data

US 2005/0077772 A1    Apr. 14, 2005

(51) Int. Cl.[7] .................................. B60N 2/48

(52) U.S. Cl. ...................................... 297/410

(58) Field of Search .................... 297/391, 410

(56) References Cited

U.S. PATENT DOCUMENTS

| | | | | |
|---|---|---|---|---|
| 4,695,095 A | * | 9/1987 | Faust et al. ................ | 297/410 |
| 4,844,545 A | * | 7/1989 | Ishii ........................... | 297/410 |
| 4,854,642 A | * | 8/1989 | Vidwans et al. ............ | 297/410 |
| 5,860,703 A | * | 1/1999 | Courtois et al. ............ | 297/410 |
| 5,895,094 A | * | 4/1999 | Mori et al. .................. | 297/410 |
| 6,062,645 A | * | 5/2000 | Russell ....................... | 297/410 |
| 6,655,742 B1 | * | 12/2003 | Ozaki ......................... | 297/410 |
| 6,742,846 B1 | * | 6/2004 | Isaacson ..................... | 297/410 |
| 2003/0222492 A1 | * | 12/2003 | Nemoto et al. ............. | 297/410 |

FOREIGN PATENT DOCUMENTS

| JP | 2000-279260 | 10/2000 |
|---|---|---|
| JP | 2002-355138 | 12/2002 |

* cited by examiner

*Primary Examiner*—Peter R. Brown
(74) *Attorney, Agent, or Firm*—Westerman, Hattori, Daniels & Adrian, LLP

(57) ABSTRACT

There is provided a headrest support structure for attaching a headrest to a car seat. It comprises a headrest 20; a headrest stay 21; a height regulating engagement portion 21b; a first slip-off preventing engagement portion 21c; a tubular member 12 for engaging the headrest stay. The tubular member is vertically provided in the car seat. The headrest support structure also has a first locking member operating unit 32 provided on the upper end of the tubular member; and a first elastic member 32c for forcing the first locking member toward the headrest stay, for engaging the height regulating engagement portion or the first slip-off preventing engagement portion. By an pushing operation from the outside, the first locking member is moved back to release the height regulating engagement portion or the first slip-off preventing engagement portion. The headrest support structure also has a second locking member operating unit, comprising a second slip-off preventing engagement portion 21c, a second locking member 32d, 320d, 322d 322d-1; a second elastic member 322f, 332f, 32f. The second locking member operating unit also comprises an engagement releasing mechanism for releasing the second locking member from the second slip-off preventing engagement portion.

8 Claims, 48 Drawing Sheets

Fig. 45

(1) Variations of the height regulating engagement portion 21b, and the headrest stays 30-1, 30-2 provided with the first slip-off preventing engagement portion 21a and the second slip-off preventing engagement portion 21c.

| A | The height regulating engagement portion 21b and the first and the second slip-off preventing engagement portions 21a, 21c are provided on a headrest stay. |
|---|---|
| B | The height regulating engagement portion 21b and the first slip-off preventing engagement portion 21a are provided on a headrest stay 30-1. The second slip-off preventing engagement portion 21c is provided on the other headrest stay 30-2. |

(2) Variations as to whether or not the first elastic member 6 is presented, and locations of the headrest support 30 and the second locking member 322d-1.

|   |   | First elastic member 6 | Second locking member 322d-1 |
|---|---|---|---|
| A | 1 | With | Above |
|   | 2 | Without | Above |
| B | 1 | With | Below |
|   | 2 | Without | Below |

(3) Variations of the height regulating engagement portion 21b, and the headrest stay 21 provided with the first slip-off preventing engagement portion 21a and the second slip-off preventing engagement portion 21c

|   |   | Height regulating engagement portion 21b (cut-off for the height adjustment (slip-off stopper)) | First slip-off preventing engagement portion 21a and Second slip-off preventing engagement portion 21c (FMVSS) |
|---|---|---|---|
| A | 1 | With | With |
| B | 2 | Without | With |

HEADREST SUPPORT STRUCTURE

BACKGROUND OF THE INVENTION

1. Field of the Invention

This invention relates to a headrest support structure, and more particularly to a headrest support structure suitably applied to a headrest supported on an upper end of a seat back.

2. Description of the Related Art

Conventionally, a headrest support structure has headrest stays projecting downward from the headrest, which a inserted into headrest supports fitted in tubular members (square pipes) buried in an upper side portion of a seat back. The headrest support structure is adapted to support the headrest stays while regulating the height of the headrest by height regulating mechanisms in the tubular members. Each of the height regulating mechanisms is formed by providing height regulating engagement portions by forming recesses in a side surface of the relative headrest stay, and providing at an upper end of the relative tubular member with a height regulating locking member retractable with respect to the height regulating engagement portions. Each of the height regulating portions is a recess provided at an upper part thereof with a flat surface perpendicular to the axis of the headrest stay, and at the part of the recess on the lower side of the same flat surface with an inclined surface extending toward an outer circumference of the headrest stay.

The height regulating locking member is given a force in a normal condition toward the headrest stay owing to a resilient member, and can be moved back from the headrest stay by pressing an operating button provided on the tubular member and thereby exerting a rearward force on the height regulating locking member. When the headrest stay in this structure is inserted downward into the relative headrest support, the height regulating locking member is engaged with any one of the plural height regulating engagement portions, and the headrest stay is thereby supported. When the operating button is pressed to disengage the height regulating locking member from the height regulating engagement portion, the user can regulate the height of the headrest to an arbitrary level.

In the headrest stay, an engagement portion formed in a reversely directed state with respect to the other engagement portions is provided below the engagement portion in the lowermost position, by which a slip-off of the headrest can be prevented. This reversely directed engagement portion is a recess provided at a lower part thereof with a flat surface perpendicular to the axis of the relative headrest stay, and at the part of the recess on the upper side of the flat surface with an inclined surface extending toward an outer circumference of the headrest stay. Therefore, when the headrest stay is pulled out upward with the headrest stay inserted in the headrest support, the height regulating locking member engages the flat surface of this engagement portion, and a slip-off of the headrest stay can be prevented.

The above-described conventional headrest support structure has the following problems. That are, the height regulating locking member is given a force in a normal condition toward the headrest stay, so that the headrest stay can be prevented from slipping off. However, this locking member is formed such that the locking member can be moved forward and rearward when the operating button is pressed. Accordingly, when a user presses this operating button, the headrest stay can be pulled out easily from the tubular member. So, the withdrawing of the headrest is attended with danger, and it is inconvenient that the headrest stay is left behind or lost.

SUMMARY OF THE INVENTION

The invention is made with the intention of providing a headrest support structure capable of solving these problems, preventing the headrest stays from slipping off from the support members, and withdrawing the headrest stays from the support members as occasion demands.

To achieve this object, an invention (1) provides a headrest support structure including:

headrest stays projecting from a headrest, each of which has a plurality of height regulating engagement portions in an outer circumference thereof so that the engagement portions are arranged in the axial direction, and a first slip-off preventing engagement portion below the height regulating engagement portions, tubular members provided in a frame of a seat, and adapted to receive the headrest stays, which are inserted therein, and support the same, first locking member operating units each of which is provided on an upper portion of the relative tubular member and adapted to give a force to the relative first locking member, which engages with one of the relative height regulating engagement portions and a first slip-off preventing engagement portion, toward the relative headrest stay by a first resilient member and exerts a reverse force to the first locking member by a first locking member pressing operation carried out outside, the first locking member being thereby rendered capable of being moved forward and rearward in the direction of a line of action of a force, second slip-off preventing engagement portions each of which is provided in the headrest stay and/or tubular member, second locking members each of which engages with the second slip-off preventing engagement portion, and adapted to restore the shape thereof by being given a force from one side toward the other by a second resilient member or by a self-resetting action, and engagement releasing mechanisms each of which is adapted to release the engaged condition of the second locking member and second slip-off engagement portion by exerting a reverse force on the second locking member.

According to the invention (1) formed as described above, the headrest is supported on the headrest stays, which are inserted and supported in the tubular members buried in the support members. Each of the headrest stays is selectively engaged at the first locking member with one of the plural height regulating engagement portions, and the height of the headrest can thereby be regulated to a desired level. The first locking member is given a force toward the headrest stay. Therefore, when one of the height regulating engagement portions reaches the position of the first locking member while the quantity of insertion of the headrest stay is regulated, the first locking member and the height regulating engagement portion are engaged automatically with each other, so that the headrest stay is locked. Furthermore, a reverse force can be exerted on the first locking member by the first locking member operating unit. This enables the engaged condition mentioned above to be released by pressing the first locking member operating unit, and the height of the headrest stay to be regulated again.

In the headrest stay, the first slip-off preventing engagement portion is provided on the lower side of the height regulating engagement portions, and the first locking member are urged toward the headrest stay. Therefore, when the first slip-off engagement portion reaches the position of the first locking member while the quantity of insertion of the headrest stay is regulated, the first slip-off engagement portion and first locking member are automatically engaged with each other. Therefore, even when the user merely raises the headrest stay with the intention of pulling out the headrest stay from the tubular member, the slip-off thereof can be prevented by the engagement of the first slip-off engagement portion with the first locking member. However, this engagement can be released easily when the first locking member operating unit is pressed. This invention is formed for the purpose to prevent the headrest stay from being easily pulled out, i.e., the invention is formed such that the headrest stay cannot be pulled out even when the first locking member operating unit is operated.

For the same purpose, the second slip-off preventing engagement portion and second locking member are provided. The second engagement portion are provided in either the headrest stay or tubular member, or in a combination thereof, and give a force from one to the other. Therefore, when the second slip-off preventing engagement portion reaches the position of the second locking member while the quantity of insertion of the headrest stay is regulated, the engagement portion and locking member are automatically engaged with each other. In consequence, the slip-off of the headrest stay is prevented. Moreover, since the engaged condition of the second locking member and second slip-off preventing engagement portion can be released by exerting a reverse force on the second engagement portion by engagement releasing mechanism, the slip-off of the headrest stay is not completely inhibited but the mere pressing of the first locking member operating unit does not cause the headrest stay to slip off. Accordingly, the headrest stay can be pulled out as occasion demands while preventing the headrest stay from being slipped off easily.

The headrest support structure according to the present invention can be applied to various types of headrests. The headrest support structure can be applied to, for example, a headrest using a seat back in a vehicle as a support member, and armrests of a legless chair utilized indoors. The headrest stays have only to have a structure in which the headrest stays supported in tubular members can support a headrest, and in which the headrest stays have such outer circumferential surfaces that permit the headrest stays to be inserted into the tubular members. Accordingly, it is preferable that, for example, both the tubular members and headrest stays be made cylindrical. However, the shapes of these parts are not limited. The stay portions may be made columnar. When the tubular members have square inner circumferential surfaces, the stay portions are desirably made squarely columnar and rectangularly cylindrical.

The height regulating engagement portions supports the headrest stays while retaining the quantity of insertion (height) thereof by engaging with the first locking members. Therefore, the shape of the height regulating engagement portions is not specially limited. Each of the first locking members is made of a flat member substantially perpendicular to the axis of the headrest stay, while the height regulating engagement portions are made of recesses the upper portions of which constitute flat surfaces substantially perpendicular to the axis of the headrest stay with inclined surfaces, which are directed toward the outer circumference of the headrest stay, formed on the lower side of the flat surfaces. Therefore, when the headrest stays are moved in the headrest stay withdrawing direction in this arrangement, the headrest stays are not locked up but rendered freely movable, and, when each of the headrest stays is moved down, the first locking member can be engaged with the flat surface mentioned above. This enables the regulation of the height of the headrest to be made easily.

The first slip-off engagement portion prevents the slip-off of the headrest stay by engaging with the first locking member. The shape of the first slip-off engagement portion is not specially limited. When the first locking member is made of a flat member substantially perpendicular to the axis of the headrest stay, and the first slip-off preventing engagement portion made of a recess the shape of which is vertically opposite to that of the recesses of the height regulating engagement portions are provided, this prevents the headrest stays from slipping off, and eliminates the impossibility of the headrest stays of moving in the direction of the insertion thereof into the headrest supports, so that the user can regulate the height of the headrest again. The relation between the second slip-off preventing engagement portion and second locking member is identical with that between the first slip-off preventing engagement portion and first locking member. Namely, the second slip-off preventing engagement portion and second locking member may work so as to prevent the slip-off of the headrest stay, and the shapes of the engagement portion and locking member are not limited. When the shape of the recesses is designed as mentioned above, the regulation of the height of the headrest can be made again as the prevention of the slip-off of the headrest stay is carried out. The first resilient member may work so as to exert a force to the first locking member, and the second resilient member to the second locking member. The concrete shapes of these resilient members and the materials of which these resilient members are made are not limited. These resilient members can be employed in various structures, for example, metal and plastic springs, plate springs and structures adapted to exert stress on predetermined bent portions.

An invention (2) including a concrete example of the second locking member and in accordance with the headrest support structure of the invention (1) above is provided with a second locking member which is supported such way that the second locking member can be moved forward and rearward substantially parallel to the direction in which the first locking member operating unit is moved forward and rearward, and which is formed such way that the second locking member is given a force toward the headrest stay by the second resilient member. Namely, the second locking member can be moved forward and rearward substantially parallel to the direction in which the first locking member operating unit is moved forward and rearward. Therefore, even when the second locking member and first locking member operating unit are arranged close to each other, or formed so as to move in slide contact with each other, the paths of forward and rearward movements thereof do not interfere with each other. Further, since the second locking member is given a force by the second resilient member, the exerting of the force on the second locking member is done independently of the first locking member operating unit and first locking member, the second locking member can be moved toward and away from the second slip-off preventing engagement portion independently, irrespective of the condition of the first locking member operating units. Even when the second resilient member is supported on the first locking member operating unit, an independent slip-off preventing operation can be carried out, of course, irrespective of the condition of the first locking member.

The engagement releasing mechanism works to exert a reverse force to the second locking member, and thereby allows the engaged condition of the second locking member and second slip-off preventing engagement portion to be released, and can be employed in 0various types of structures. An invention (3) including a concrete example of such structures and in accordance with the headrest support structure of the invention (2) above, in which the engagement releasing mechanism is provided with an insertion hole formed between the second locking member and tubular member, an elongated member being inserted via the insertion hole and engaged at a front end thereof with either the second resilient member or the second locking member, or a combination thereof to thereby enable a reverse force to be applied to the second locking member.

The second locking member is enclosed with the tubular member, and when the elongated member is inserted through the insertion hole from the outside, the free end of the elongated member can reach the second locking member and second resilient member. Accordingly, when the free end of this elongated member is engaged with either the second resilient member or the second locking member, or a combination thereof to cause the elongated member to be moved in the direction opposite to the direction of the line of action of the force, a reverse force (the force in the reverse direction) can be applied to the second resilient member or second locking member. When a reverse force is applied to either one of the second locking member or second resilient member, the second locking member is moved away from the second slip-off preventing engagement portion, and the engaged condition can be released.

In this embodiment, so far as the elongated member is formed to be capable of engaging at the free end thereof with either the second resilient member or the second locking member, or a combination thereof to exert a reverse force thereto, the shape of the elongated member is not specially limited. When the free end portion of the elongated member is bent, the elongated member engages various shapes of second resilient members and second locking members easily, and a preferable effect is obtained. When the elongated member of such a shape is engaged with either the second resilient member or the second locking member, a reverse force can be exerted thereon easily, whatever the second resilient member is made of a spring or a bent member of a flexible resin. When the second locking member is provided with a recess or a hole, on an edge of which the free end of the elongated member can be hung, a reverse force can be exerted easily on the second resilient member or the second locking member.

An invention (4) provides a headrest support structure in accordance with any one of the inventions (2) and (3), is which a tapering portion is provided on an inserting end of each headrest stay, the tapering portion being adapted to exert a reverse force on the second locking member during the headrest stay inserting operation and thereby retract the second locking member from an insertion path. Namely, the second locking member in a normal condition is urged toward the headrest stay. Therefore, when the headrest stay having a flat, free insertion end is inserted into the tubular member, the headrest stay interferes with the second locking member. However, when a tapering portion is provided on the free insertion end as in this invention, the headrest stay can have the second locking member retracted from the insertion path during an operation of inserting the same, so that the insertion of the headrest stay can be carried out easily.

An invention (5) provides a headrest support structure as another construction example for preventing an easy slip-off of a headrest stay, this support structure being in accordance with that of the invention (1) above, in which the headrest stay is made of a tubular member, the second slip-off preventing engagement portion including a locking hole made in a circumferential wall of the tubular member, and an engagement portion provided on an inner circumference of the tubular member so that the engagement portion is opposed to the locking hole when the headrest stay is in a position of a predetermined height, the second locking member being made of a flexible member and fitted into the interior of the tubular member as the second locking member is bent, the second locking member being inserted at a part thereof through a locking hole, which is provided in the circumferential wall of the tubular member and thereby rendered capable of engaging the engagement portion provided in an inner circumference of the tubular member.

The second locking member is of a flexible member, and the flexibility allows the locking member to work as a second resilient member. The headrest stay is formed into a tubular member, in a circumferential wall of which an engagement hole is provided. An engagement portion is provided in an inner circumferential surface of the tubular member into which the headrest stay is inserted. The second locking member is thereby provided in the interior of the headrest stay and engaged at a part thereof with the engagement portion via the locking hole. Accordingly, what should be changed in a structure like a related art headrest support structure are only the construction for providing the locking hole and engagement portion, and, when a second locking member made of another member is merely added to the resultant structure, this invention can be formed. As a result, this invention can be obtained in practice at a very low cost.

Since the second locking member is provided in the interior of the headrest stay, the engaged condition thereof cannot be changed easily from the outside thereof. An invention (6) having a construction example for releasing this engaged condition is in accordance with the headrest support structure of the invention (5) above, in which the engagement releasing mechanism is provided in a circumferential wall of the headrest stay with an insertion hole, through which a rod member bent substantially at right angles is inserted. The second locking member is pressed by a free end of the rod member in the interior of the headrest stay, and the releasing of the engaged condition is thereby made possible.

Since the second locking member is fitted in the interior of the headrest stay, the insertion hole is made in the circumferential wall of the headrest stay so that the rod member reaches the second locking member. As a result, it becomes possible to insert the rod member bent substantially at right angles into the headrest stay, to thereby press the second locking member with the free end of the rod member. In this case, since the second locking member has a flexibility and is fitted in the headrest stay, the second locking member is bent by the force to cause the engaged condition to be released. Although the structure is therefore formed so that the engaged condition cannot be released easily, a user having the will of releasing the engaged condition can release the engaged condition and pull out the headrest stay. The rod member used in this invention may have any shape as long as the same member can press the second locking member and disengage the same. The shape of the rod member is not limited.

Since the second locking member is a member separated from the headrest stay, so that this locking member is dropped off when the engaged condition is released by the above-described structure. Therefore, it is preferable to prevent the second locking member from being dropped off, and from being left in the interior of the support member of the headrest stay. An invention (7) including a concrete example of such a structure provides a headrest support structure in accordance with that of either the invention (5) or the invention (6) above, in which the portion of the headrest stay which is under the locking hole thereof is provided with a second locking hole. The second locking member is engaged with the second locking hole after the engagement of the second locking member with the former locking hole is released. The second locking member is thereby prevented from dropping off.

Namely, even when the second locking member is dropped from the locking hole, the second locking member is then engaged with the second locking hole, so that the second locking member does not fall from the headrest stay. Accordingly, the second locking member is not left in the interior of the support member in which the headrest member is supported. The headrest stay can be pulled out to the outside of the support member with the second locking member left engaged with a lower portion of the headrest stay.

The second locking member and headrest stay are connected together by the string-like member, so that, even when the engagement of the second locking member is released to cause the second locking member to fall, the second locking member is hung down from the headrest stay via the string-like member and does not fall away. Therefore, the second locking member is not left in the interior of the support member on which the headrest stay is supported, and the headrest stay can be pulled out easily to the outside of the support member.

As described above, the present invention can provide a headrest support structure capable of pulling out headrest stays from the support members as occasions demands while preventing the headrest stays from falling easily from the support members. According to the invention (2) above, a structure for moving the second locking member forward and rearward with respect to the second slip-out preventing engagement portion independently, irrespective of the condition of the first locking member, can be employed easily. According to the invention (3) above, the second locking member can be disengaged easily by using predetermined member while preventing the headrest from easily falling. According to the invention (4) above, the headrest stay can be inserted easily into the support member.

According to the invention (5) above, the invention can be formed by merely adding the second locking member of an independent member, and obtained in practice at a very low cost. According to the invention (6) above, the second locking members can be disengaged easily by using a predetermined member while preventing the headrest stay from easily falling. According to the invention (7) above, the second locking member is not left in the interior of the support member in which the headrest stay is supported. According to the invention (8) above, the second locking member is not left in the interior of the support member in which the headrest stay is supported.

BRIEF DESCRIPTION OF THE INVENTION

Figure 28:
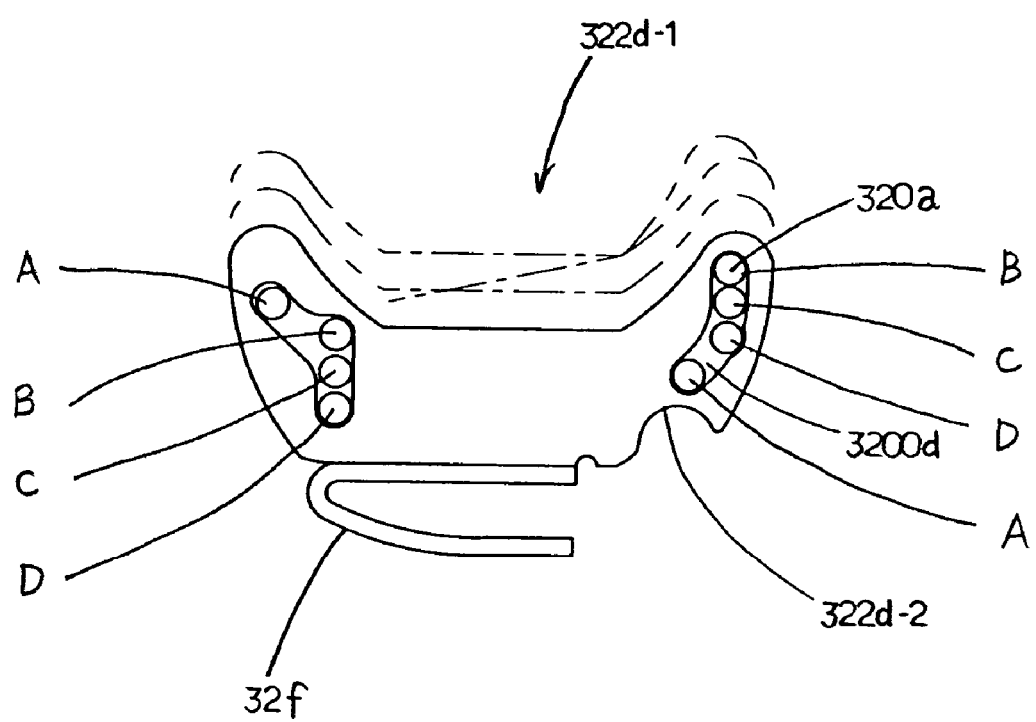

FIG. 28 shows a perspective view showing the relation among A to D and the crescent holes. FIG. 28A is an unlocked condition separating the second locking member from the second slip-off preventing engagement portion by using the operating member; FIG. 28B is a condition where the first locking member is locked with the height regulating engagement portions and the condition of the second locking member is unlocked with the second slip-off preventing engagement portion; FIG. 28C is a condition where the second locking member is locked with the second slip-off preventing engagement portion; FIG. 28D is a condition where the first locking member is unlocked with the height regulating engagement portions.

Figure 25A:
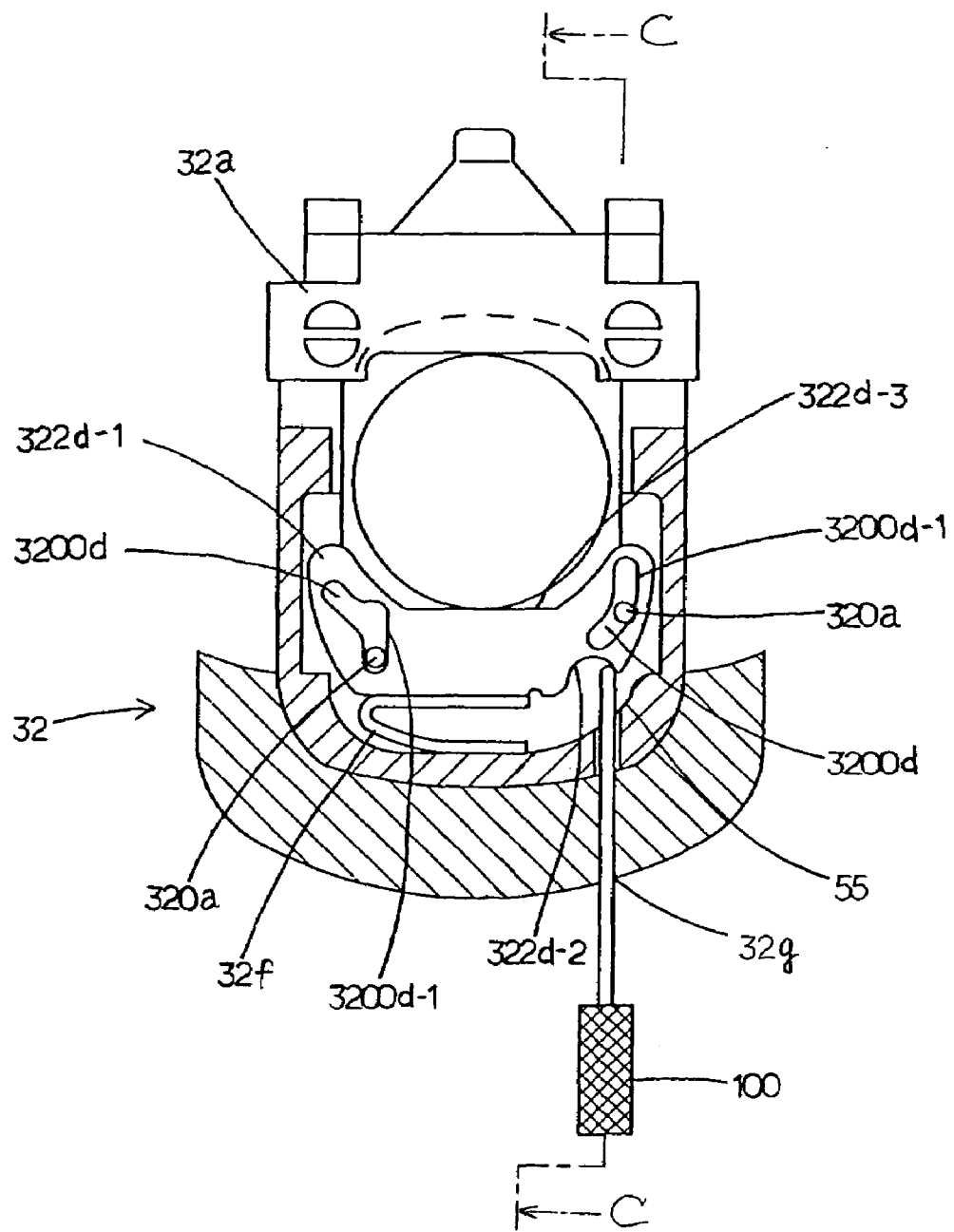
FIG. 25A shows a partially cutaway top view showing the relation (unlocked condition) between the second locking member and headrest stay, regarding the fifth embodiment.
Figure 29:
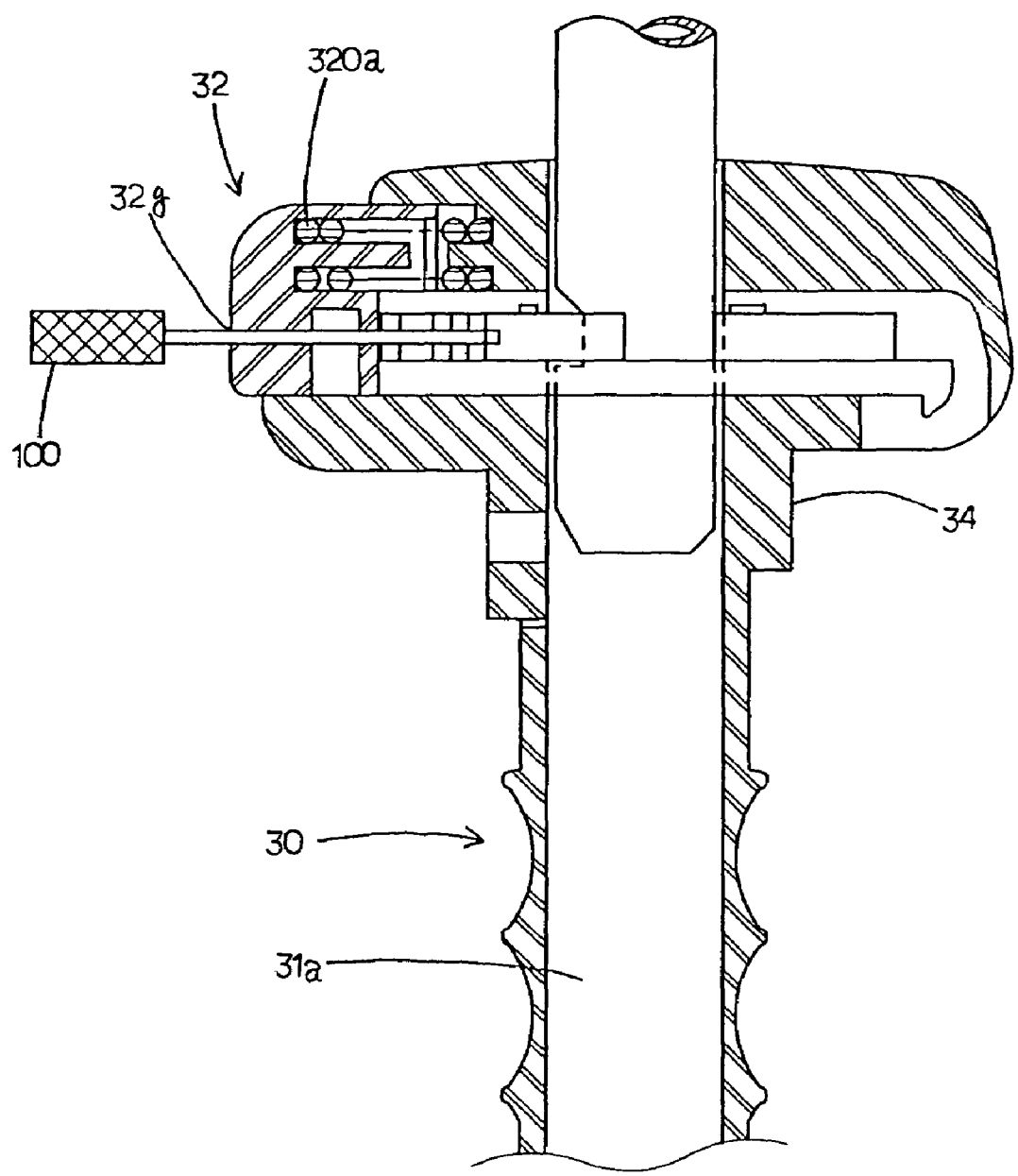

FIG. 29 shows a sectional view of a principal portion as shown in FIG. 25A.

Figure 26:
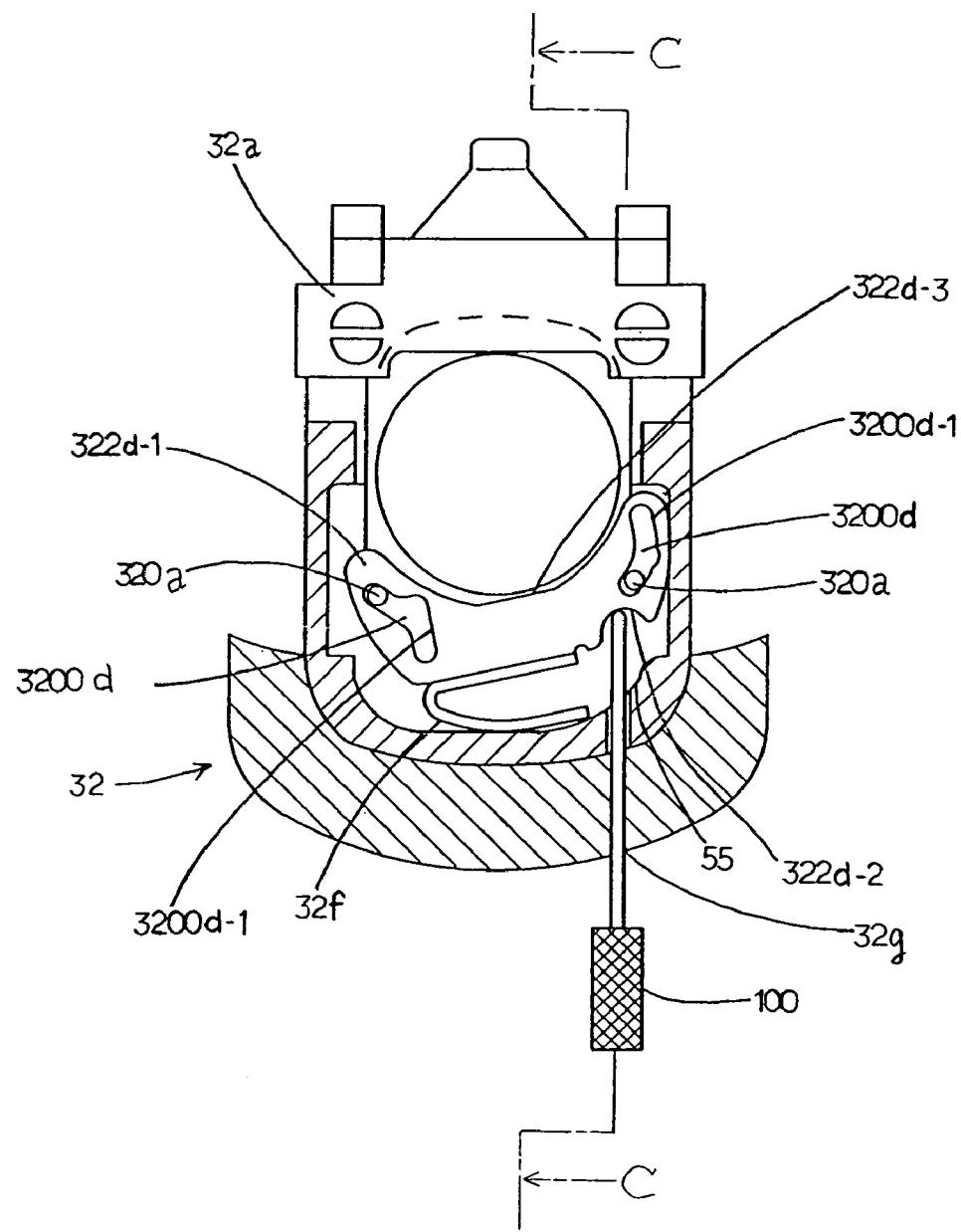
FIG. 26 shows a partially cutaway top view showing the relation (unlocked condition) between the second locking member and headrest stay, regarding the fifth embodiment.
Figure 27:
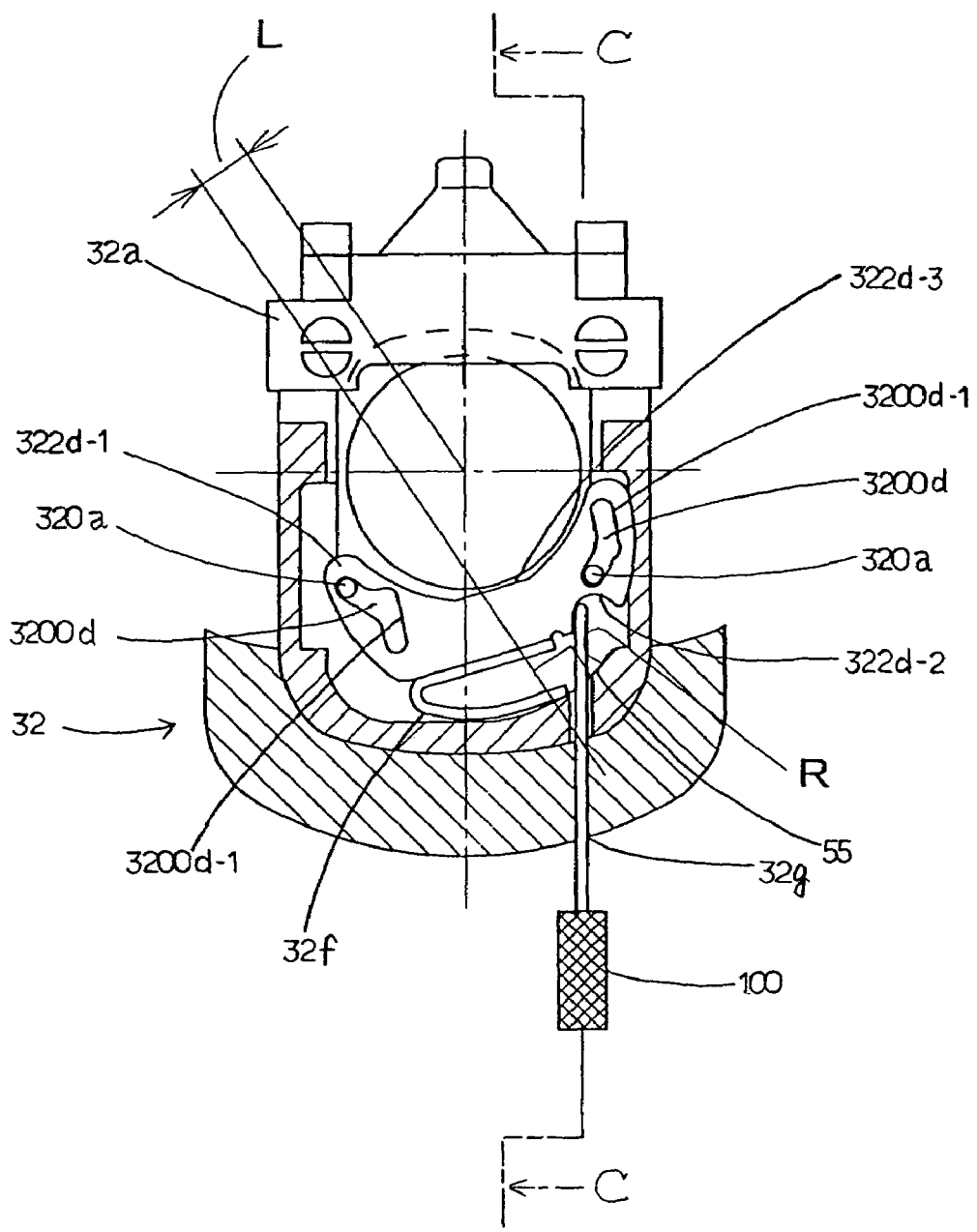
FIG. 27 shows a partially cutaway top view showing the relation (unlocked condition) between another second locking member and headrest stay, regarding the fifth embodiment.
Figure 30:
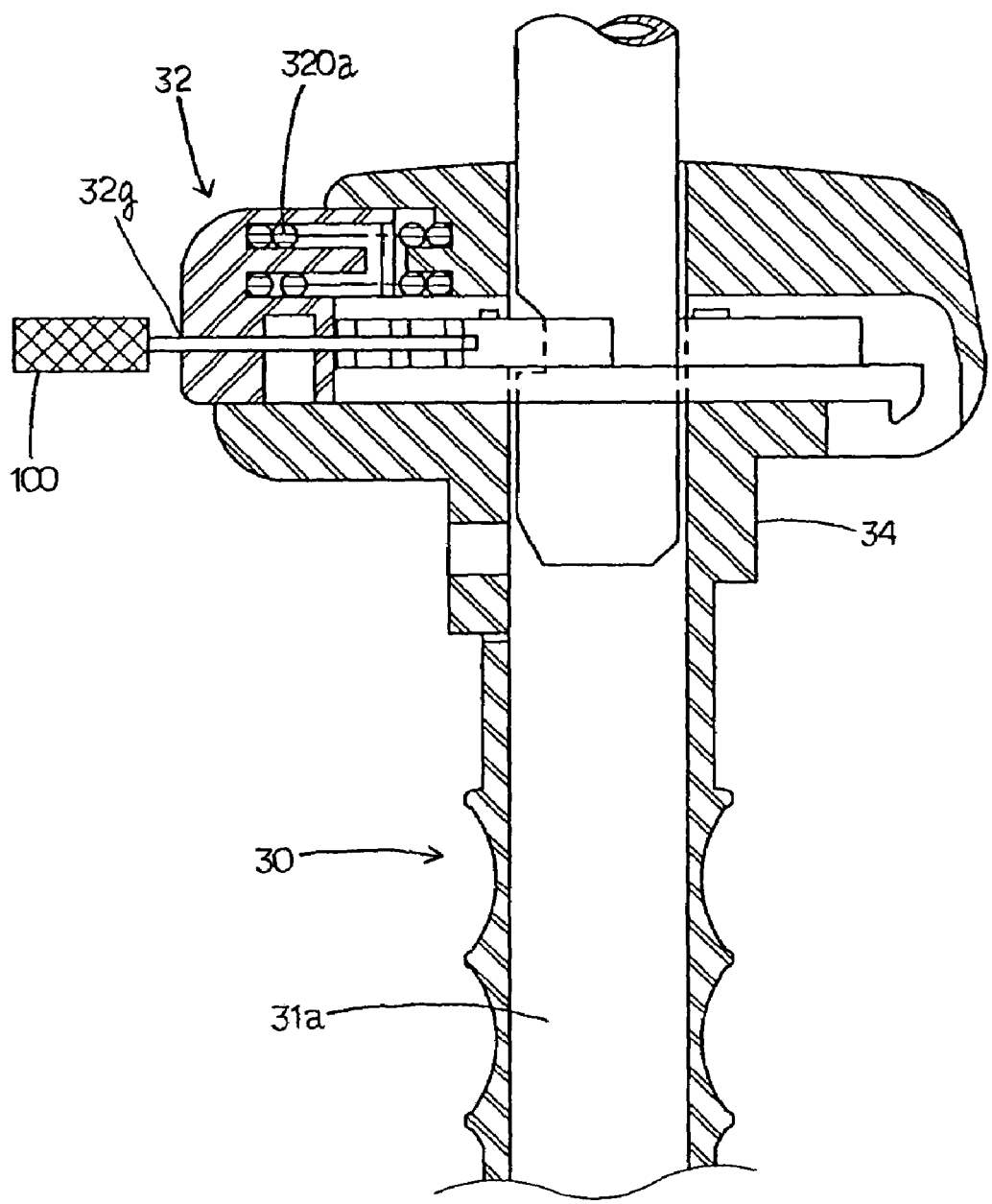

FIG. 30 shows a sectional view of a principal portion as shown in FIGS. 26 and 27.

Figure 31:
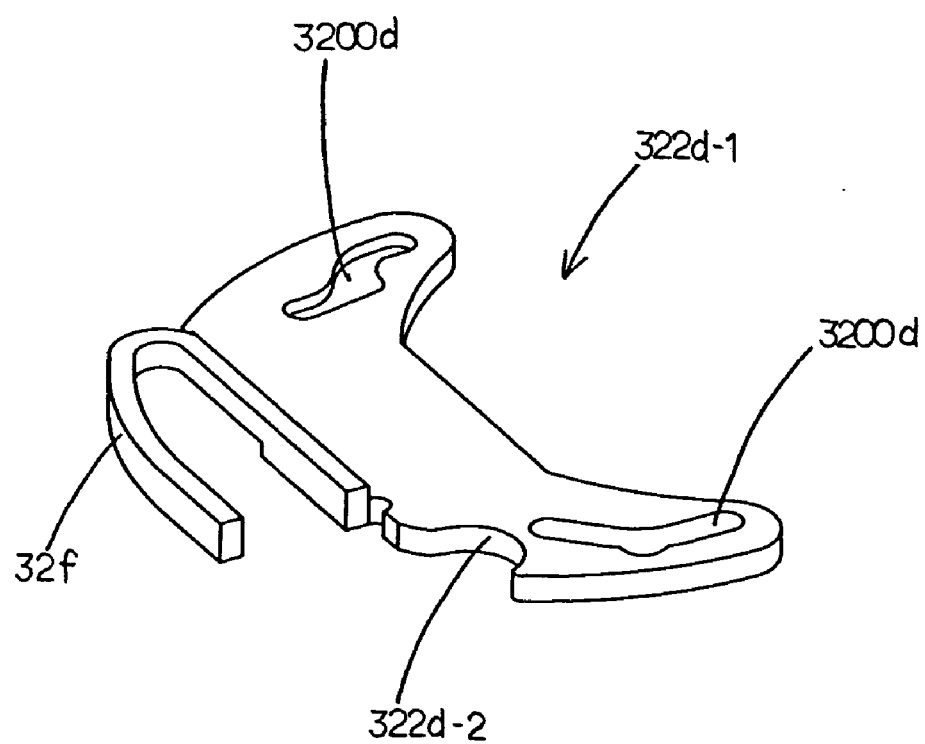

FIG. 31 shows an enlarged perspective view of the second locking member.

Figure 32:
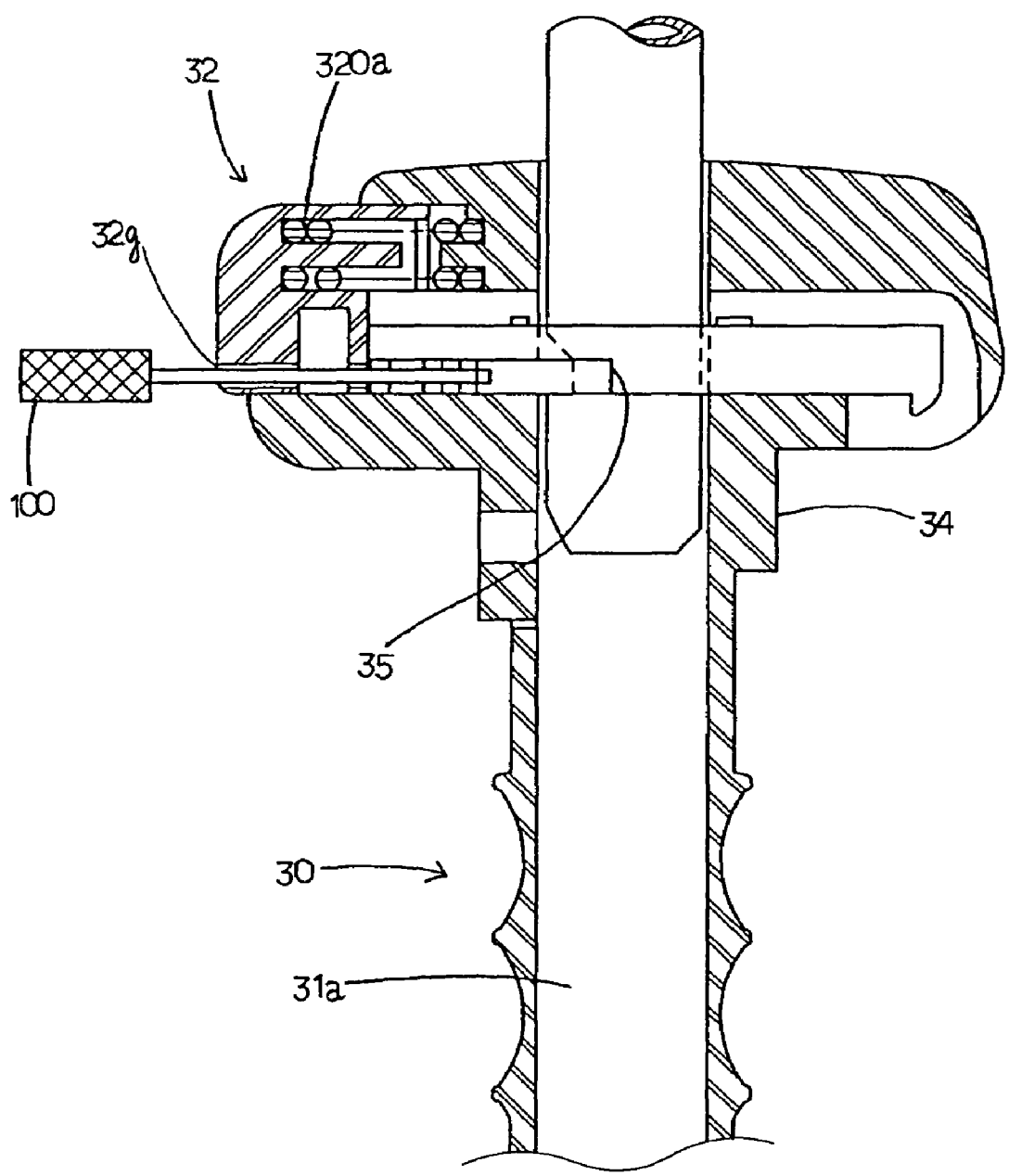

FIG. 32 shows a sectional view of a principal portion of the headrest stay support structure showing the relation (locked condition) between the second locking member and another first locking member operating unit, regarding the sixth embodiment.

Figure 33:
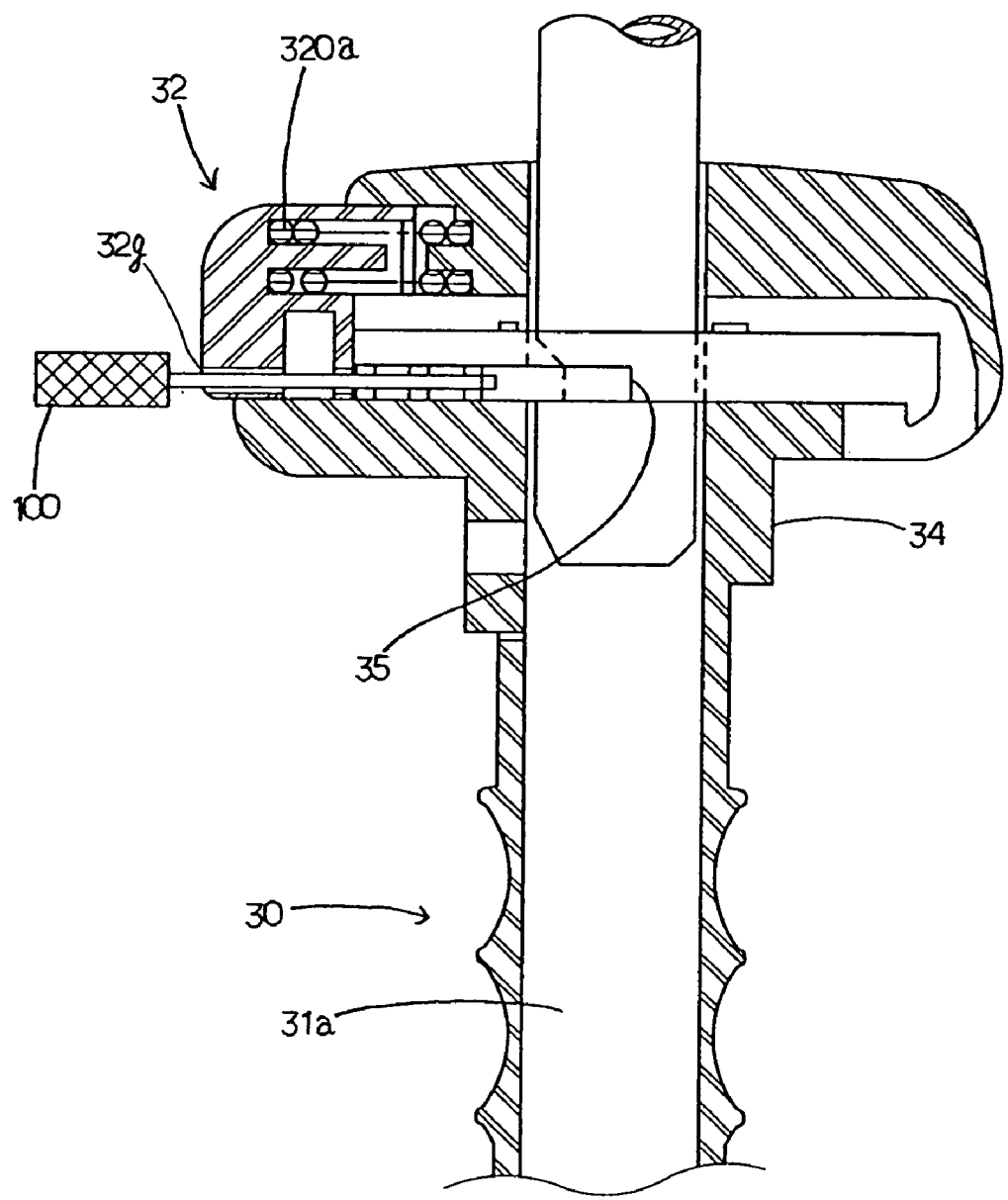

FIG. 33 shows a sectional view of a principal portion of the headrest stay support structure showing the relation (unlocked condition) between the second locking member and the same first locking member operating unit, regarding the sixth embodiment.

Figure 34:
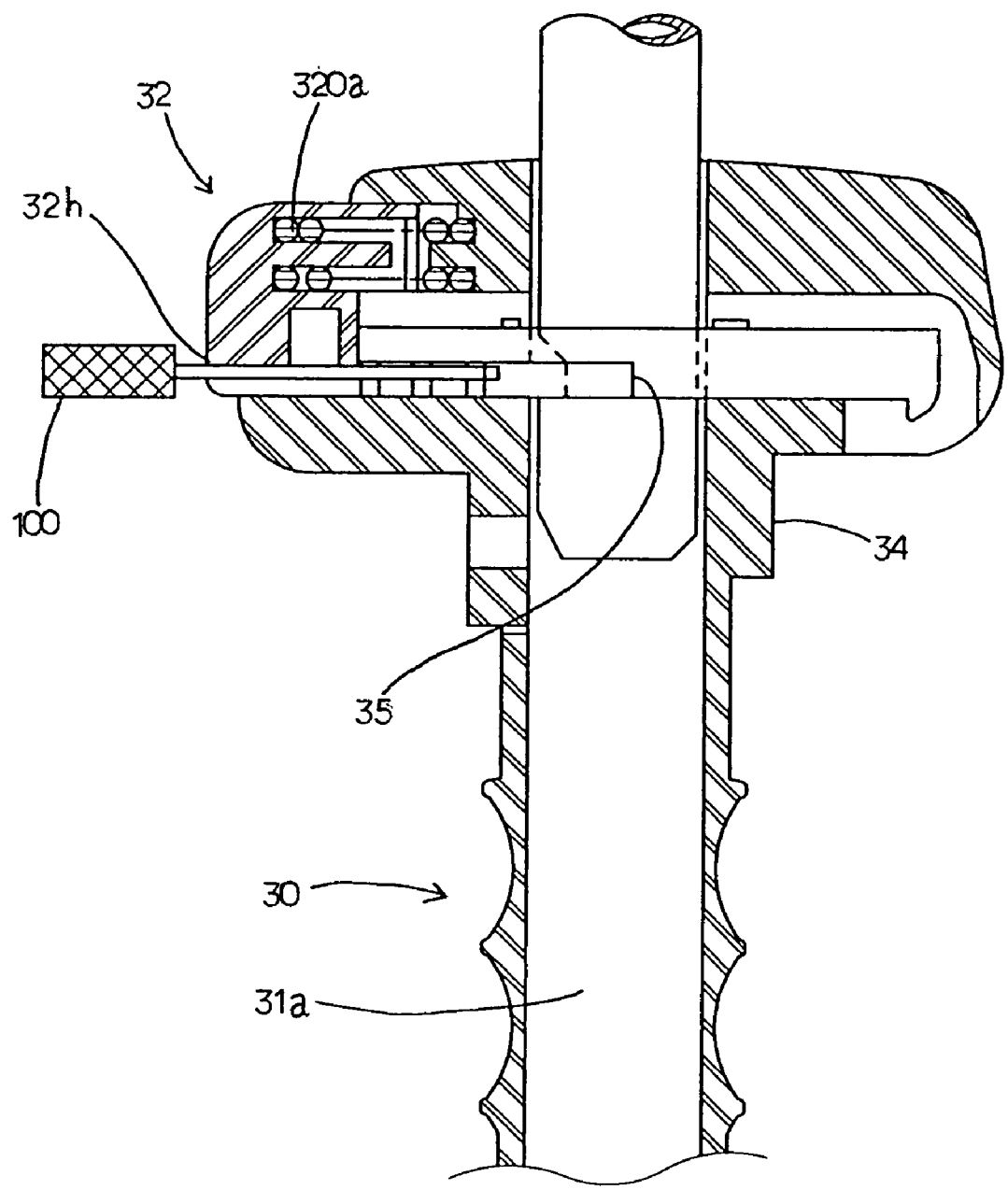

FIG. 34 shows a sectional view of a principal portion of the headrest stay support structure, showing the relation (unlocked condition) between the second locking member and another first locking member operating unit, regarding the sixth embodiment.

Figure 25B:
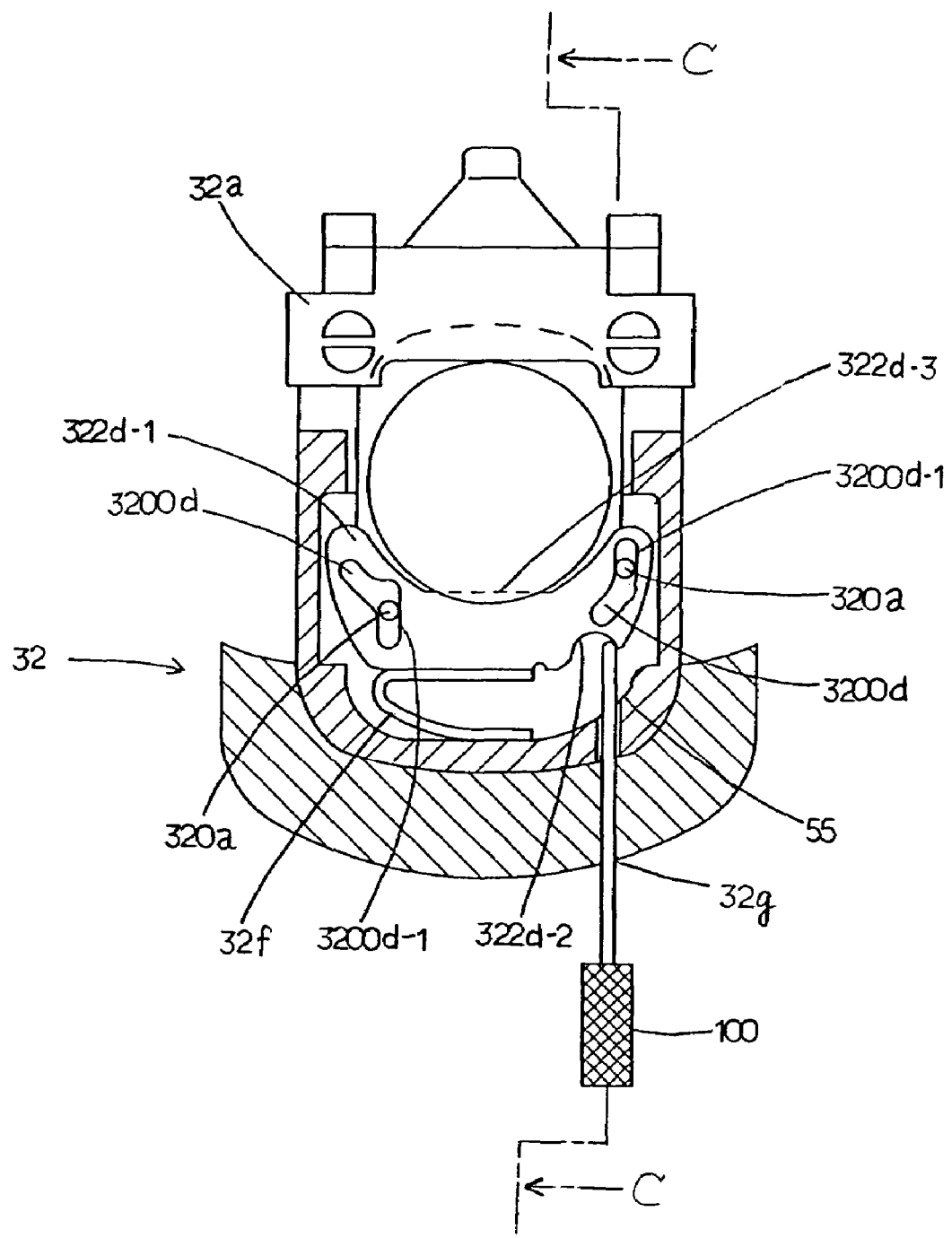
FIG. 25B shows a partially cutaway top view showing the relation (locked condition) between the second locking member and headrest stay, regarding the fifth embodiment.
Figure 35A:
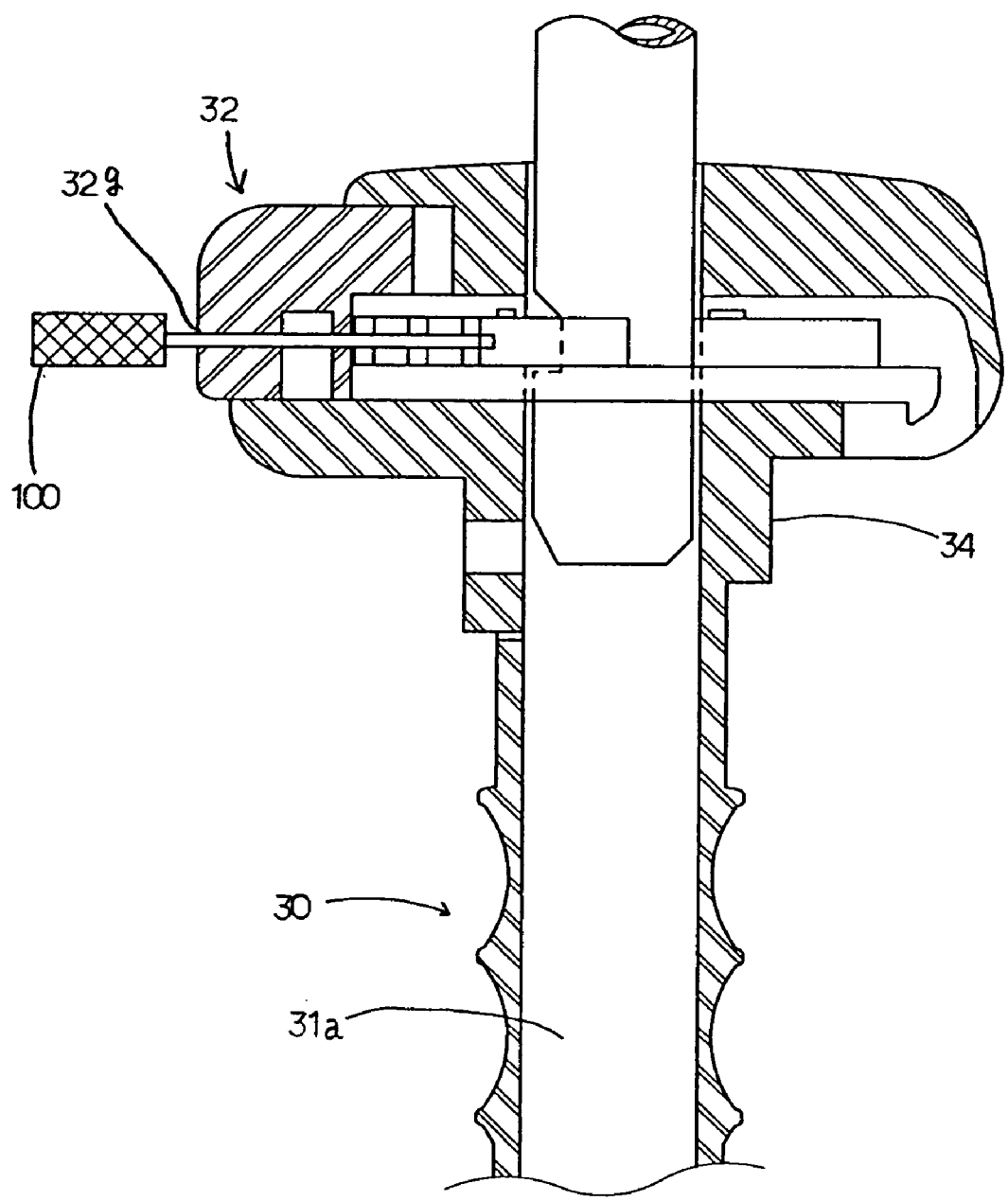

FIG. 35A shows a sectional view of a principal portion of the headrest stay support structure showing another example (unlocked condition) as shown in FIGS. 25 and 26, regarding the seventh embodiment.

Figure 35B:
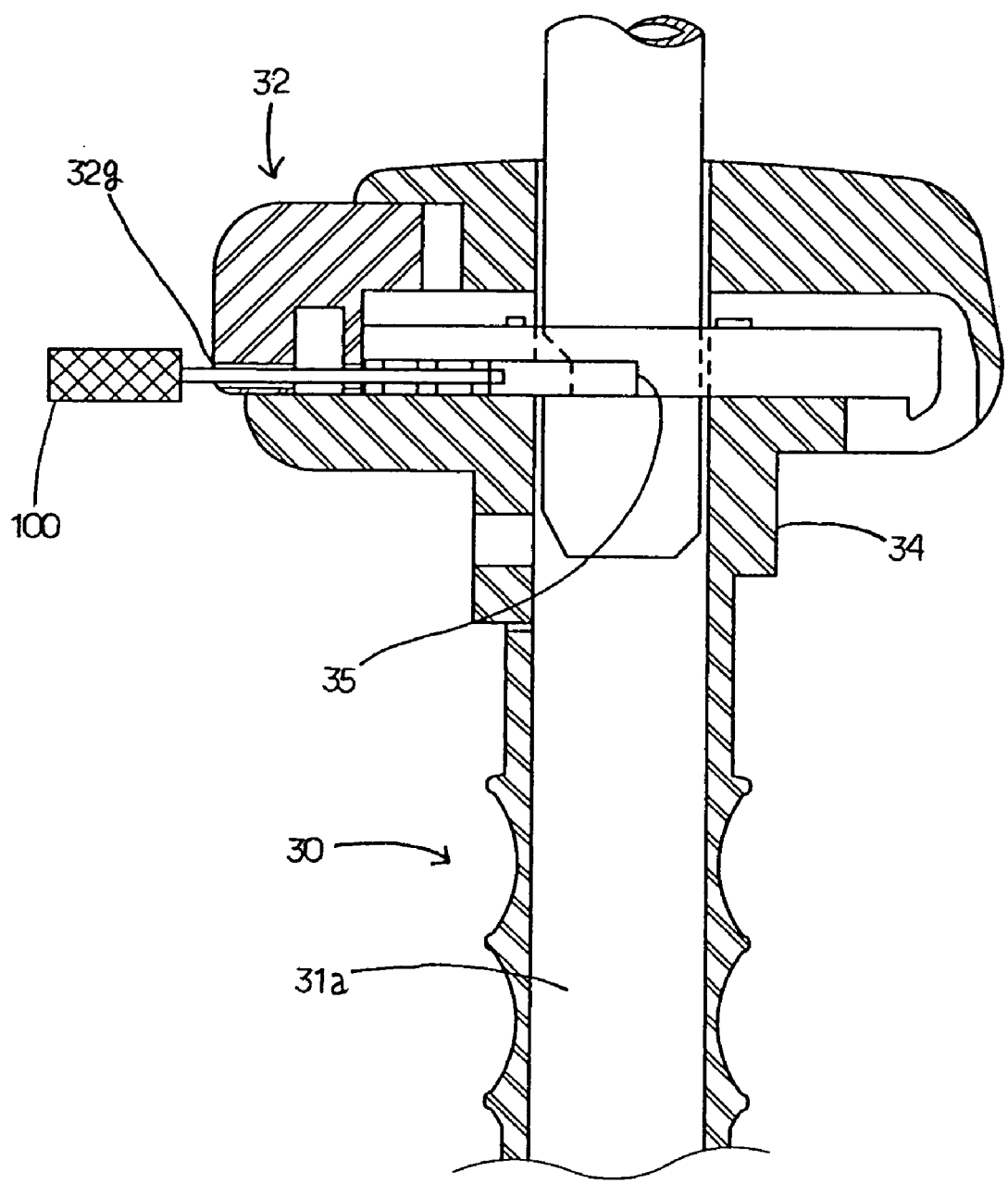

FIG. 35B shows a sectional view of a principal portion of the headrest stay support structure showing another example (unlocked condition) shown in FIG. 27, regarding the seventh embodiment.

Figure 35C:
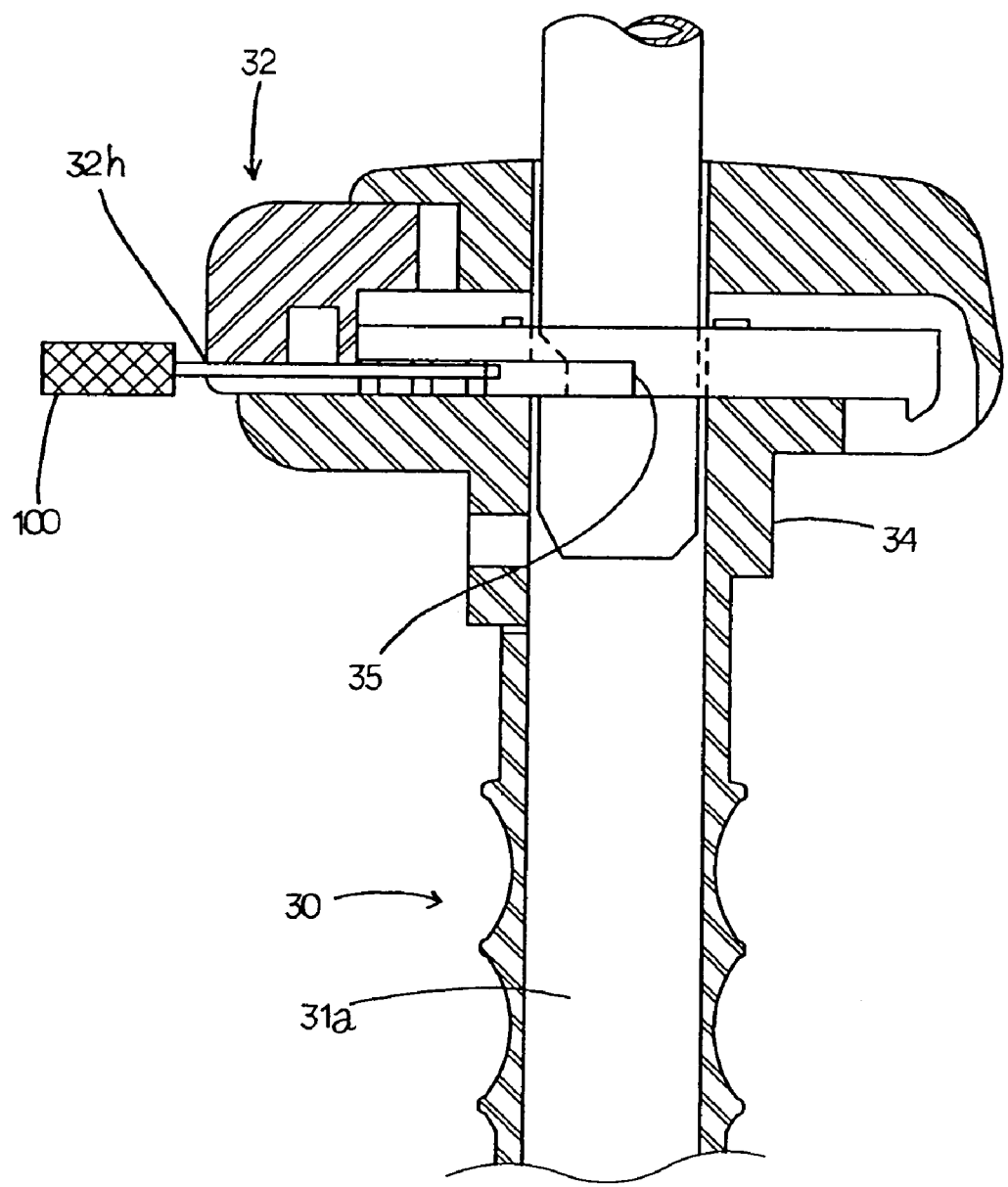

FIG. 35C shows a sectional view of a principal portion of the headrest stay support structure showing another example (unlocked condition) shown in FIG. 34, regarding the seventh embodiment.

Figure 36:
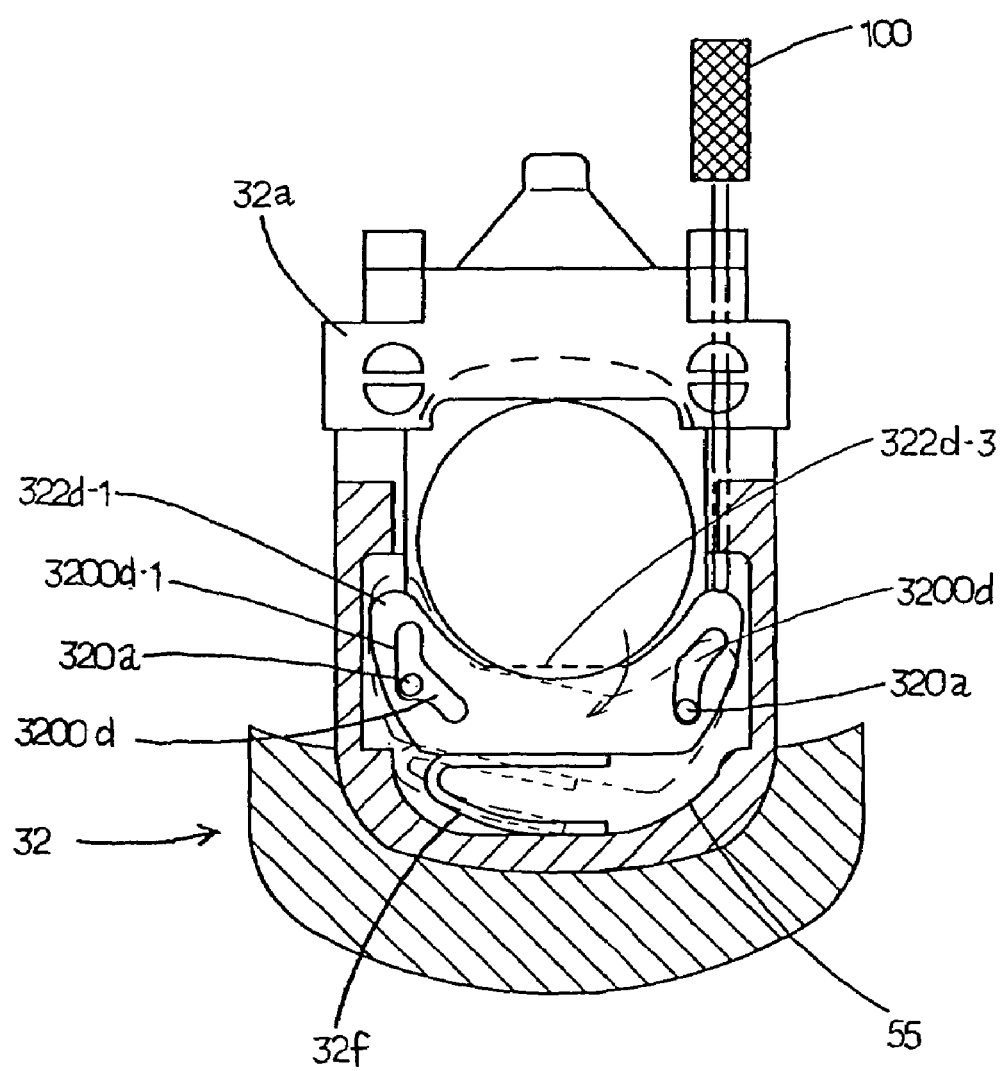

FIG. 36 shows a partially cutaway top view showing the relation (locked condition) among the second locking member, first locking member operating unit and another operating member, regarding the eighth embodiment.

Figure 37:
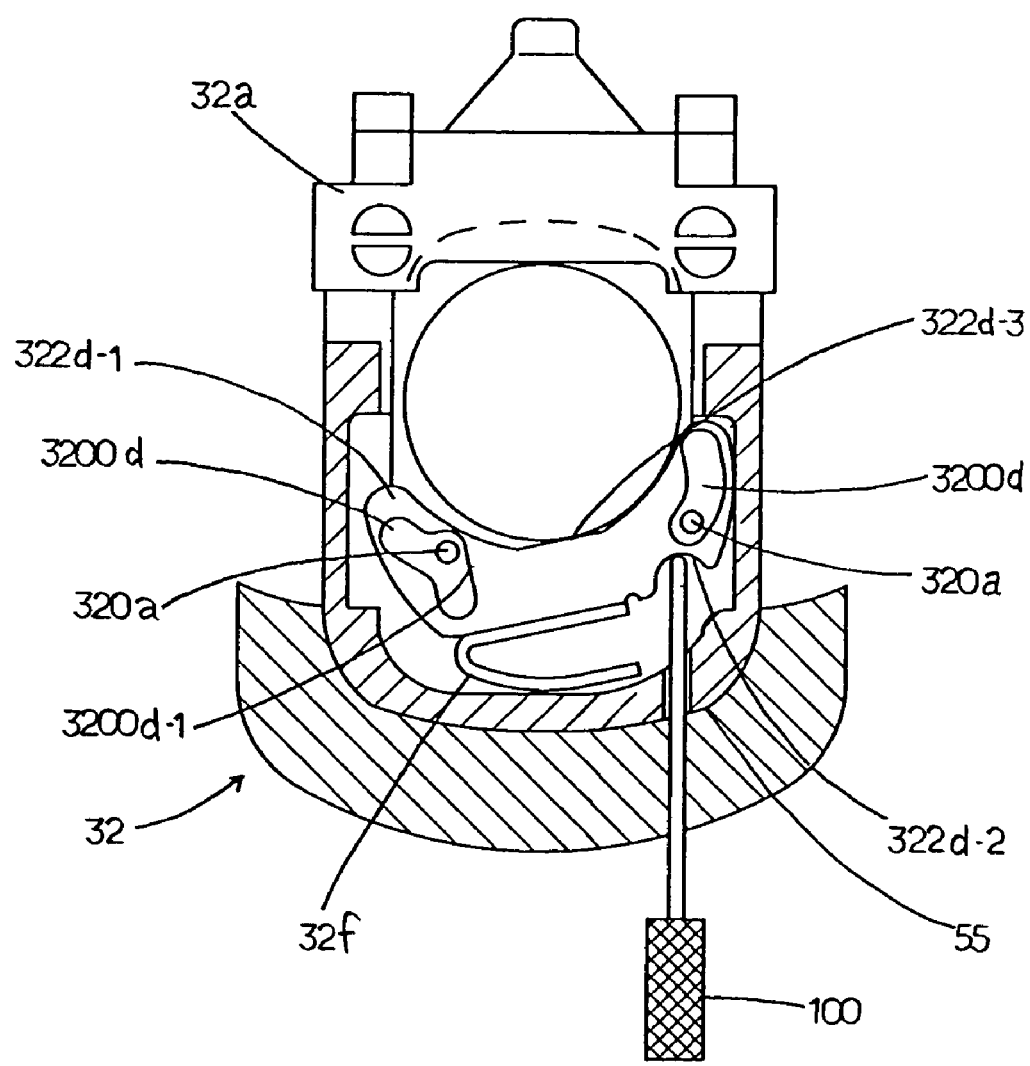

FIG. 37 shows a partially cutaway top view showing the relation (unlocked condition) between the crescent holes of the second locking member and another guide pins, regarding the ninth embodiment.

Figure 38:
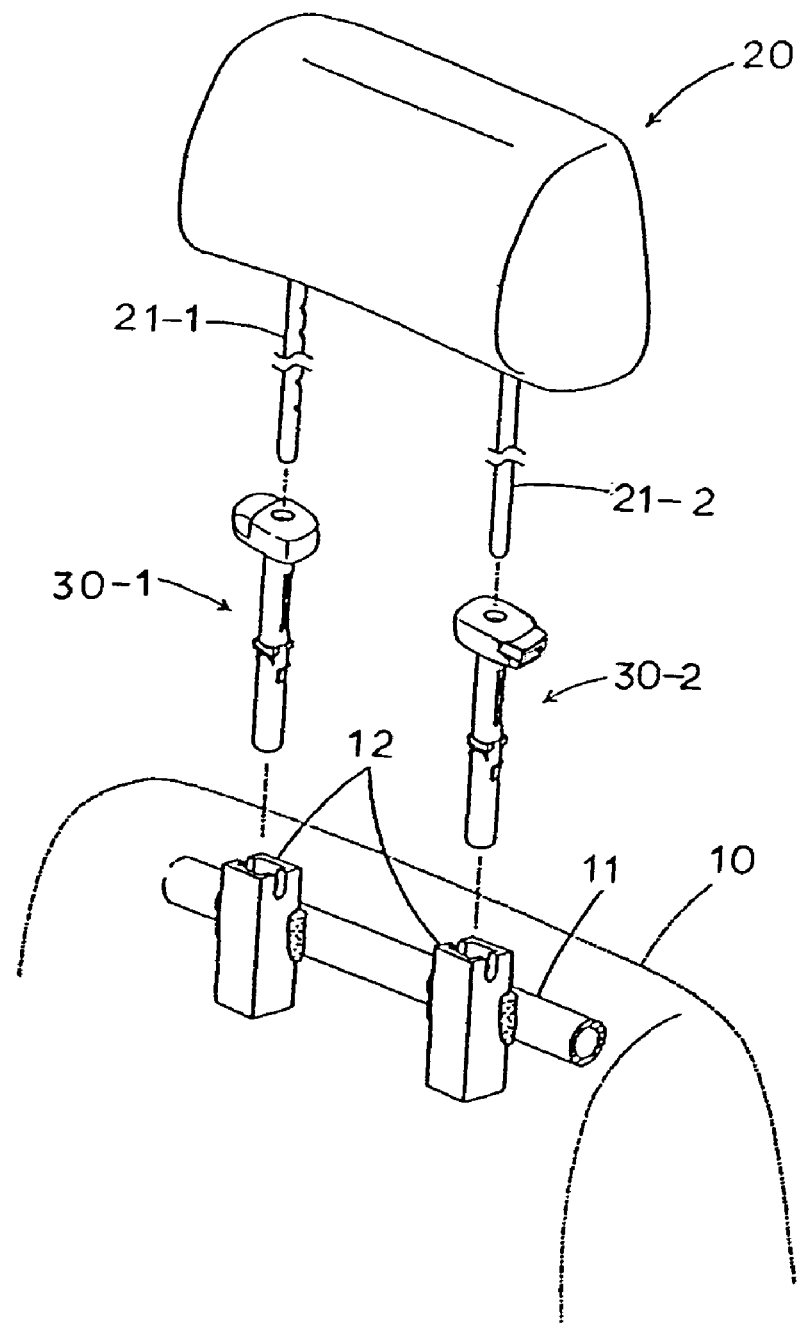

FIG. 38 shows a perspective view of the headrest support structure, regarding the tenth embodiment.

Figure 39:
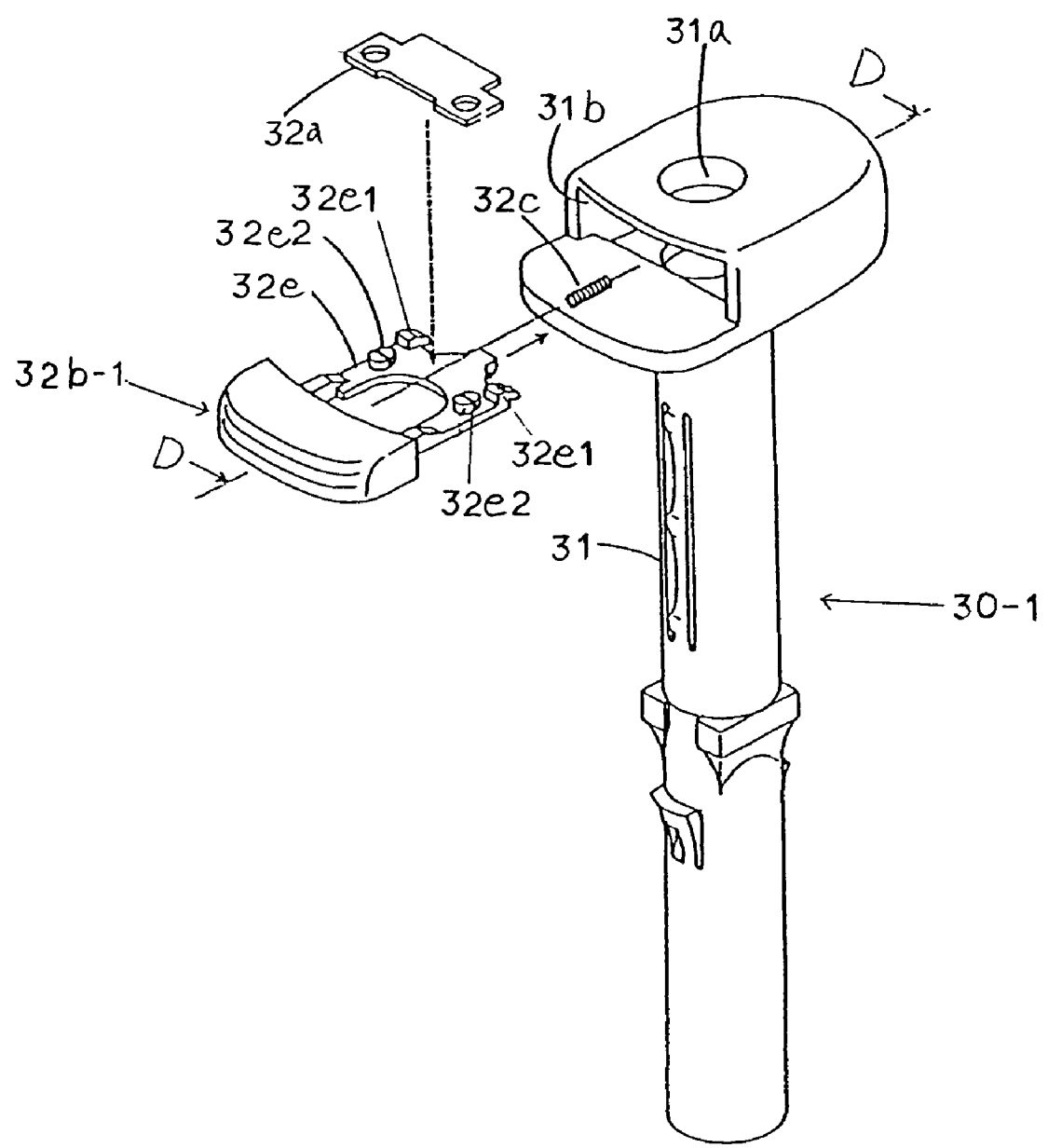

FIG. 39 shows a perspective view showing one of the headrest supports shown in FIG. 38.

Figure 40:
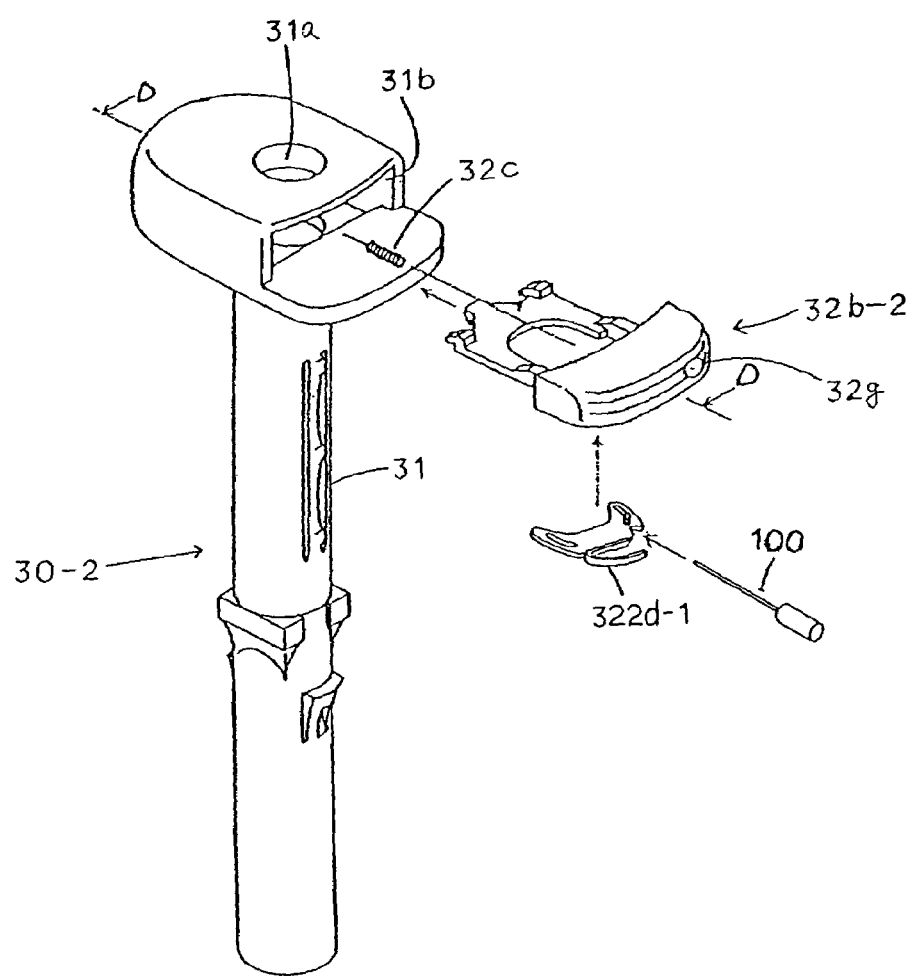

FIG. 40 shows a perspective view showing the other of the headrest support shown in FIG. 38.

Figure 41:
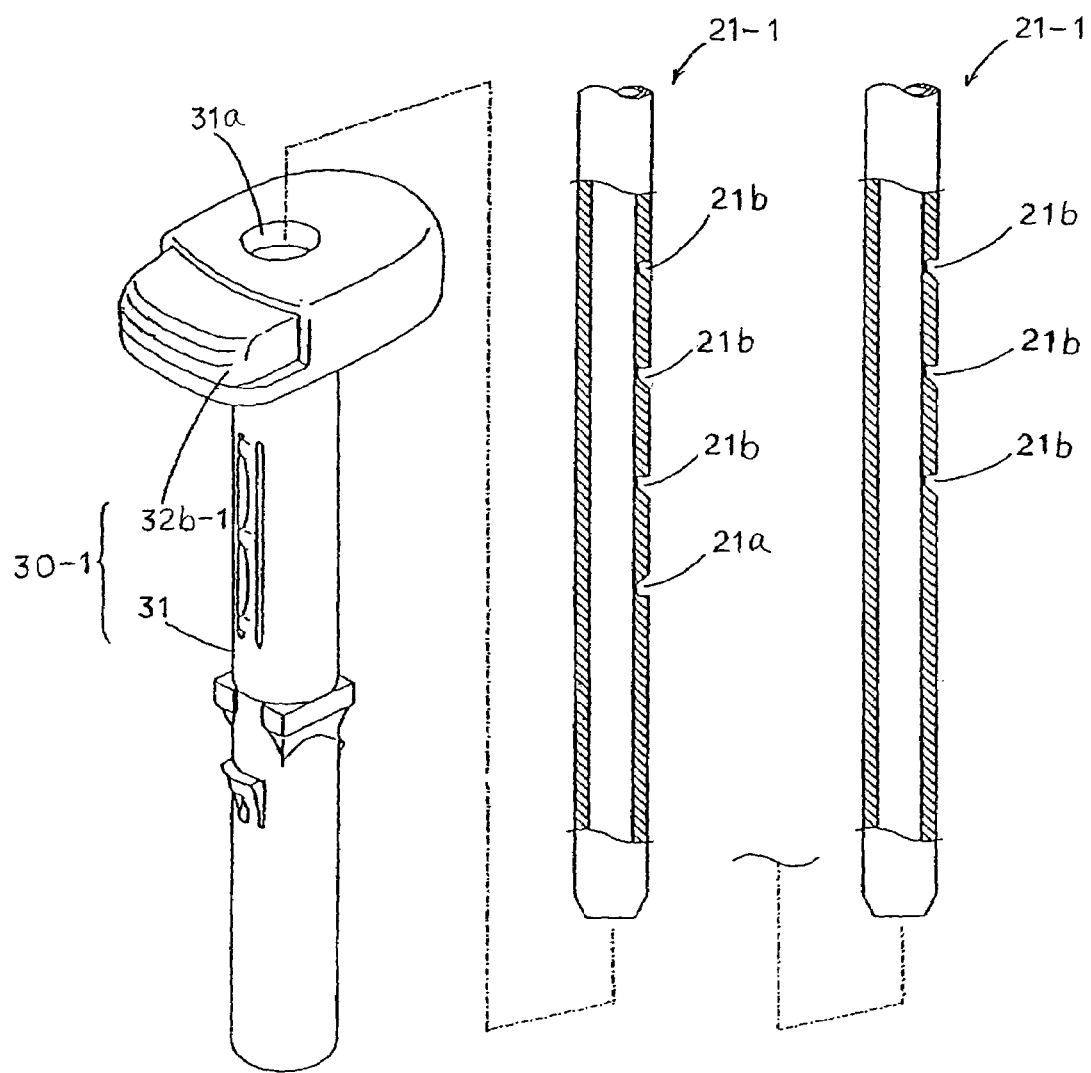

FIG. 41 shows a perspective view showing parts of one of the headrest supports shown in FIG. 38.

Figure 42:
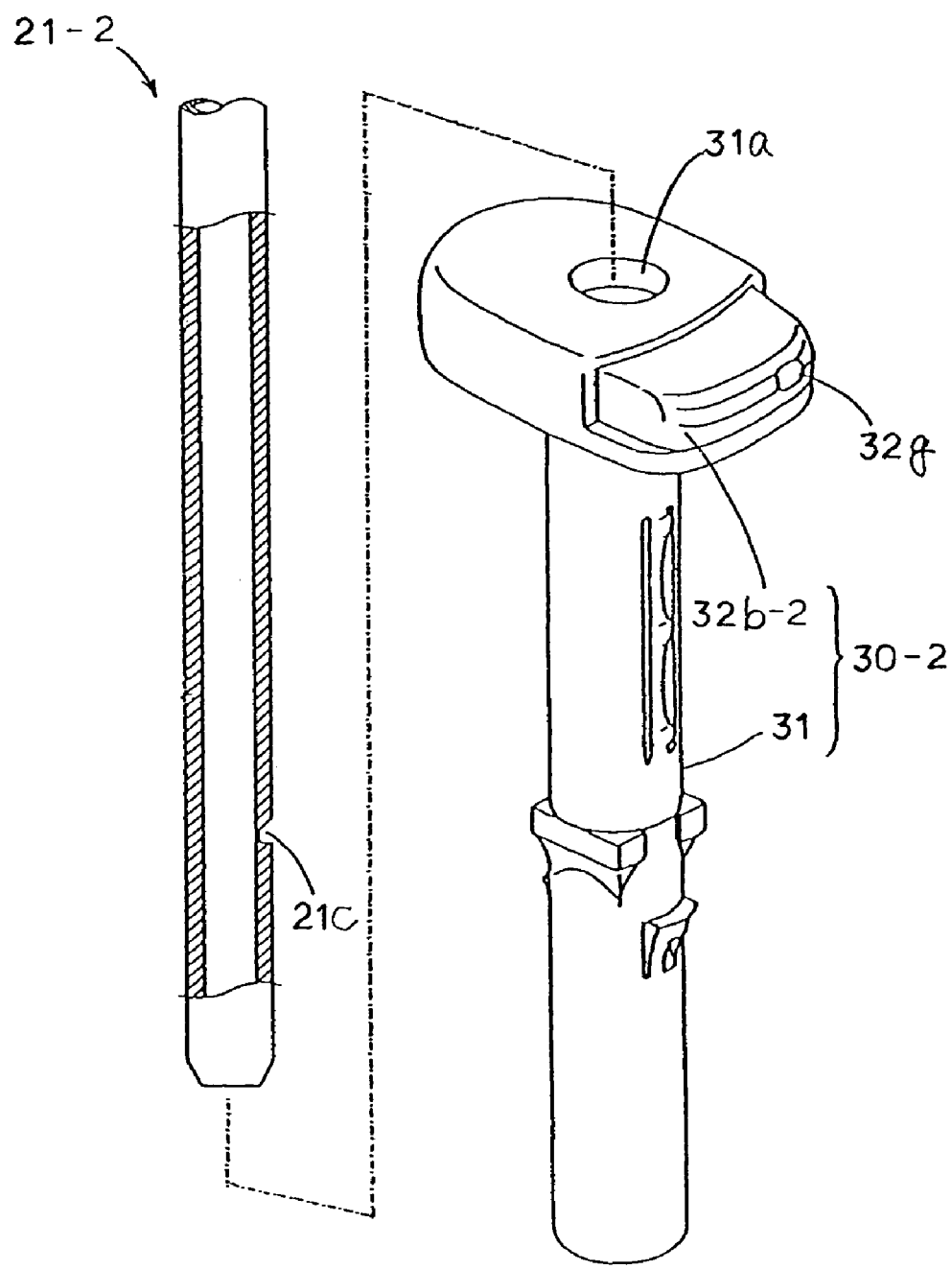

FIG. 42 shows a perspective view showing parts of the other of the headrest supports shown in FIG. 38.

Figure 43:
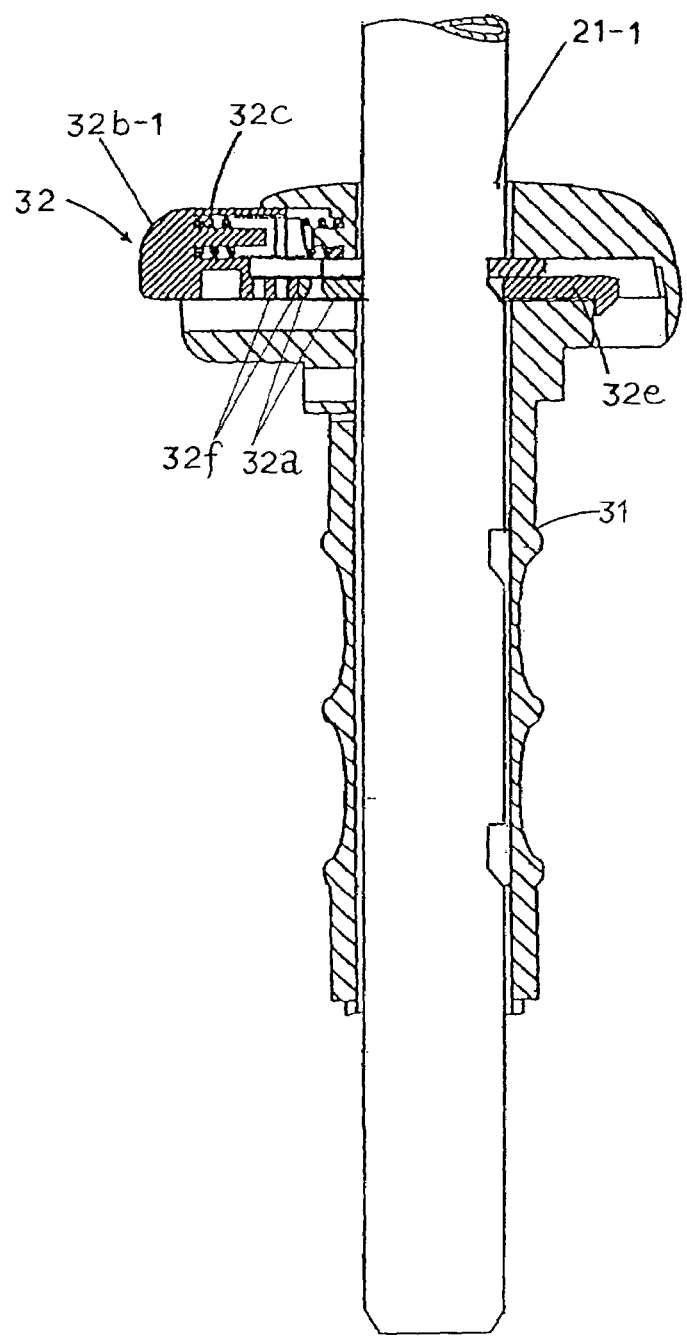

FIG. 43 shows a cross-sectional view showing a condition where one of the headrest stays is inserted.

Figure 44:
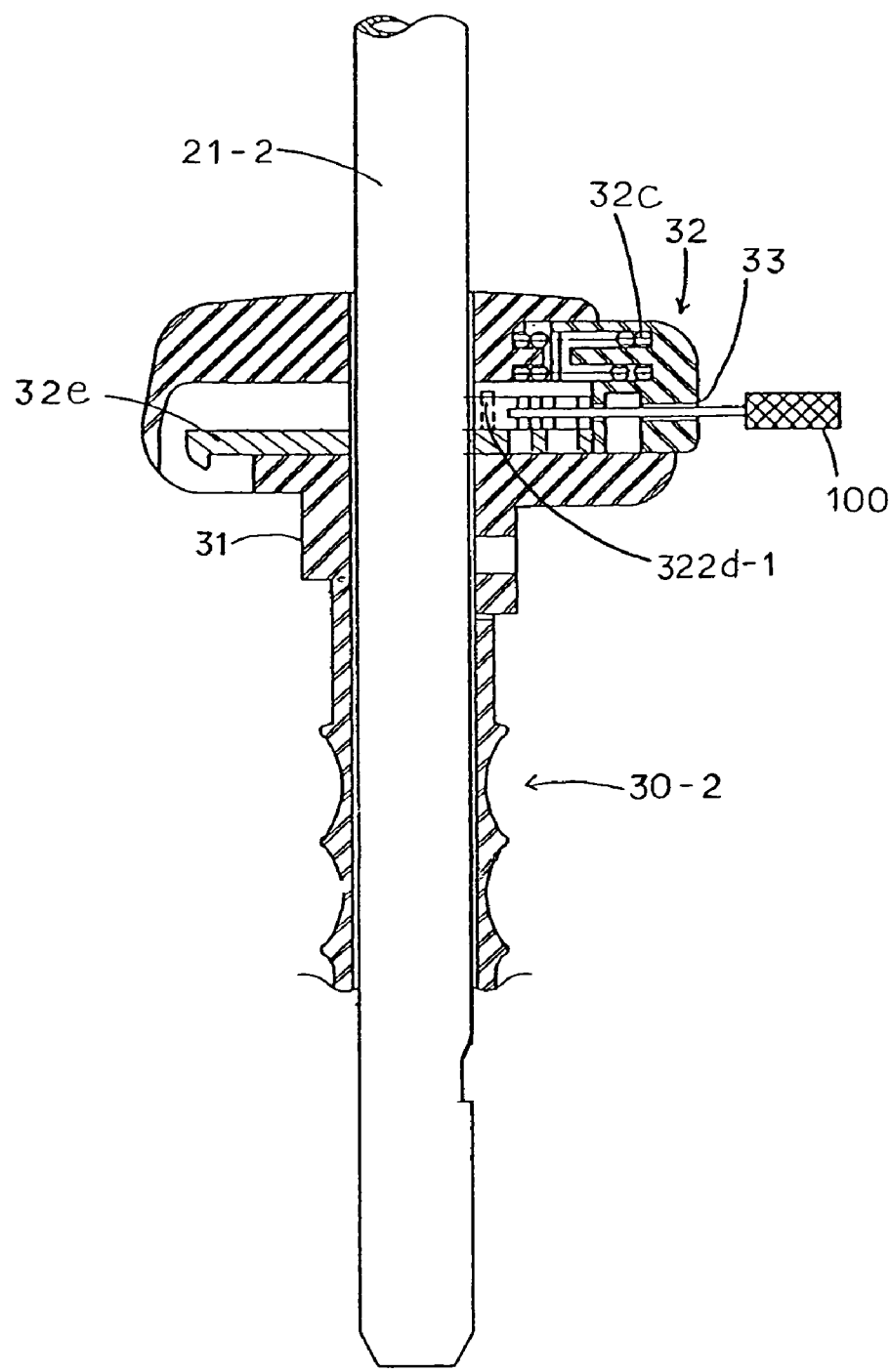

FIG. 44 shows a cross-sectional view showing a condition where the other of the headrest stays as shown in FIG. 38 is inserted.

FIG. 45 shows variations of the headrest stay provided with a height regulating engagement portion, a first slip-off preventing engagement portion and a second slip-off preventing engagement portion.

DESCRIPTION OF THE PREFERRED EMBODIMENTS

The modes of embodiment of the present invention will be hereinafter described in the following order.

(1) Support Structure for Headrest Stay, (2) Height Regulating Structure, (3) First Slip-off Preventing Structure, (4) Second Slip-off Preventing Structure, (5) Second Mode of Embodiment, (6) Third Mode of Embodiment, (7) Fourth Mode of Embodiment, (8) Fifth Mode of Embodiment, (9) Sixth Mode of Embodiment, (10) Seventh Mode of Embodiment, (11) Eighth Mode of Embodiment, (12) Ninth Mode of Embodiment, and (13) Tenth Mode of Embodiment.

Figure 1:
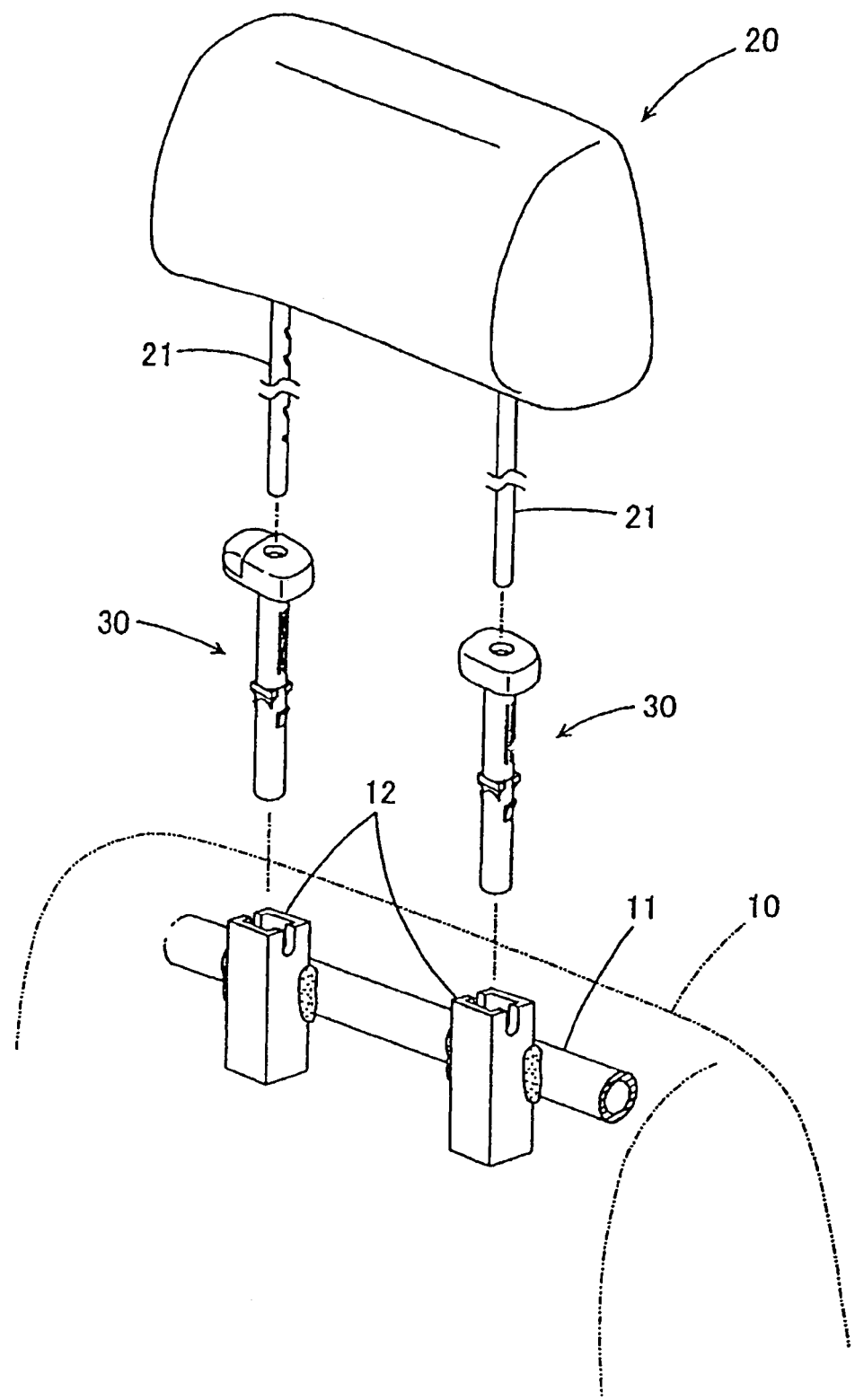
FIG. 1 shows a perspective view showing the condition of applying a mode of embodiment of the headrest support structure according to the present invention to a headrest.

(1) Support Structure for Headrest Stay:

FIG. 1 shows in perspective an example of use of a first mode of embodiment of the headrest support structure according to the present invention, which is applied to a headrest in an automobile. Referring to the same drawing, square pipes 12, 12 extending in the vertical direction of a seat back 10 and spaced laterally from each other by a predetermined distance are fixed by welding to a frame disposed widthwise in an upper portion of the seat back 10. Headrest stays 21, 21 projecting downward from a bottom surface of a headrest 20 are inserted into substantially tubular headrest supports 30, 30 made of a resin which are inserted and supported in the square pipes 12, 12. The headrest stays are supported indirectly on the frame 11 by being inserted and supported in the headrest supports 30, 30.

Figure 2:
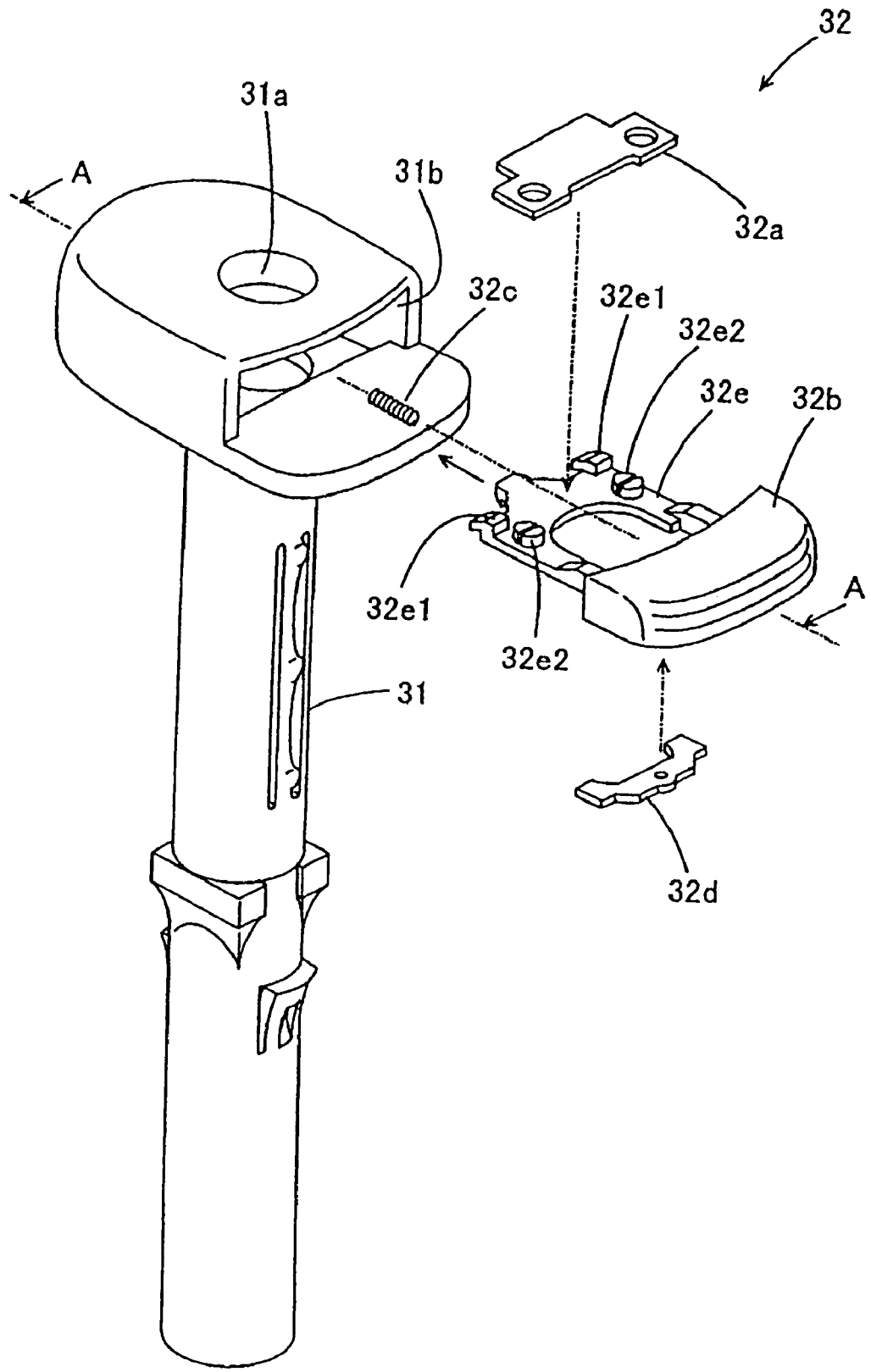
FIG. 2 shows a perspective view showing the construction of a headrest support.
Figure 3:
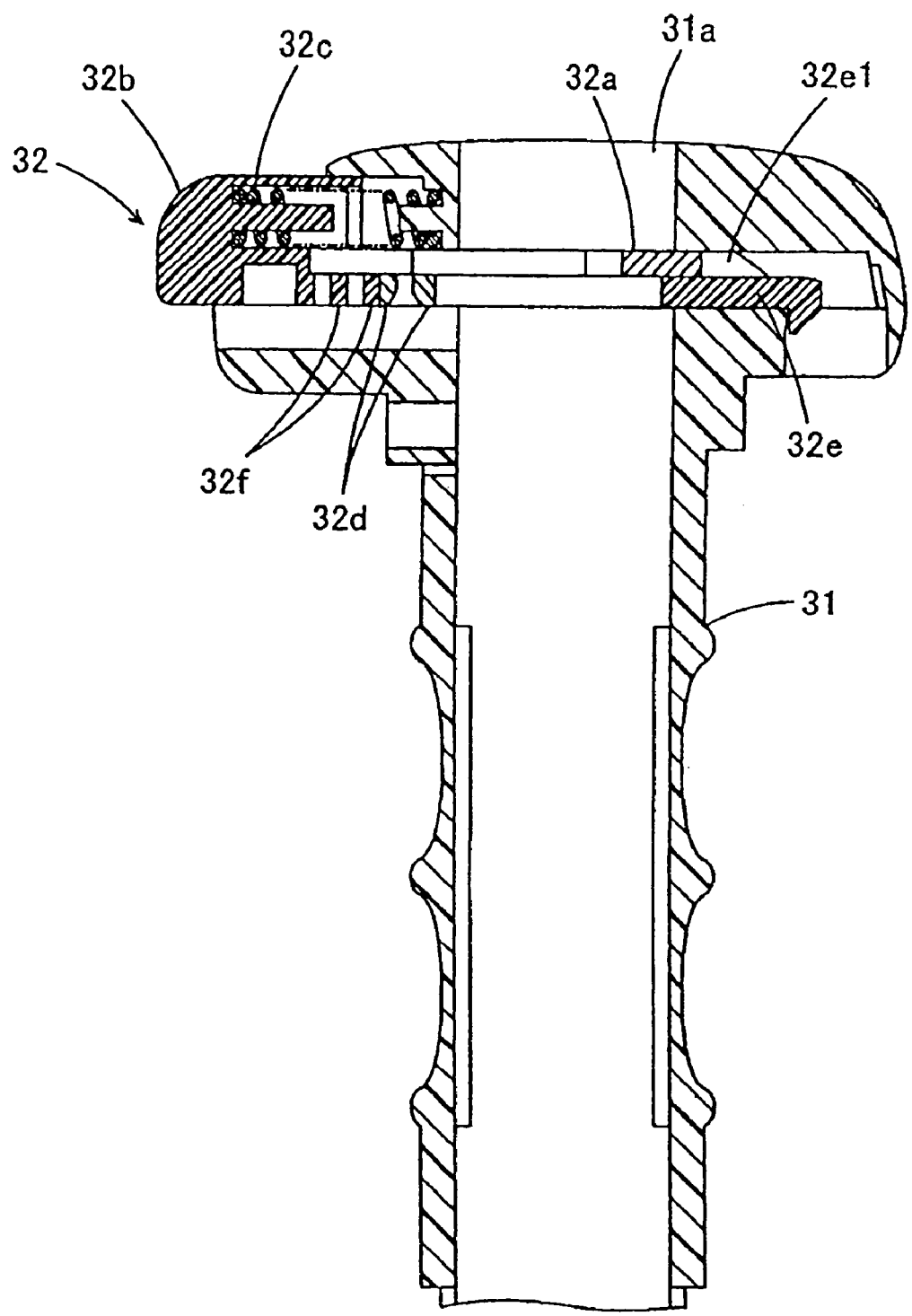
FIG. 3 shows a sectional view taken along the line A—A in FIG. 2 and showing the condition of the headrest support with a headrest stay inserted thereinto.

Each of the parallel-arranged headrest stays 21, 21 is provided on a side surface thereof with height regulating engagement portions, a first slip-off preventing engagement portion and a second slip-off preventing engagement portion. The headrest support 30 into which one headrest stay 21 is inserted is formed as shown in FIG. 2, by a cylindrical portion 31 generally constituting the headrest support, and a first locking member operating unit 32 supported on an upper end of the cylindrical portion 31. The cylindrical portion 31 is provided with a vertically extending through hole 31a, and a first locking member operating unit retaining hole 31b opened at an upper end thereof so as to face in the right-angled direction with respect to the axis of the cylindrical portion 31. The first locking member operating unit 32 is inserted into the relative retaining hole 31b from the right side thereof, while the headrest stay 21 is inserted into and retained in the through hole 31a. FIG. 3 is a sectional view taken along the line A—A in FIG. 2 and showing the condition of the first locking member operating unit 32 inserted into the relative retaining hole 31b.

The first locking member operating unit 32 is provided with a substantially flat base member 32e having a hole in a central portion thereof, and a button member 32b on which a user exerts a force. The first locking member operating unit 32 is formed so that a first metal locking member 32a and a second metal locking member 32d are fixed thereto for regulating the height of the headrest and preventing a slip-off of the headrest stay respectively. The first locking member 32a is a flat member having a projection at one longitudinal side thereof, a recess at the other longitudinal side thereof, and holes in edge portions at shorter sides thereof. The base member 32e is provided with projections 32e1 on an upper surface thereof at the corner on the opposite side of the button member 32b, a pair of locking members 32e2 being projected from the portions of the same upper surface which are at the rear side of the projections 32e1.

Accordingly, when the projections 32e1 are inserted into the holes of the first locking member 32a with the projection of the first locking member 32a disposed between the projections 32e1, the first locking member 32a can be supported on the base member 32e while preventing play from occurring on the first locking member 32. The first locking member operating unit 32 is inserted into the first locking member operating unit retaining hole 31b with a first resilient member 32c interposed between the first locking member operating unit 32 and headrest support 30. Accordingly, the first locking member operating unit 32 is urged in a normal condition toward the opening of the first locking member operating unit retaining hole 31b, and the recess of the first locking member 32a toward the same.

Figures 4A, 4B:
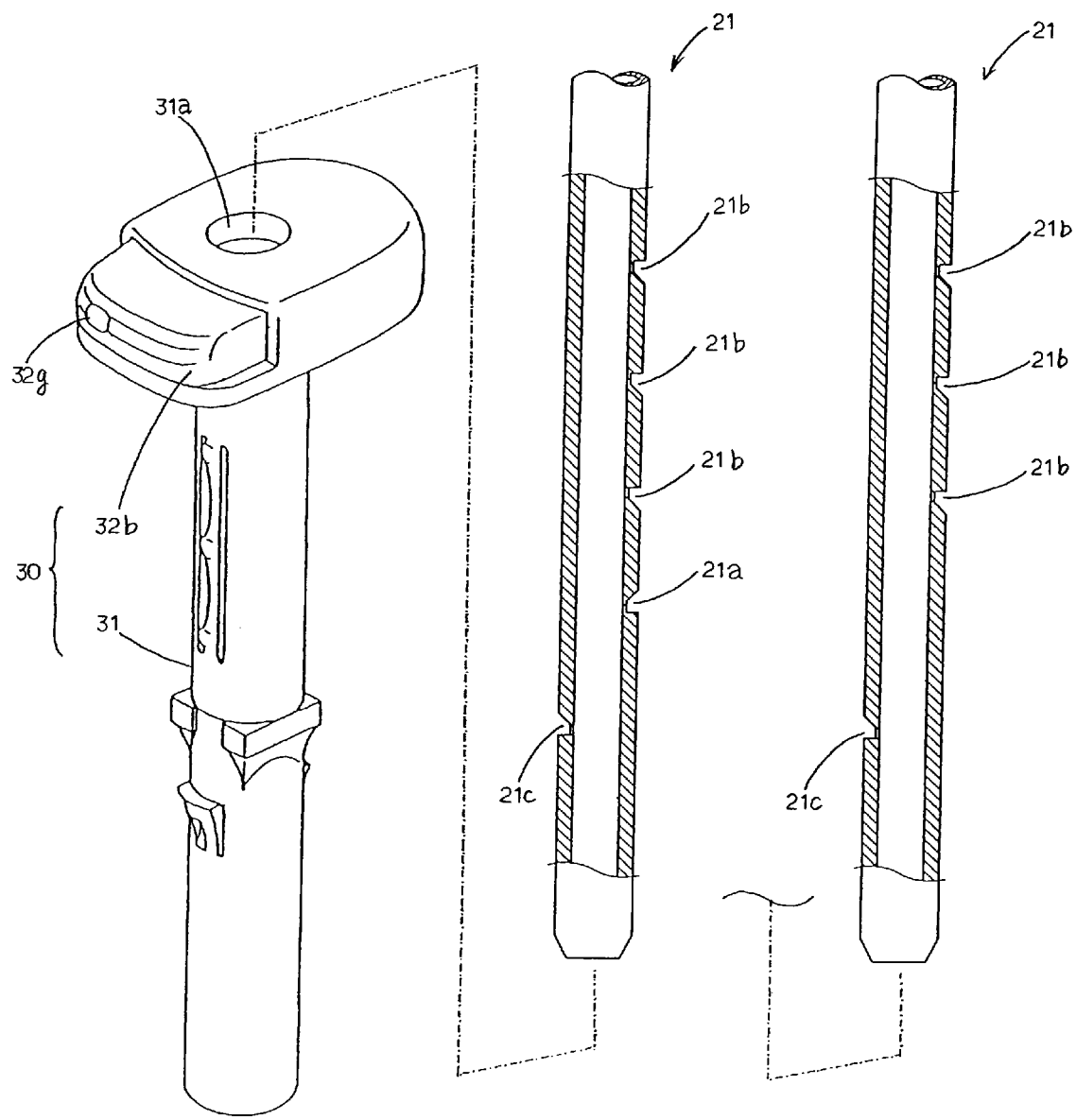
FIG. 4 shows a perspective view showing the construction of the headrest support.

On the other hand, the headrest stay 21 is provided at one side thereof with both a plurality of height regulating engagement portions 21b and a first slip-off preventing engagement portion 21a arranged in the axial direction thereof as shown in FIG. 4A. These height regulating engagement portions 21b and first slip-off preventing engagement portion 21a face in a rearward direction with respect to the direction in which the first locking member operating unit 32 is inserted into the hole 31b. When a quantity of insertion of the headrest stay 21 into the headrest support 30 is regulated, the height regulating engagement portions 21b and first slip-out preventing engagement portion 21a are opposed to the recess of the first locking member 32a. Since the recess of the first locking member 32a is given a force toward the opening of the first locking member operating unit retaining hole 31b, this recess engages in a normal condition the height regulating engagement portions 21b and first slip-off preventing engagement portion 21a when the recess faces these engagement portions 21b, 21a. FIG. 4B shows a simplified headrest stay not provided with a first slip-off preventing engagement portion.

Figure 5:
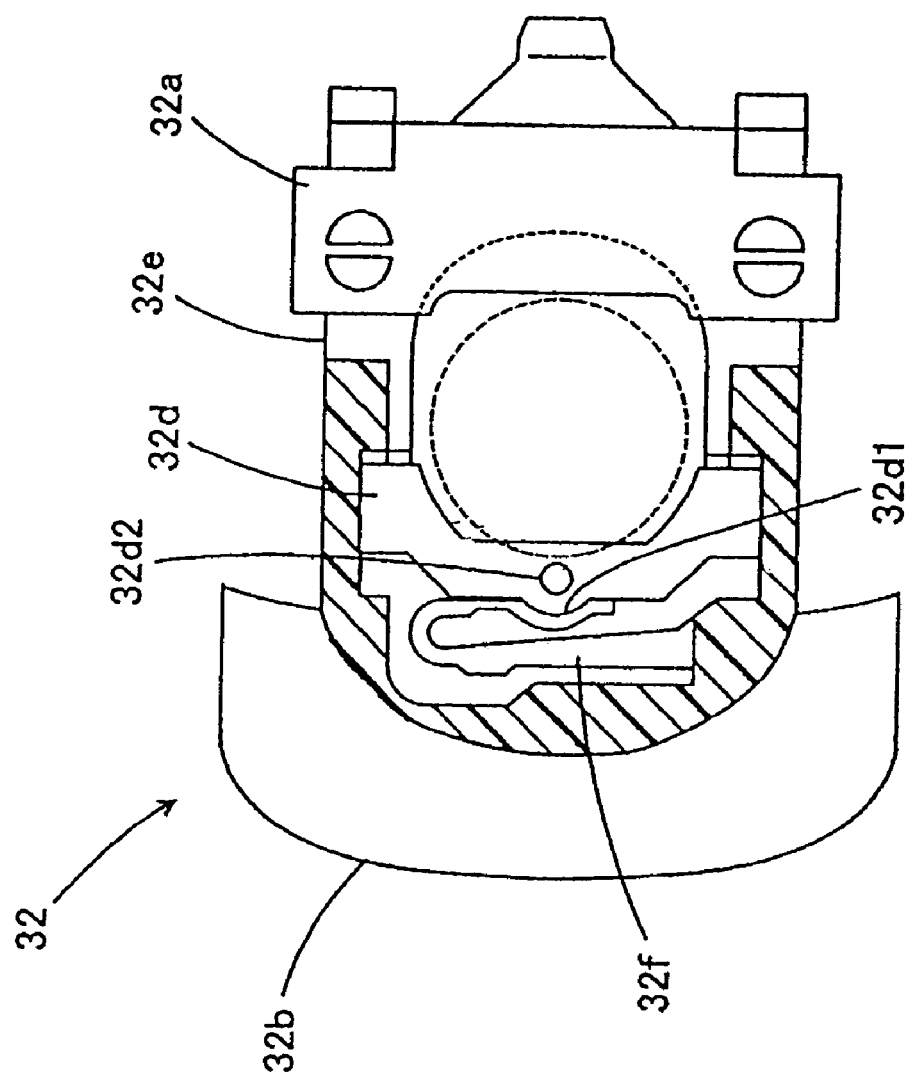
FIG. 5 shows a partially cutaway top view of a first locking member operating unit.

The present invention attains the prevention of the slip-off of the headrest stay independently of the engagement of the slip-off preventing engagement portion 21a and first locking member 32a with each other. Namely, the headrest stay 21 is provided with a second slip-off engagement portion 21c in the portion of the outer surface thereof which is on the opposite side of the height regulating engagement portions 21b and first slip-off preventing engagement portion, to allow the second locking member 32d and second slip-off engagement portion 21c to engage them with each other. FIG. 5 is a partially cutaway top view of the first locking member operating unit 32. Referring to this drawing, the second locking member 32d is a flat member formed in such a shape that an intermediate portion of one longer side of a rectangular plate and both corner portions of the other longer side thereof are cut off. An outwardly arcuate projection 32d1 is provided at an intermediate portion of the both-corner cut-off side, and a circular hole 32d2 on the inner side portion of the arcuate projection.

On the inner side of the button member 32b of the first locking member operating unit 32, a second resilient member 32f is molded so as to be integral with the first locking member operating unit. The second resilient member 32f is projected in substantially the same plane as the base member 32e from an inner peripheral side of a central hole of the base member 32e at substantially right angles to the insertion direction of the first locking member operating unit 32, and bent at substantially 180 degrees so that the second resilient member 32f comes to have a substantially U-shaped body. The portion of this second resilient member 32f which is close to a free end thereof is bent, and contacts the arcuate projection 32d1.

Therefore, when the second locking member 32d is provided in the plane of the base member 32e with the bent portion at the free end of the second resilient member 32f and the arcuate projection 32d1 engaged with each other, the second locking member 32d is urged in the insertion direction of the first locking member operating unit 32 owing to a resilient force of the second resilient member 32f. Accordingly, a force independent of that of the first resilient member 32c is exerted on the second locking member 32d, and the second slip-off preventing engagement portion 21c and second locking member 32d are engaged with each other by regulating the quantity of insertion of the headrest stay 21 with respect to the headrest support 30.

Figure 6:
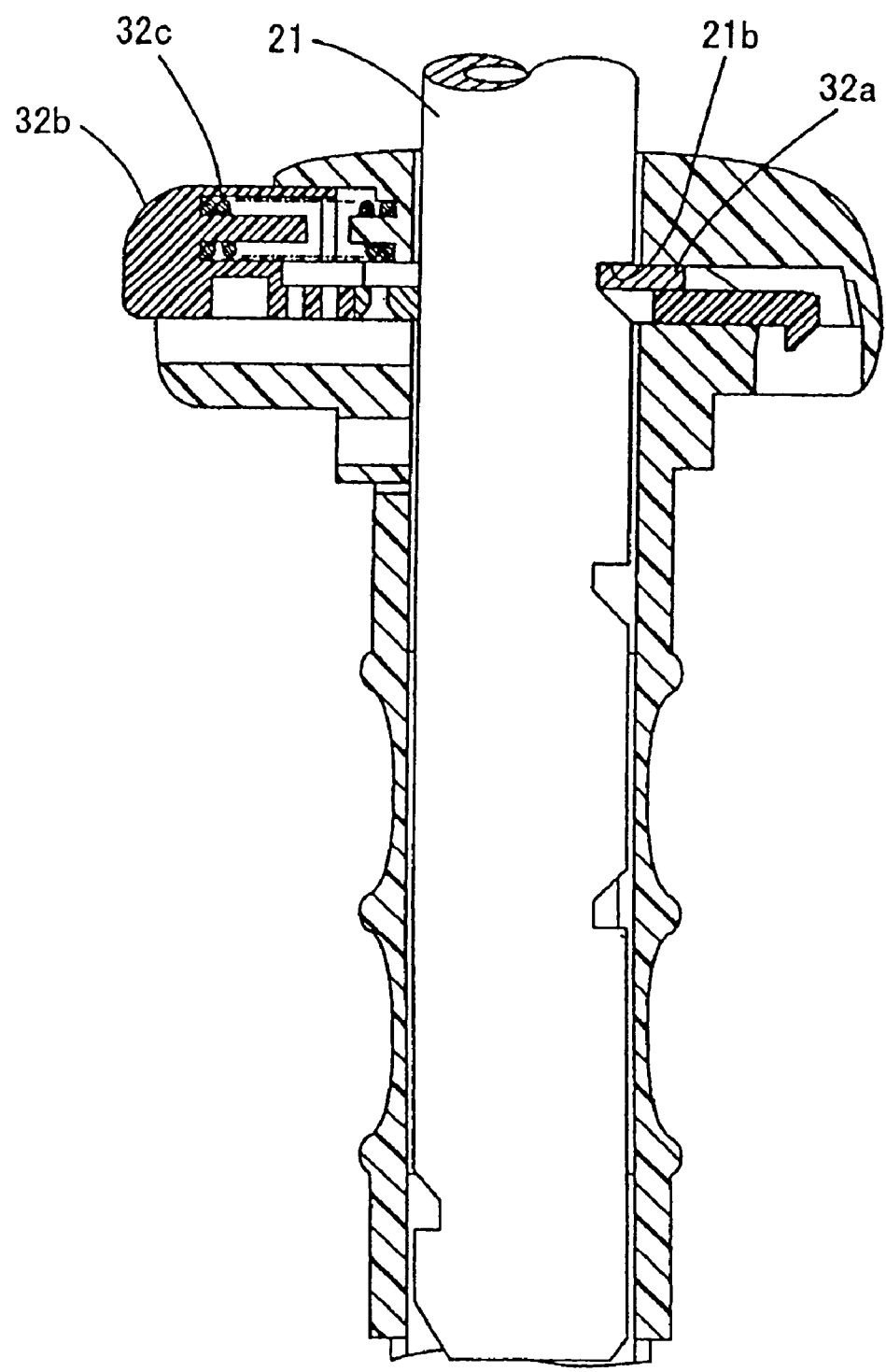
FIG. 6 shows a sectional view taken along the line A—A in FIG. 2 and showing the condition of height regulating engagement portions and a first locking member engaged with each other.
Figure 7:
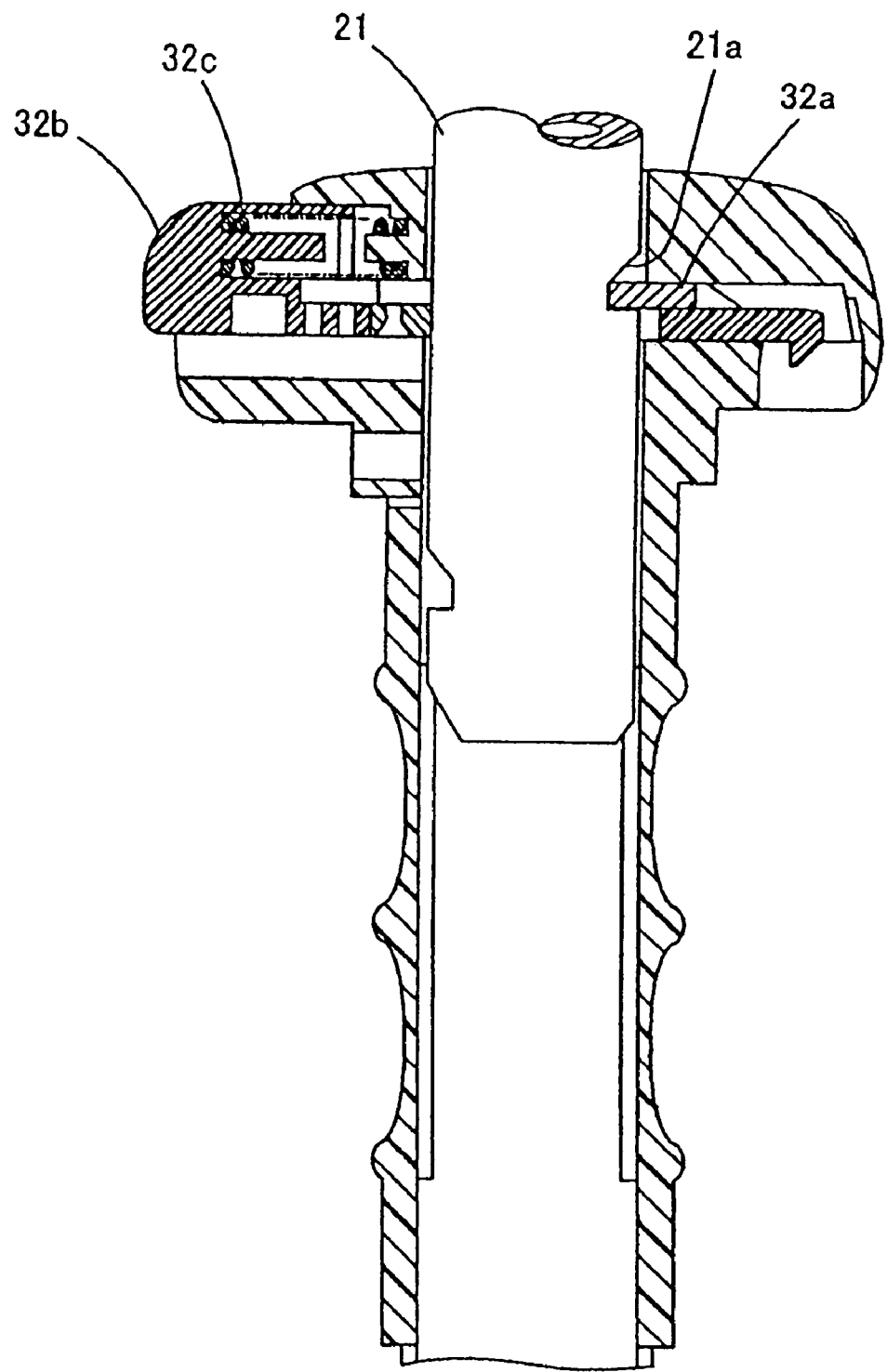
FIG. 7 shows a sectional view taken along the line A—A in FIG. 2 and showing the condition of a first slip-off preventing engagement portion and first locking member engaged with each other.

(2) Height Regulating Structure:

The present invention has a structure for carrying out adequate height regulating operations and slip-off preventing operations by utilizing the above-described force for urging each locking member and the shape of each engagement portion. FIG. 6 is a sectional view taken along the line A—A in FIG. 2 and showing the condition of the height regulating engagement portion 21b and first locking member 32a engaged with each other. As shown in this drawing, each of the height regulating engagement portions 21b is formed as a recess having at an upper part thereof a flat surface perpendicular to the axis of the headrest stay 21, and inclined at the part thereof which is under this flat surface toward an outer circumference of the headrest stay 21. The headrest stay 21 is inserted into the through hole 31a and moved up. The first locking member operating unit 32 is moved toward the headrest stay 21 by a force of the first resilient member 32c in a position in which one of the height regulating engagement portions. The first locking member 32a is engaged with each other as shown in the drawing.

Since the height regulating engagement portions 21b have a flat surface at the upper part thereof as mentioned above, the headrest stay 21 cannot further be moved down in a normal condition, so that this engaged condition is maintained. When the headrest stay 21 in the condition shown in FIG. 6 is moved up, the inclined sections provided at the lower parts of the height regulating engagement portions 21b exert a reverse force to the first resilient member 32c to cause the first locking member 32a to be moved back to the opposite side of the headrest stay 21. Therefore, the height regulating engagement portions 21b do not obstruct the upward movement of the headrest stay 21.

Even in the engaged condition shown in FIG. 6, it is possible for a user to press the button member 32b and exert a reverse force to the first resilient member 32c, and thereby move back the first locking member 32a to the opposite side of the headrest stay 21. Therefore, in height adjustment, when a user lowers the headrest 20 after he regulates the height of the headrest 20 by moving upward the headrest stay 21 to a desired position, one of the height regulating engagement portions 21b and first locking member 32a are engaged with each other, so that the headrest 20 is locked in a position of a predetermined height. Conversely, when the headrest 20 is in a high position and needed to be shifted to another position, it becomes possible to regulate the position thereof again by lowering the headrest stay 21 again by pressing the button member 32b. Accordingly, the position of the headrest 20 can be freely regulated.

Figure 10:
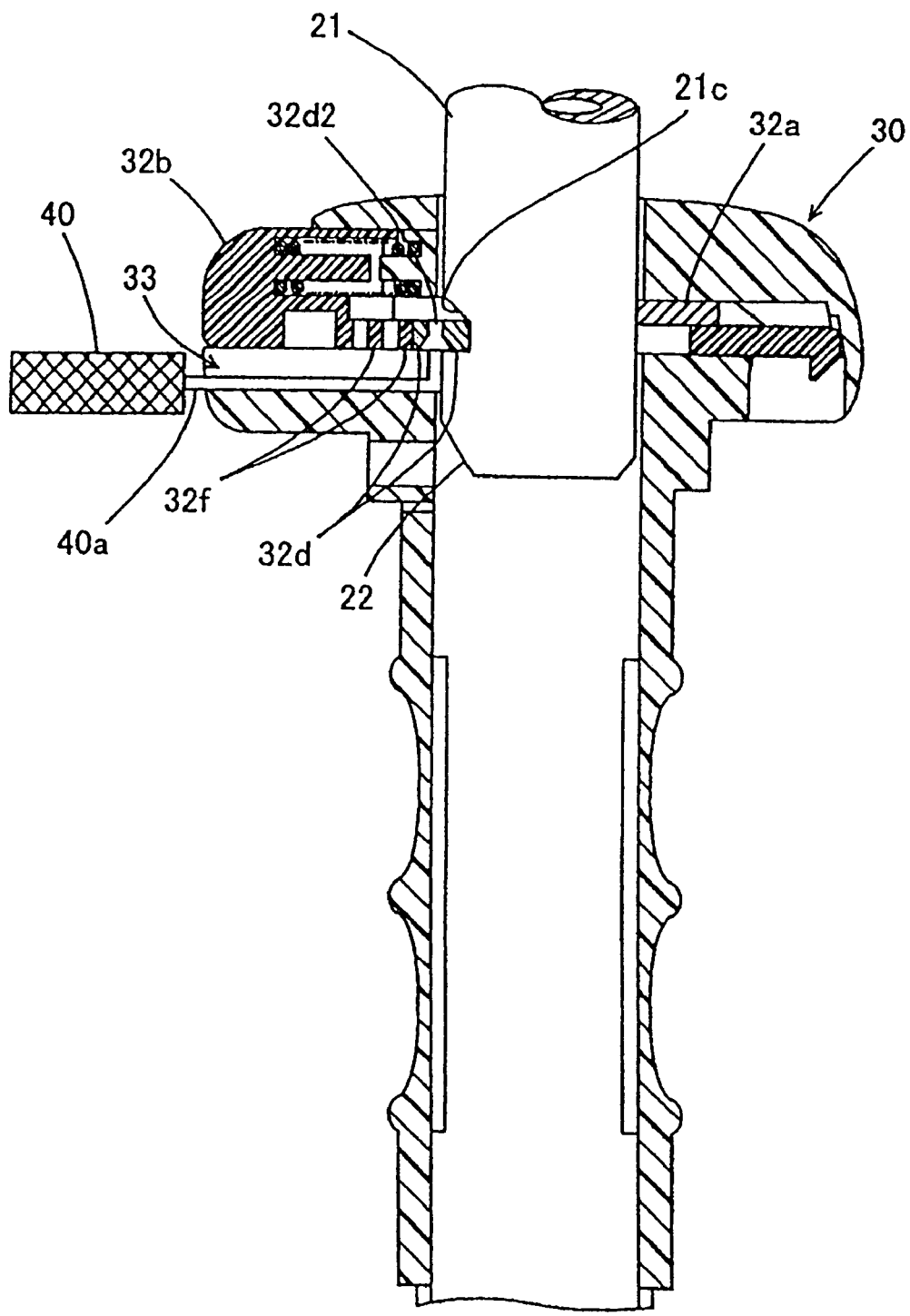
FIG. 10 shows a sectional view taken along the line A—A in FIG. 2 and showing a headrest stay disengaging operation.

(3) First Slip-off Preventing Structure:

The slip-off preventing structure includes two mechanisms, i.e. a first mechanism capable of being released easily when a user presses the button member 32b, and a second mechanism capable of being released by using other member. The first mechanism carries out the prevention of the slip-off of the headrest stay by engaging the first slip-off preventing engagement portion 21a and first locking member 32a with each other. FIG. 10 is a sectional view taken along the line A—A in FIG. 2 and showing the first slip-off preventing engagement portion 21a and first locking member 32a engaged with each other. The first slip-off preventing engagement portion 21a is formed as a recess provided below the height regulating engagement portions 21b, having at a lower part thereof a flat surface perpendicular to the axis of the headrest stay 21 as shown in the drawing, and inclined at the part thereof which is on the upper side of the flat surface toward an outer circumference of the headrest stay 21.

Figure 8:
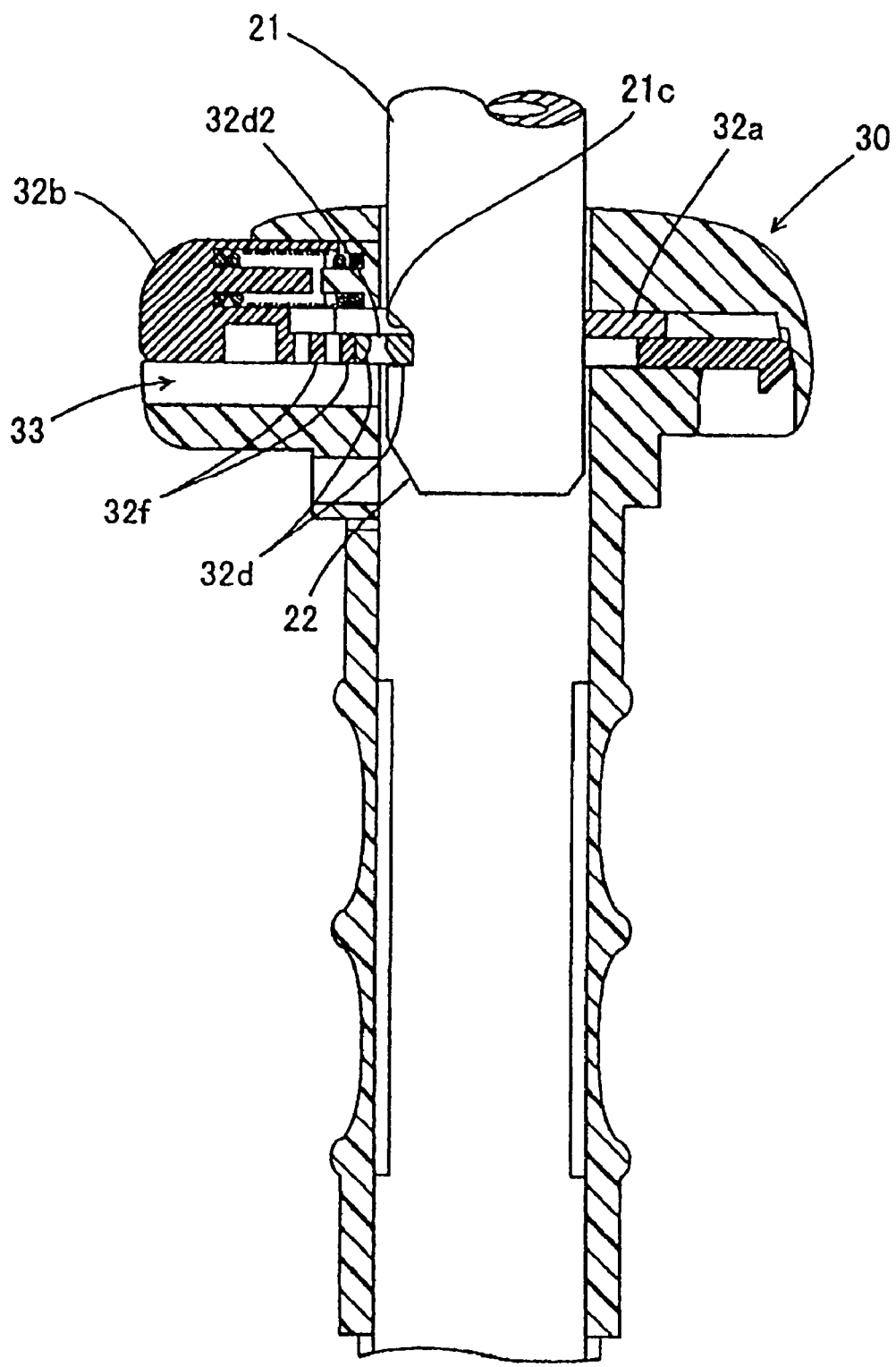
FIG. 8 shows a sectional view taken along the line A—A in FIG. 2 and showing the condition of a second slip-off preventing engagement portion and first locking member engaged with each other.

When the headrest stay 21 is inserted into the through hole 31a and moved up, the first locking member operating unit 32 is moved toward the headrest stay 21, by the force of the first resilient member 32c, into a position in which the first slip-off preventing engagement portion 21a and first locking member 32a are opposed to each other. Thus, the first slip-off preventing engagement portion 21a and first locking member 32a are engaged with each other. Since the first slip-off preventing engagement portion 21a has a flat surface at the lower part thereof as mentioned above, the engagement portion 21a in a normal condition cannot further move up the headrest stay 21, and works as a slip-off preventing member. When the headrest stay 21 in the condition shown in FIG. 8 is moved down, the inclined part, which is provided in the upper section of the first slip-off preventing engagement portion 21a, exerts a reverse force on the first resilient member 32c to cause the first locking member 32a to move back to the opposite side of the headrest stay 21. Accordingly, even when the headrest stay 21 is in a slip-off preventing condition, the headrest stay 21 can be moved down.

(4) Second Slip-off Preventing Structure:

It is, of course, possible even in the engaged condition shown in FIG. 8, to move back the first locking member 32a the opposite side to the headrest stay 21 by exerting a reverse force on the first resilient member 32c through a user's operation for pressing the button member 32b. Therefore, the user can release the slip-off preventing condition easily, so that, in this structure, the headrest 20 falls easily from the seat back 10. A second slip-off preventing structure is then provided so as to prevent the falling of the headrest 20 from the seat back 10.

In the second mechanism, a slip-off preventing operation is carried out by engaging the second slip-off preventing engagement portion 21c and second locking member 32d with each other. FIG. 10 is a sectional view taken along the line A—A in FIG. 2 and showing the engaged condition of the second slip-off preventing engagement portion 21c and second locking member 32d. The second slip-off preventing engagement portion 21c is provided in the portion of the headrest stay 21 which is further below and on the opposite side of the first slip-off preventing engagement portion 21a. The shape of the recess constituting the engagement portion 21c is identical with that of the engaging portion 21a. When the headrest stay 21 is moved up with the slip-preventing engaged condition released by the first mechanism, the second locking member 32d is moved toward the headrest stay 21 by a force of a second resilient member 32f from a position in which the second slip-off preventing engagement portion 21c and second locking member 32d are opposed to each other. The second slip-off preventing engagement portion 21c and second locking member 32d are then engaged with each other as shown in the drawing.

Since the second slip-off preventing engagement portion 21c has a flat surface at the lower part thereof as mentioned above, the engagement portion 21c cannot further move up the headrest stay 21, and works as a slip-off preventing member. Furthermore, when the headrest stay 21 in the condition shown in FIG. 8 is moved down, the inclined section provided at the upper part of the second slip-off preventing engagement portion 21c exerts a force on the second resilient member 32f to cause the second locking member 32d to be moved back to the opposite side of the headrest stay 21. As shown in FIG. 8, the headrest stay 21 is provided at the portion of a lower end thereof which is on the same side of the second locking member 32d with a tapering portion 22, by which the second locking member 32d is moved back when the headrest stay 21 is inserted into the cylindrical portion 31. Accordingly, a free end of the headrest stay 21 and second locking member 32d do not interfere with each other.

Even when in this condition the button member 32b of the first locking member operating unit 32 is pressed, the first locking member operating unit 32b cannot be moved rearward any more since a free end on the rear side of the first locking member operating unit 32 contacts with an inner wall of the headrest support 30. Moreover, even when a user tries to pull out the button member 32b, the button member cannot be pulled out since the first locking member 32a and an outer circumference of the headrest stay 21 contacts each other. Therefore, a reverse force cannot be exerted on the second resilient member 32f by the button member 32b, so that the slip-off preventing condition cannot be released by the button member 32b.

Figure 9:
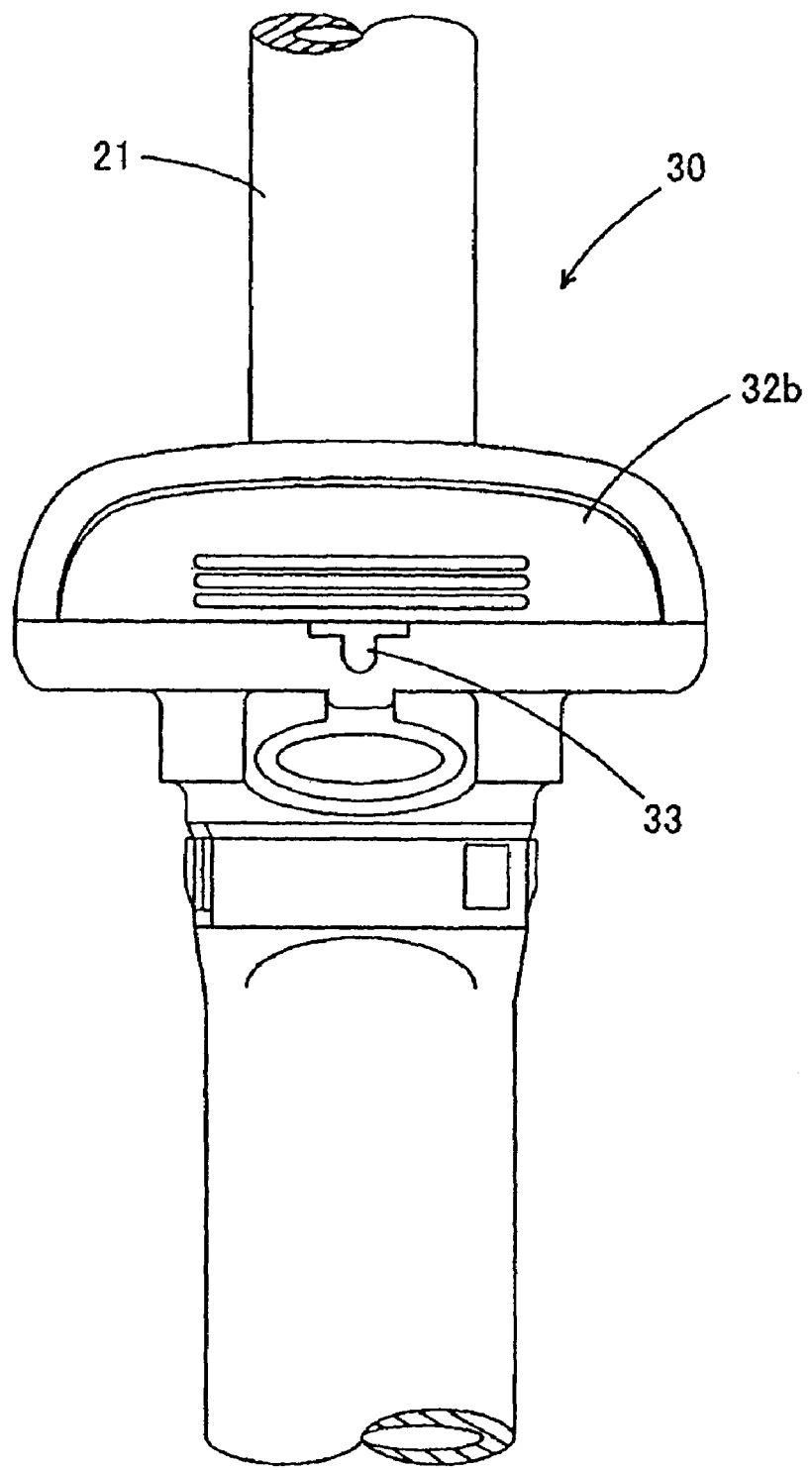
FIG. 9 shows a left side view of an upper portion of a headrest stay support.

In this mode of embodiment, an engagement releasing mechanism capable of releasing by a special tool the engagement of the second locking member 32d and second slip-off preventing engagement portion 21c with each other is formed. In a lower portion of the first locking member operating unit 32, a tool inserting passage 33 for having a free end of the special tool reach the second locking member 32d is provided. FIG. 9 is a left side view of an upper portion of the headrest support 30. Referring to the drawing, the tool inserting passage 33 has an opening a cross-sectional shape of which is substantially a combination of a part of an elliptic shape cut off in parallel with a shorter radius thereof and an elongated rectangular shape joined to the partial ellipse in parallel with the shorter radius of the ellipse. The tool inserting passage 33 extends substantially in the direction of insertion of the first locking member operating unit 32, and communicates with the through hole 31a.

The special tool 40 has an elongated member 40a a free end portion of which is bent at substantially right angles. As shown in FIG. 10, the member 40a is inserted into the opening of the tool inserting passage 33, and it is possible to have the free end thereof reach the second locking member 32d. As shown in the same drawing, it is possible that the free end of the member 40a be disposed just under the hole 32d2 of the locking member 32d with the free end of the special tool 40 inserted into a rear portion of the passage 33 so that the free end of the member 40a contacts an outer circumferential surface of the headrest stay 21. Moreover, the diameter of the free end portion of the member 40a is substantially equal to that of the hole 32d2 of the second locking member 32d, and the hole 32d2 is provided at a lower part thereof with a tapering portion so that the diameter of the hole increases in the downward direction thereof. Accordingly, when the special tool 40 is moved up in the condition shown in FIG. 10, the free end portion of the member 40a can be smoothly inserted into the hole 32d2.

Figure 11:
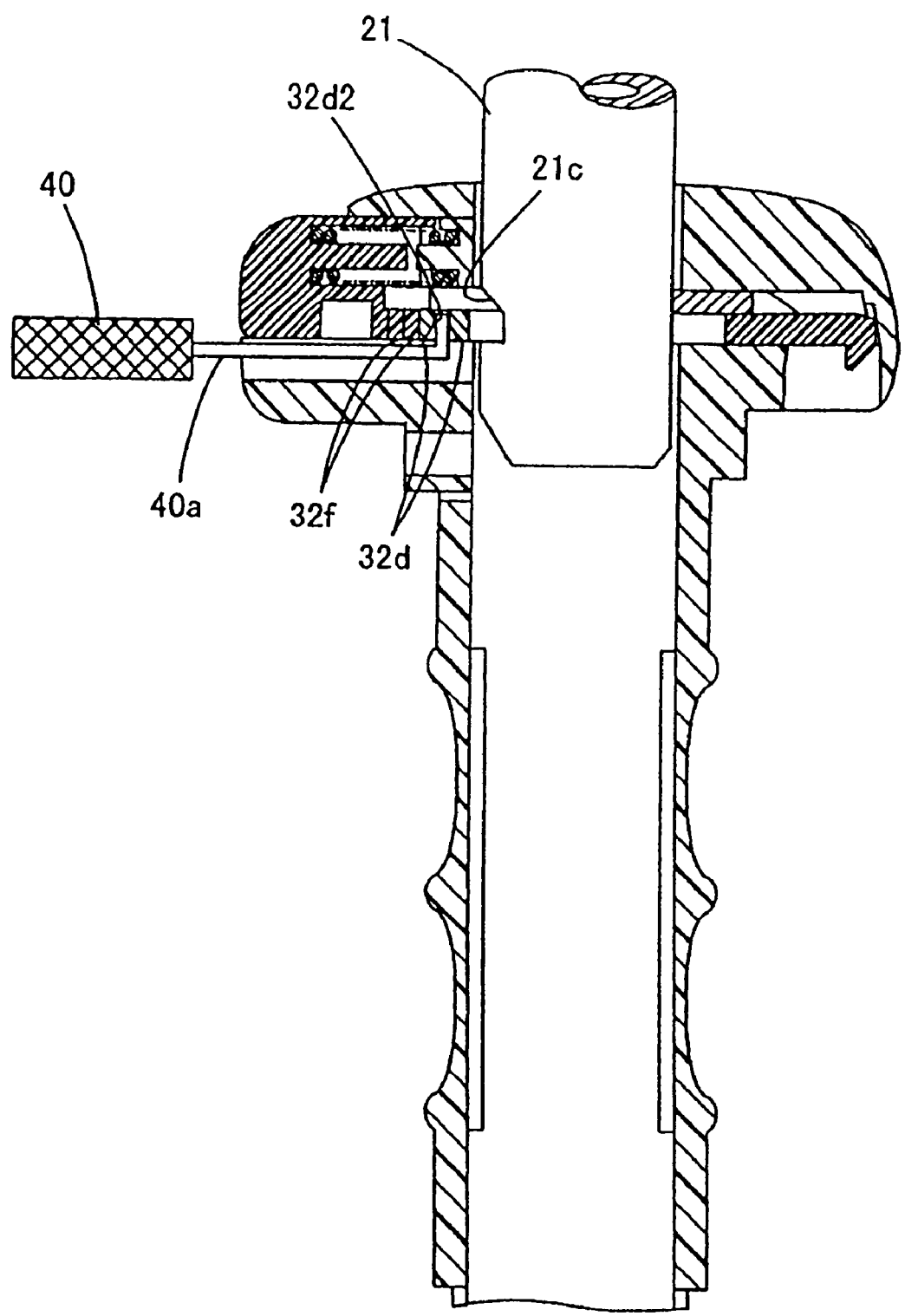
FIG. 11 shows a sectional view taken along the line A—A in FIG. 2 and showing a headrest stay disengaging operation.

When the special tool 40 is drawn in the direction opposite to the direction in which the first locking member operating unit 32 is inserted into the headrest stay with the free end portion of the member 40a inserted into the hole 32d2, a reverse force is exerted on the second resilient member 32f as shown in FIG. 11, and the second locking member 32d is moved in the direction opposite to the direction in which the first locking member operating unit 32d is inserted into the headrest stay. As a result, the engagement of the second locking member 32 and second slip-off preventing engagement portion 21c with each other is released, and it becomes possible to pull out the headrest stay 21 in the upward direction. As a structure for smoothly inserting the member 40a into the hole 32d of the second locking member 32d, various modes of structures other than that of the structure shown in FIG. 10 can be employed.

Figure 12:
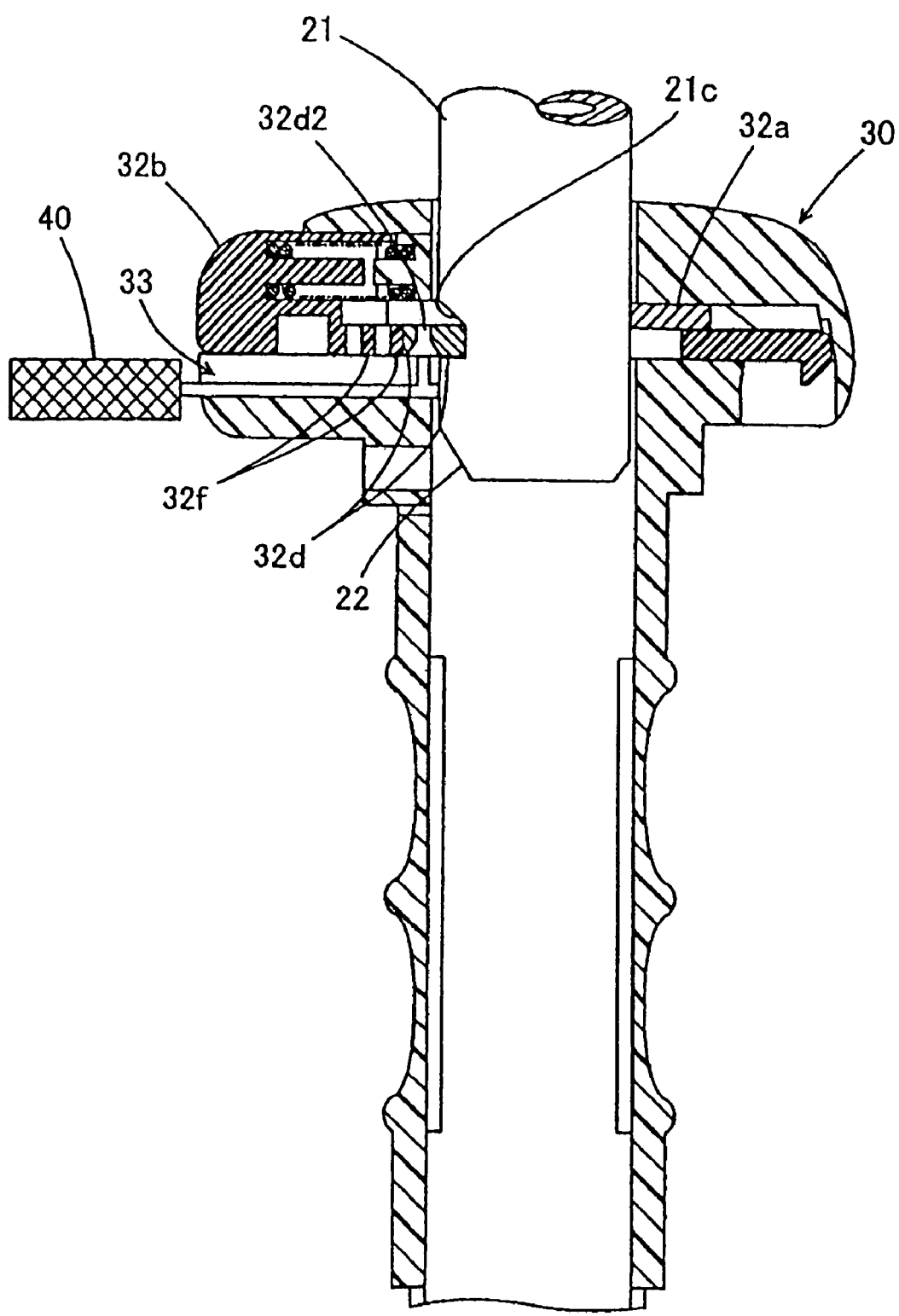
FIG. 12 shows a sectional view taken along the line A—A in FIG. 2 and showing a headrest stay disengaging operation.
Figure 13:
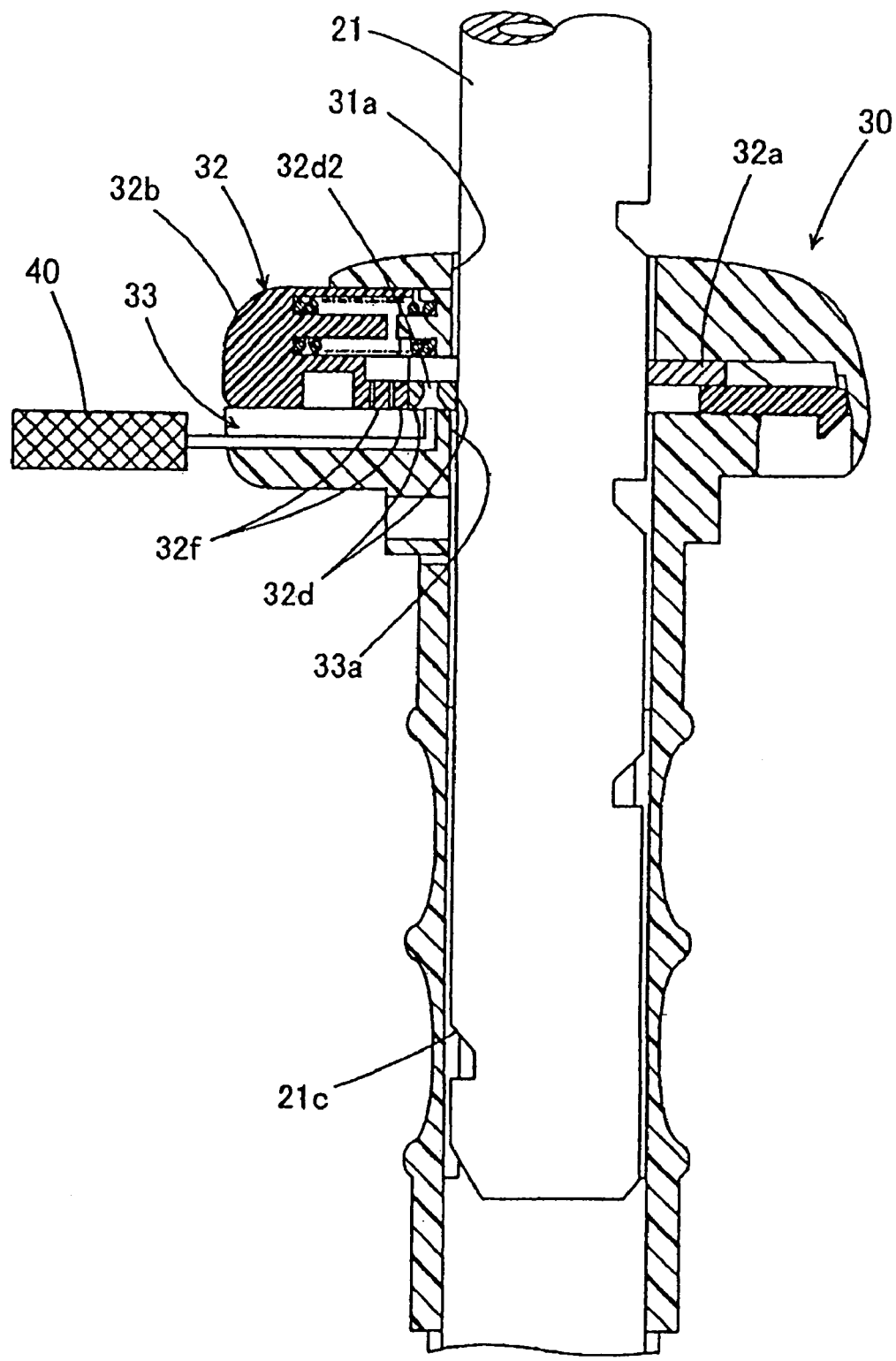
FIG. 13 shows a sectional view taken along the line A—A in FIG. 2 and showing a headrest stay disengaging operation.

It is possible to employ a structure in which the free end portion of the member 40a can be smoothly inserted into the hole 32d2 with a projection 40a1 provided on the free end of the member 40a as shown in, for example, a sectional view of FIG. 12 inserted into the tool inserting passage 33 by the special tool 40 and brought into contact at the projection 40a1 with the outer circumferential surface of the headrest stay 21. FIG. 13 is a sectional view of a headrest support 30 employing still another structure. In the headrest support 30 shown in this drawing, the construction of a rear side portion of a tool inserting passage 33 is different from that of the corresponding passage in the above-described structure.

Namely, the tool inserting passage 33 extends to a rear side in the direction in which a first locking member operating unit 32 is inserted into a headrest stay. The passage 33 is provided with a projecting portion 33a so that the passage 33 does not communicate with a through hole 31a. The projecting portion 33a can be engaged at the rearmost portion of the tool inserting passage 33 with the special tool 40 a free end portion of which is bent at right angles. When the free end of the special tool 40 and projecting portion 33a are contacted each other with the outer circumferential surface of the headrest stay 21 and second locking member 32d contacted each other as shown in FIG. 13, the free end portion of the special tool 40 is positioned just under the hole 32d2.

The inner diameter of the hole 32d2 is slightly larger than the outer diameter of the special tool 40, and this hole 32d2 is provided at a lower part thereof with a tapering portion so that an opening of the hole becomes wide. Accordingly, the hole 32d2 is formed so that the dimensional errors of each member can be absorbed. The free end portion of the special tool 40 can be inserted smoothly into the hole 32d2 with the second locking member 32d and second slip-off preventing engagement portion 21c not engaged with each other and with the outer circumferential surface of the headrest stay 21 and second locking member 32d contacted each other as shown in the drawing.

In this condition, there is a small space around the second resilient member 32f shown in the drawing. Namely, the second resilient member 32f is not completely contracted, and can be further contracted by pulling the special tool 40. Although there is a little play between the outer diameter of the headrest stay 21 and the inner diameter of the through hole 31a, the second locking member 32d can be moved back reliably by pulling the special tool 40. Therefore, the headrest stay 21 can be moved up and pulled out in the upward direction without causing the second locking member 32d and second slip-out preventing engagement portion 21c to interfere with each other.

As described above, in the second slip-off preventing structure in the present invention, the special tool 40 can be used with the second locking member 32d and second slip-off preventing engagement portion 21c engaged with each other as shown in FIG. 10 and FIG. 12. The special tool 40 can also be used with the same parts not engaged with each other as shown in FIG. 13. Various kinds of structures can be employed. Namely, no matter what condition the headrest stay 21 is in, the slip-off preventing condition can be released by using the special tool 40. As a result, a structure capable of preventing the headrest stay 21 from slipping off from the headrest support 30, and pulling out the headrest stay as occasion demands can be provided.

(5) Second Mode of Embodiment:

As described above, the present invention provides a structure in which the shape of recesses of the first slip-off preventing engagement portion 21a and height regulating engagement portions 21b is set suitable, the regulation of the height of the headrest and the prevention of the slip-off of the headrest stay being carried out by moving the first locking member 32a forward and rearward with respect to these engagement portions. In this structure, the prevention of the slip-off of the headrest stay is attained by a mechanism other than this mechanism, and released by the special tool 40, an easy fall of the headrest 20 being thereby prevented. However, the mechanism for preventing such an easy fall of the headrest 20 is not limited to the above-described mechanism but various types of structures can be employed.

Figure 14:
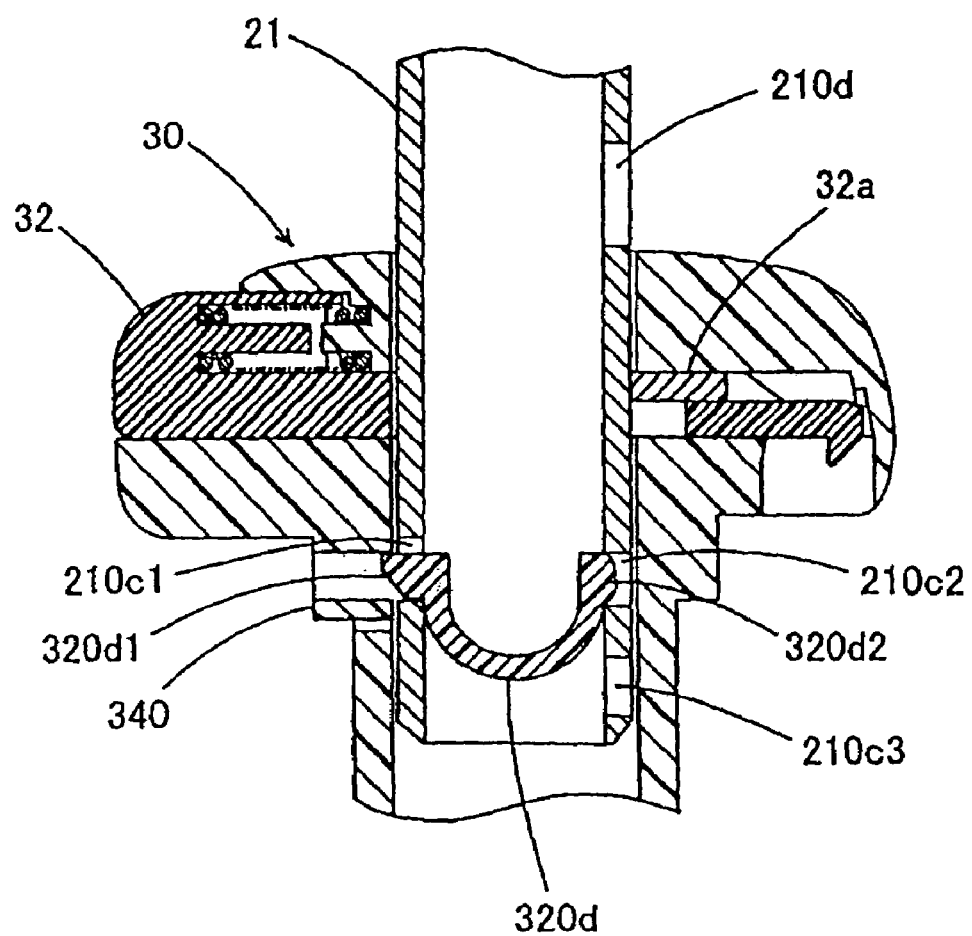
FIG. 14 shows a sectional view taken along the line B—B in FIG. 15 and showing a second mode of embodiment.
Figure 15:
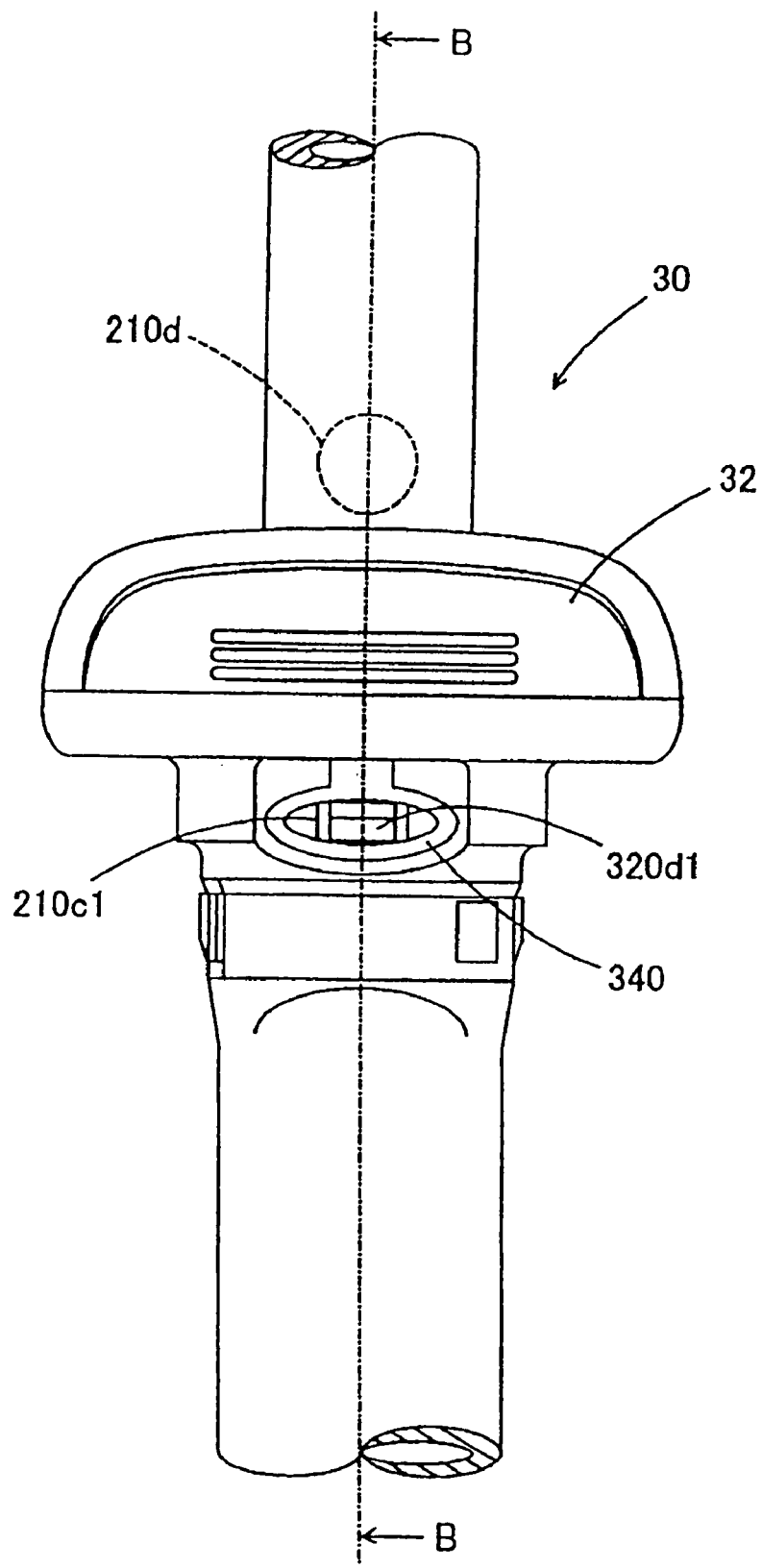
FIG. 15 shows a left side view of the second mode of embodiment.

FIG. 14 is a sectional view of a headrest support and a headrest stay in a second mode of embodiment taken along the line B—B in FIG. 15. FIG. 15 is a left side view of the second mode of embodiment. In this mode of embodiment, a second mechanism is different from the corresponding mechanism of the first mode of embodiment, and the construction of the other parts, i.e. a height regulating parts and first slip-off preventing parts is identical with that of the corresponding parts in the first mode of embodiment, so that such parts are represented by the same reference numerals that are used for the corresponding parts in the first mode of embodiment. In the second mode of embodiment, a second locking member 320d made of a resin, an independent member used for the prevention of a slip-off of the headrest is provided.

The second locking member 320d is an integral, molded member having projections 320d1, 320d2 which extend outward from both ends of a cross-sectionally substantially U-shaped body thereof. The second locking member 320d has a flexibility since it is made of a resin. The second locking member 320d can be bent in the linear direction connecting the projections 320d1, 302d2 together, in such a manner that the two projections are displaced toward and away from each other. Therefore, the projection 320d2 is a hemispherical projection extending toward the outside of the second locking member 320d, while the projection 320d1 is a substantially square projection which extends toward the outside of the second locking member 320d, and is provided with a tapering portion on one surface thereof.

The headrest stay 21 is provided with height regulating engagement portions 21b (not shown) and a first slip-off preventing engagement portion 21a (not shown) arranged in the axial direction of a wall thereof in the same manner as in the first mode of embodiment, and a insertion hole 210d is provided below the slip-off preventing engagement portion 21a. Below the insertion hole 210d, engagement holes 210c1, 210c2, 210c3 are provided in an opposed state. The engagement hole 210c1 is a hole with which the projection 320d1 of the second locking member is engaged, and the engagement holes 210c2, 210c3 holes with which the projection 320d2 of the second locking member 320d is engaged.

The part of the first locking member operating unit 32 which is on the side of the headrest support 30 is provided with a first locking member 32a for carrying out the regulation of the height of the headrest and a first slip-off preventing operation by the height regulating engagement portion 21b and first slip-off preventing engagement portion 21a, and a structure relating to the first locking member 32a is identical with that of the same member in the first mode of embodiment. However, since the second slip-off preventing operation is carried out by the second locking member 320d, the structure of the above-mentioned second locking member 32d is not employed, and such a space in the second embodiment that corresponds to the space, in which such parts are held in the first embodiment, is filled with a resin. Namely, as shown in FIG. 14, the resin is packed so that an edge thereof substantially contacts an outer circumferential surface of the headrest stay 21 with the first locking member 32a and the outer circumferential surface of the headrest stay 21 in a contacting state.

Below a position of the insertion of the first locking member operating unit 32, such a cushion 340 for a square pipe that is provided in a headrest support 30 as well in a related art headrest support structure is formed. The cushion 340 for a square pipe is a cylindrical member of a substantially elliptic cross section the axis of which extends substantially parallel to the direction of insertion of the first locking member operating unit 32. The cushion 340 constitutes a hole communicating the outer circumferential surface of the headrest support 30 with the through hole 31a. Since this cushion 340 for the square pipe is made of a resin, the cushion has an elastic force in its cylindrical body crushing direction. Accordingly, when the headrest support 30 is inserted into the square pipe 12 in the seat back 10, the headrest support 30 contacts an upper end surface of the square pipe 12 and is slightly crushed. As a result, a downward elastic force is exerted on the square pipe 12, so that the headrest support 30 can be supported without causing play to occur between the square pipe 12 and headrest support 30.

Since this cushion 340 for the square pipe is a communicating hole, the cushion is opened in the through hole 31a as well, and the cushion 340 faces the engagement hole 210c1 in the condition in which the headrest stay 21 is inserted into the headrest support 30 by a predetermined quantity. The quantity of projection of the projection 320d1 is larger than the wall thickness of the headrest stay 21, and, as shown in FIG. 14, it is possible that the projection 320d1 passes through the engagement hole 210c1 and engages the opening of the cushion 340 for the square pipe which is on the side of the headrest stay 21.

Figure 16:
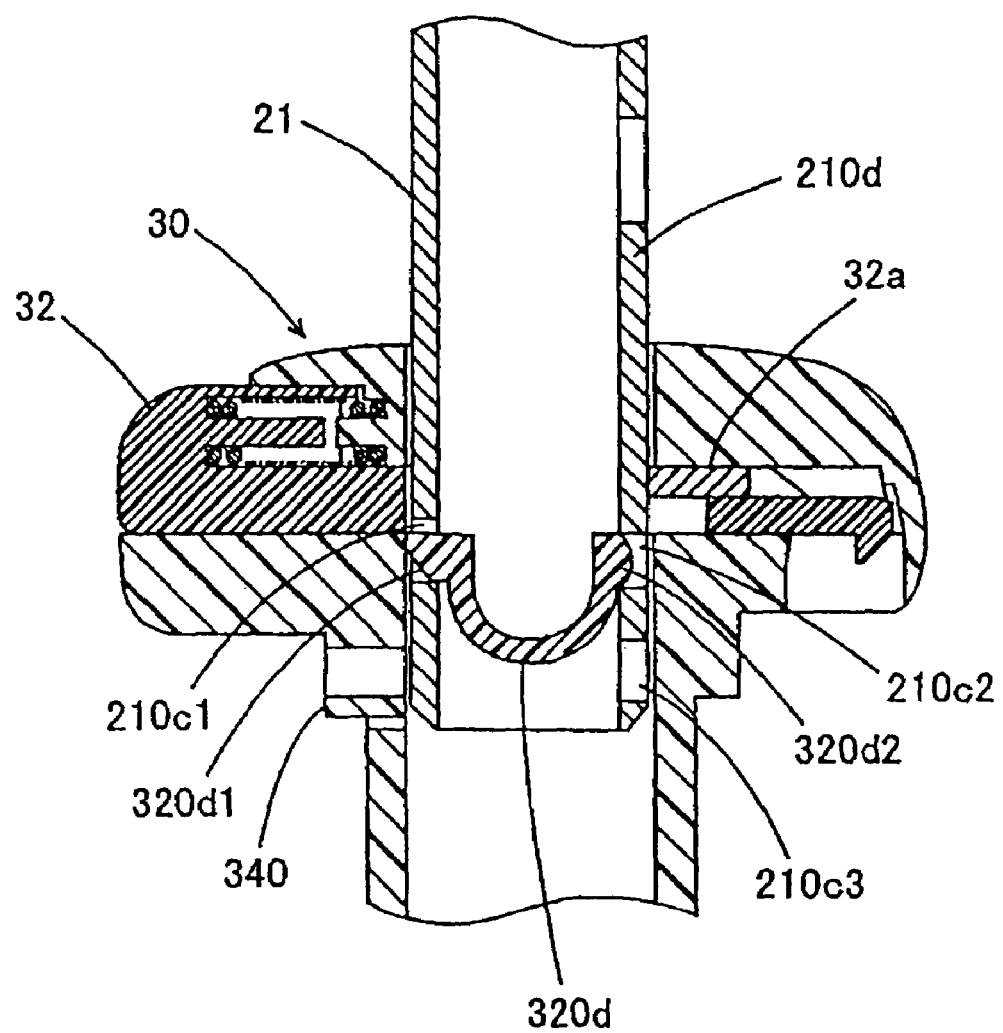
FIG. 16 shows a sectional view taken along the line B—B in FIG. 15 and showing a headrest stay inserted in a headrest support.

Even when an attempt to merely pull out the headrest stay 21 upward is made in this engaged condition, the headrest stay cannot be moved up higher than the position shown in the drawing since an upper surface of the projection 320d1 is flat. The projection 320d1 works as a slip-off preventing member. Since the projection 320d1 is provided with a tapering portion on a lower surface thereof, a free end portion of the headrest stay 21 can be inserted smoothly into the through hole 31a with the projection 320d1 of the second locking member 320d engaged with the engagement hole 210c1 and with the projection 320d2 engaged with the engagement hole 210c2. Namely, when the headrest stay 21 is lowered with the free end portion thereof inserted into the through hole 31a, the tapering portion of the projection 320d1 contacts an edge of an upper opening of the through hole 31a, and is moved to the inner side of the headrest stay 21. As a result, the headrest stay 21 can be lowered with the projection 320d1 retracted as shown in FIG. 16.

When the projection 320d1 faces the opening of the cushion 340 for the square pipe during a downward movement of the headrest stay 21, the projection 320d1 self-returns as shown in FIG. 14, to engage the opening of the cushion 40 for the square pipe. In order to further move down the headrest stay 21, a force for retracting the projection 320d1 toward the headrest stay 21 is exerted thereon through an induction operation of the tapering portion to release the engagement of the projection 320d1 with the cushion 340 for the square pipe, and enable the headrest stay 21 to be moved down. Even when an attempt to move up the headrest stay 21 again is made at this time, the projection 320d1 and opening of the cushion 340 are engaged with each other, and the headrest stay 21 is not moved up any more unless a special tool is used.

Namely, even in this mode of embodiment, an easy fall of the headrest 20 is prevented. In order to carry out a disengagement operation for the purpose of pulling out the headrest stay 21, a special tool 400 is used. The insertion hole 210e is a hole into which the special tool 400 is to be inserted. In this mode of embodiment, a free end of the special tool 40 is pressed against the second locking member 320d in the interior of the headrest stay 21, and the engagement of the second locking member 320d with the cushion 340 for the square pipe is thereby released.

Figure 17:
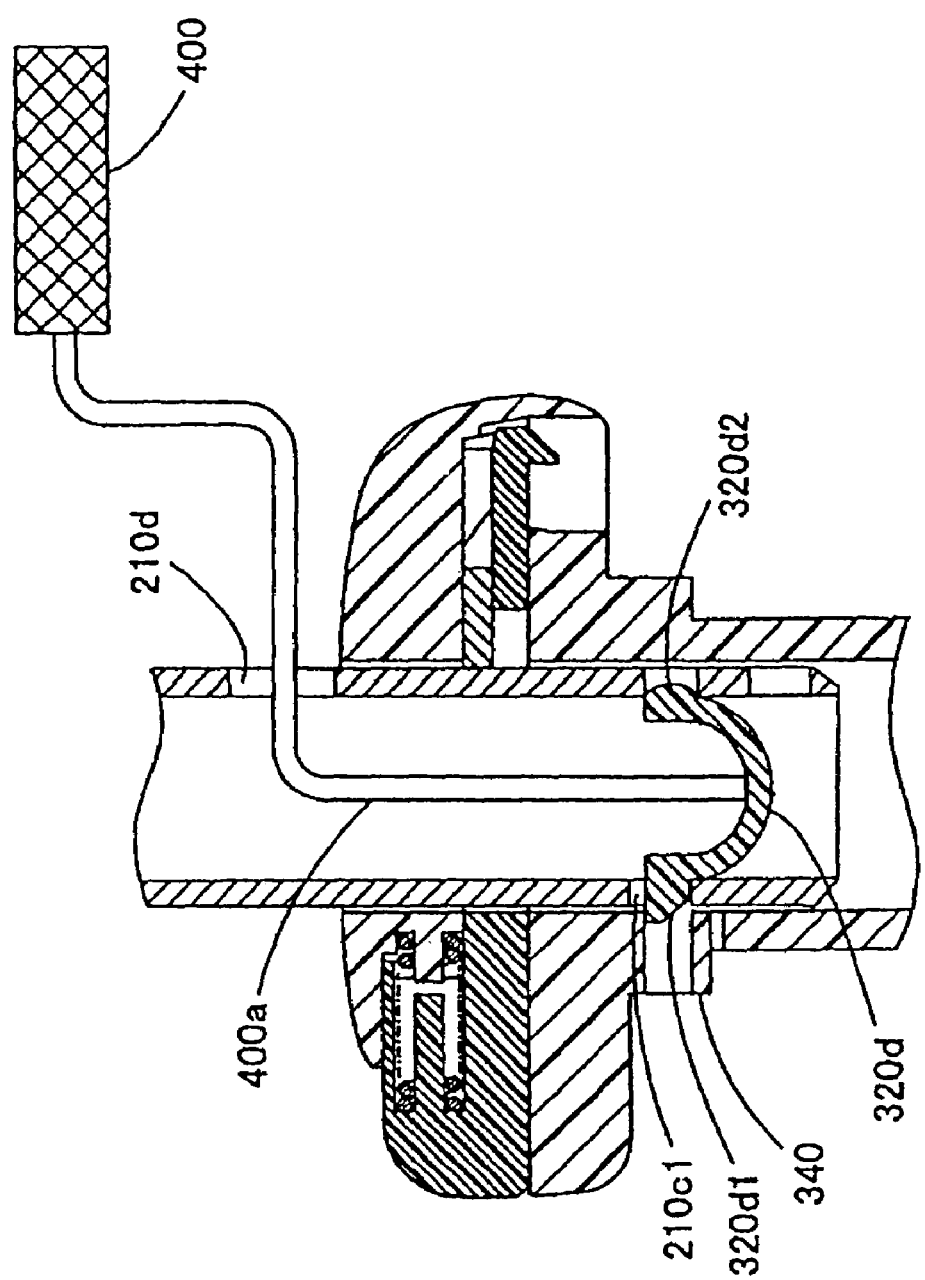
FIG. 17 shows a sectional view taken along the line B—B in FIG. 15 and showing a headrest stay disengaging operation.

As shown in FIG. 17, the special tool 400 has a rod type member 400a, a part of which is bent at substantially right angles so as to enable the rod type member 400a to be inserted from the free end portion thereof into the insertion hole 210d. It is possible in the interior of the headrest stay 21 to have the free end of the rod type member 400a reach the second locking member 320d, and have the free end press the second locking member 320d. When the second locking member 320d is pressed by the free end of the rod type member 400a, the second locking member 320d is bent, and the projection 320d1 and projection 320d2 come close to each other to cause the projection 320d1 and engagement hole 210c1 to be disengaged from each other. Therefore, the headrest stay 21 becomes able to move up, thereafter and can be pulled out from the headrest support 30.

Figure 18:
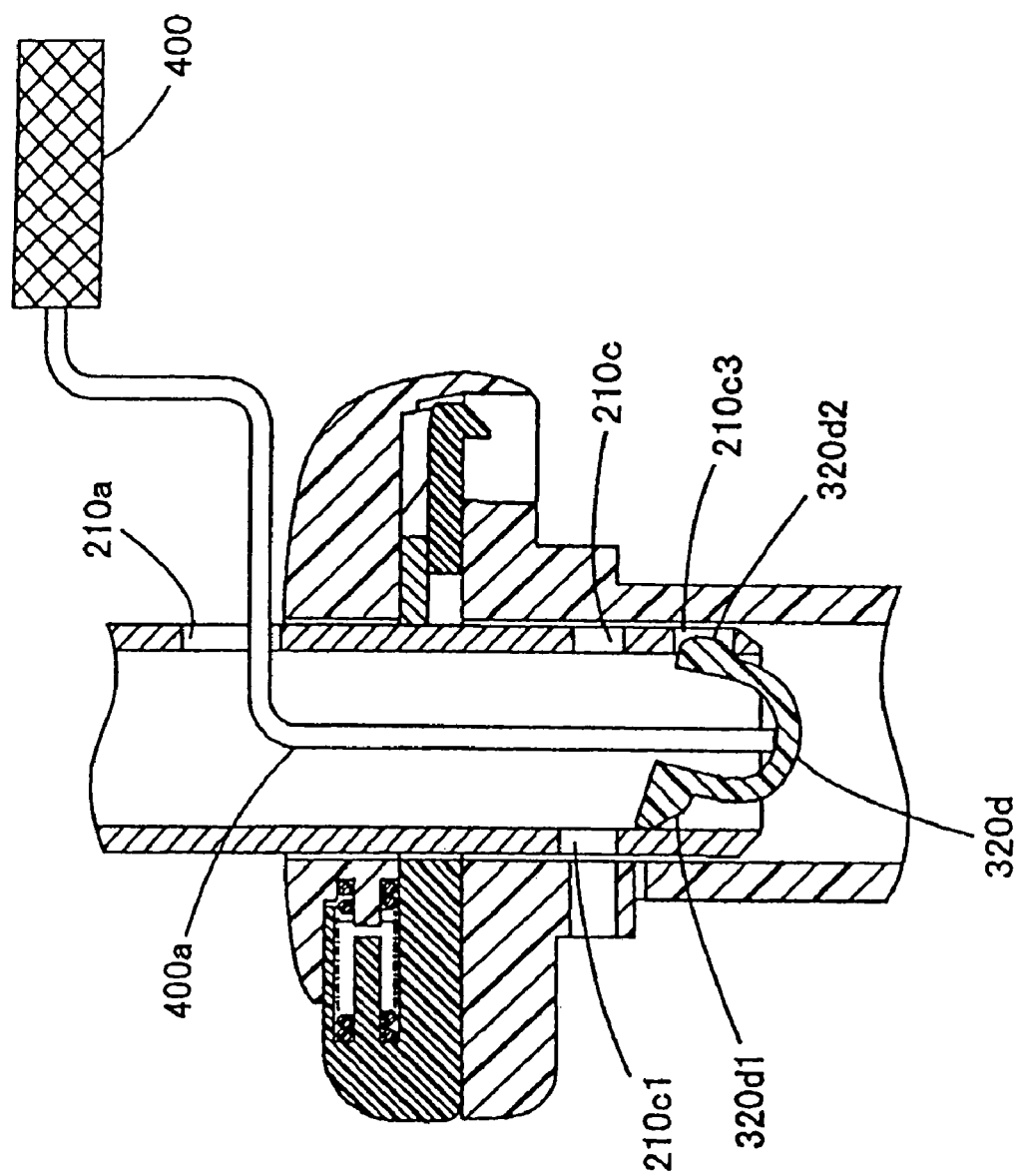
FIG. 18 shows a sectional view taken along the line B—B in FIG. 15 and showing a headrest stay disengaging operation.

When the projection 320d1 and engagement hole 210c1 are disengaged from each other by the free end of the rod type member 400a, the locking member 320d moves down. An engagement hole 210c3 is provided below the engagement hole 210c2, and, during a lowering movement of the second locking member 320d, the projection 320d2 engages the engagement hole 210c3 as shown in FIG. 18. The second locking member 320d is made of a resin, and a bending force for opening a U-shaped portion thereof outward works thereon, so that the second locking member 320d engages the engagement hole 210c3. As a result, the second locking member 320d in the condition shown in FIG. 18 is maintained in the same condition without falling. Accordingly, the second locking member 320d is not left in the seat back 20 after falling from the headrest stay 21.

Figure 19:
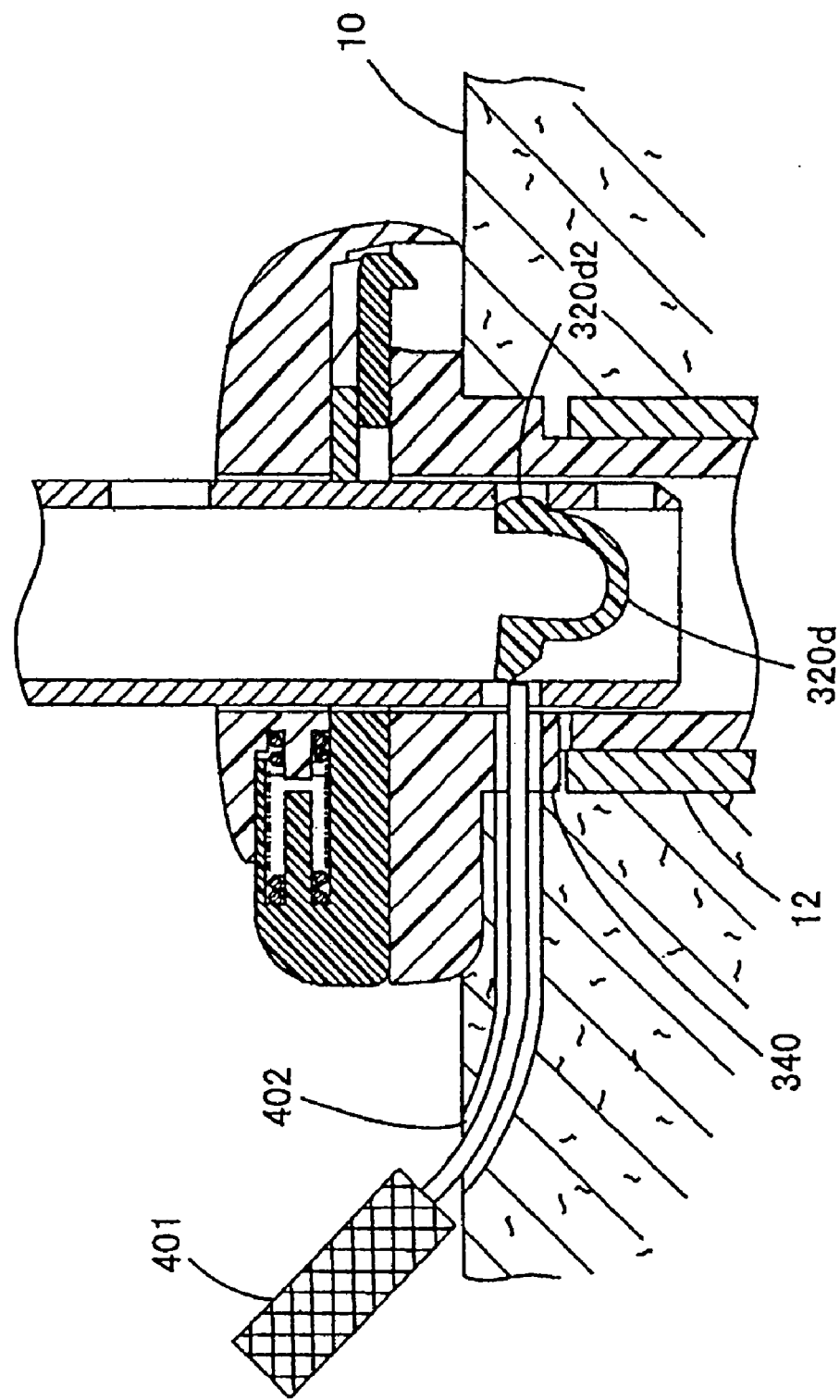
FIG. 19 shows a sectional view taken along the line B—B in FIG. 15 and showing a headrest stay disengaging operation.

In this mode of embodiment, the second locking member 320d has only to be an elastic member exerting a bending force on the inner circumferential surface of the headrest stay 21, and is not limited to the substantial U-shape. For example, a hemispherical locking member can also be formed. The structure for disengaging the projection 320d1 and engagement hole 210c1 from each other is not limited to a structure using the above-mentioned specially shaped tool. Namely, although the cushion 340 for the square pipe is buried in an upper side of the seat back 10 if a small hole 402 is made as shown in FIG. 19 and a passage which communicates this small hole and an opening in the outer circumferential wall of the headrest support 30 in the cushion 340 for the square pipe are provided, the insertion of a free end portion of a special tool 401 having a bent, elongated member into the small hole 402 in the upper side of the seat back 10 enables the above-mentioned engaged condition to be released.

Figure 20:
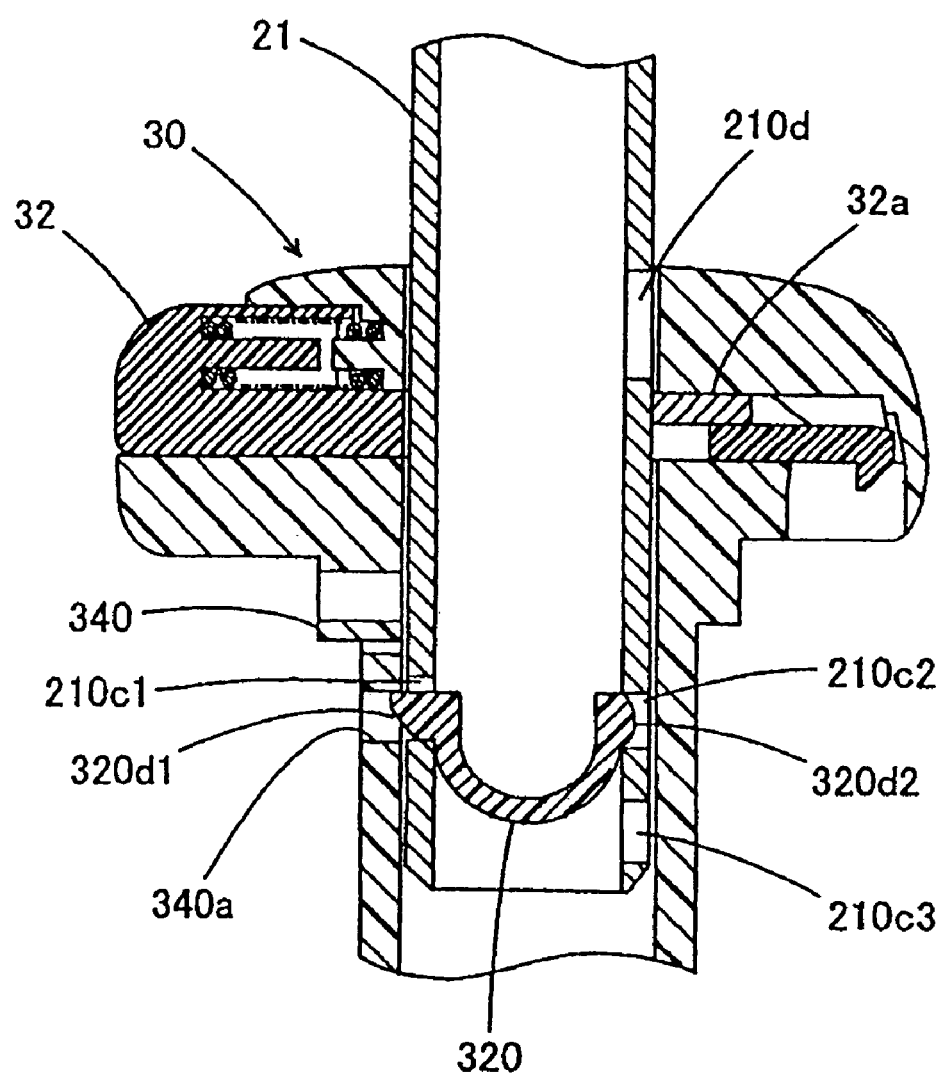
FIG. 20 shows a sectional view taken along the line B—B in FIG. 15 and showing another construction of a hole for engaging a projection therewith.

The hole for engaging this projection 320d1 therewith is not limited to the cushion 340 for the square pipe either, and the projection 320d1 may be formed so as to be engaged with a hole 340a, which is provided in a portion of the headrest support 30 as shown in FIG. 20. A structure for preventing a fall of the second locking member 320 is not limited to the engagement hole 210c3, either. For example, when the second locking member 320d and headrest stay 21 are connected together by a string-like member, a fall of the second locking member 320d can be prevented by this string-like member.

Figure 21:
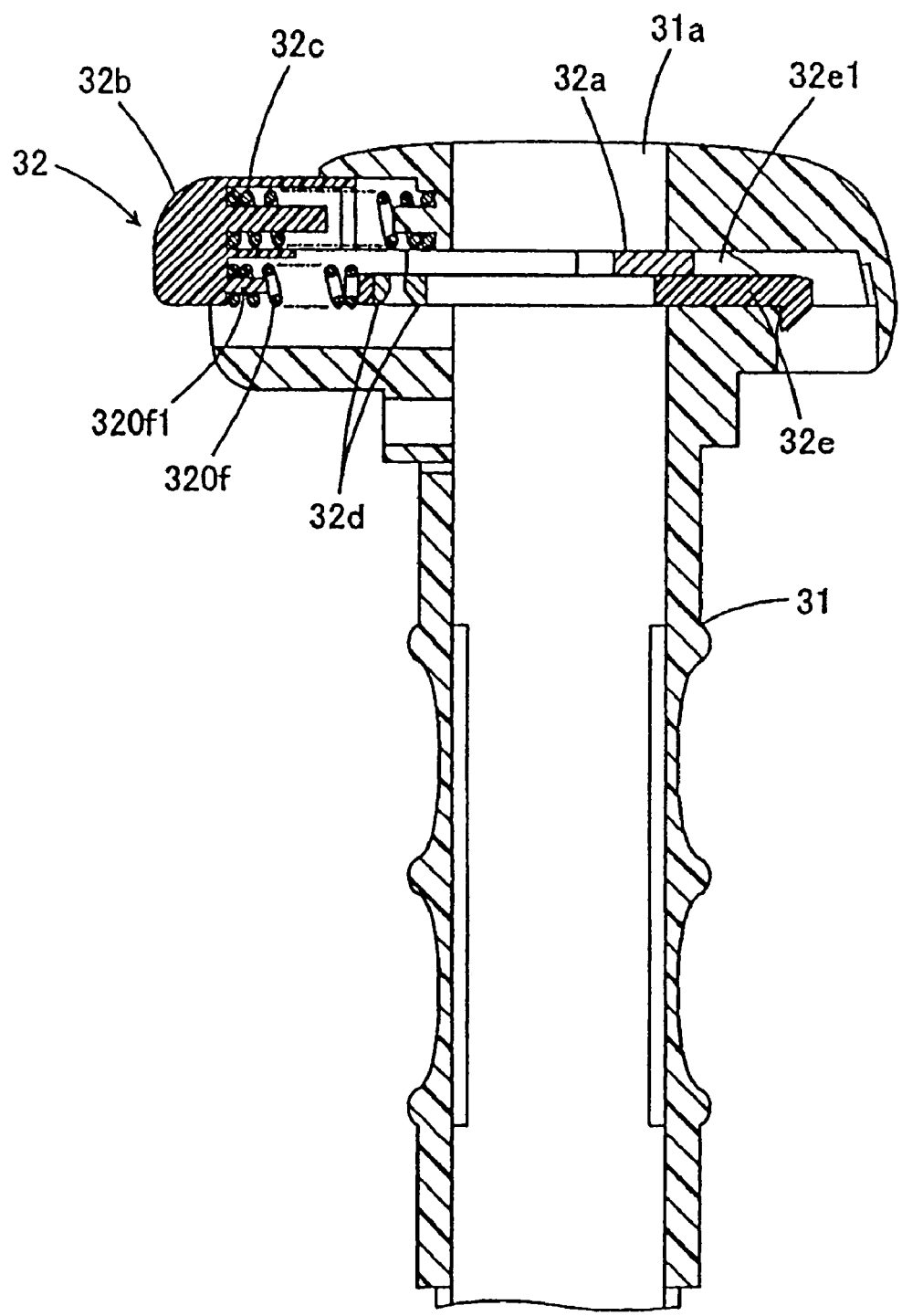
FIG. 21 shows a sectional view of a third mode of embodiment with a headrest stay inserted in a support member.
Figure 22:
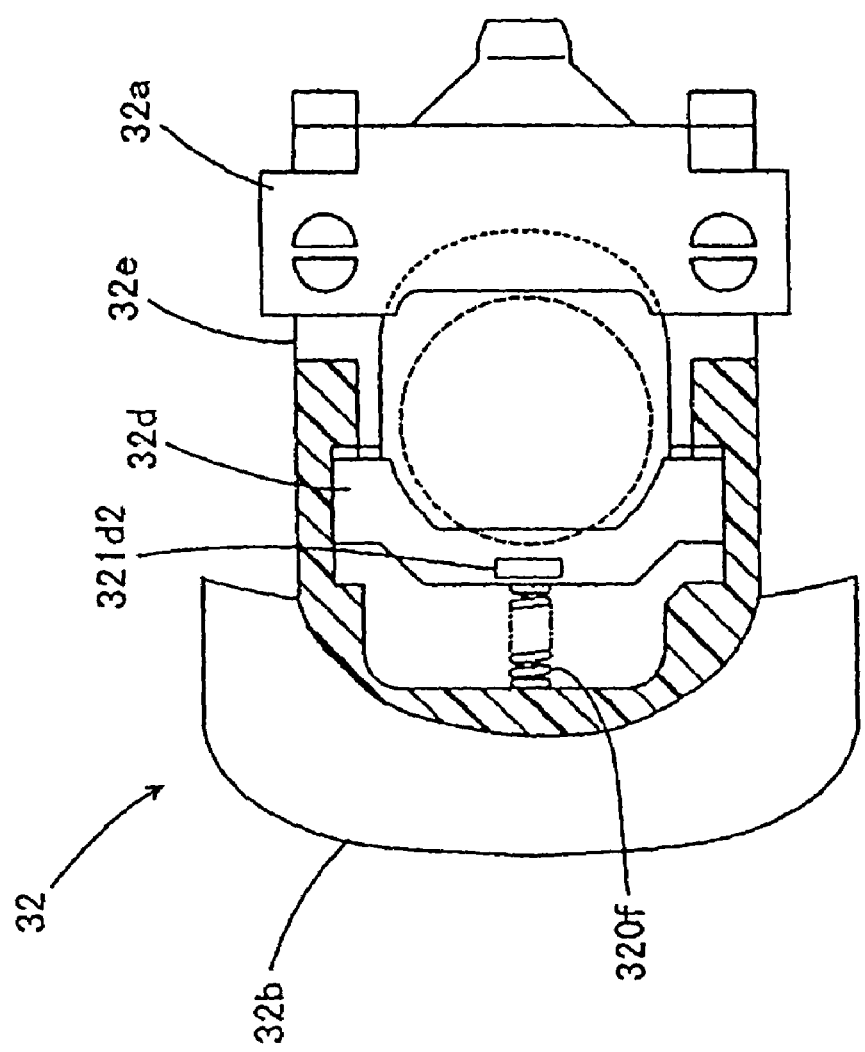
FIG. 22 shows a partially cutaway top view of a first locking member operating unit in the third mode of embodiment.

(6) Third Mode of Embodiment:

Furthermore, in a minute part of the present invention, a structure different from that in the above-described modes of embodiment can also be employed. For example, various types of structures can be employed for the second resilient member. FIG. 21 is a sectional view of the condition in which a headrest stay is inserted into a support member in the third mode of embodiment, and FIG. 22 is a partially cutaway top view of a first locking member operating unit in the third mode of embodiment. In the third mode of embodiment, a spring is employed as a second resilient member, and the construction of the other parts is identical with that of the corresponding parts of the first mode of embodiment.

As shown in the drawing, a second resilient member 320f is a spring, and an insertion member 320f1 into which the second resilient member 320f is inserted is provided in the first locking member operating unit. The second resilient member 320f is inserted and supported in the first locking member operating unit, and the axis thereof is set in the direction of the second locking member 32d. Accordingly, an end portion of the second resilient member 320f contacts the second locking member 32d and a resilient force is exerted thereon, so that the second resilient member 320f is urged toward the insertion direction of the first locking member 32. Therefore, a force independent of that of the first resilient member 32c can also be exerted on the second locking member 32d in this structure.

The hole 32d2 used to insert the free end portion of the special tool 40 thereinto is not limited to the above-mentioned circular hole, either, and the hole 32d2 may be rectangular instead as shown in FIG. 22. Even a rectangular hole 321d2 serves the purpose as long as the free end portion of the special tool 40 can be inserted thereinto. When the special tool 40 is pulled with the same free end portion inserted into the hole 321d2, in the direction opposite to the direction in which the first locking member operating unit 32 is inserted into the headrest stay, a reverse force is exerted on the second resilient member 320f. Therefore, the second locking member 32d is moved in the direction opposite to the direction in which the first locking member operating unit 32 is inserted into the headrest stay, and the second locking member 32d and second slip-off preventing engagement portion can be disengaged from each other.

Figure 23:
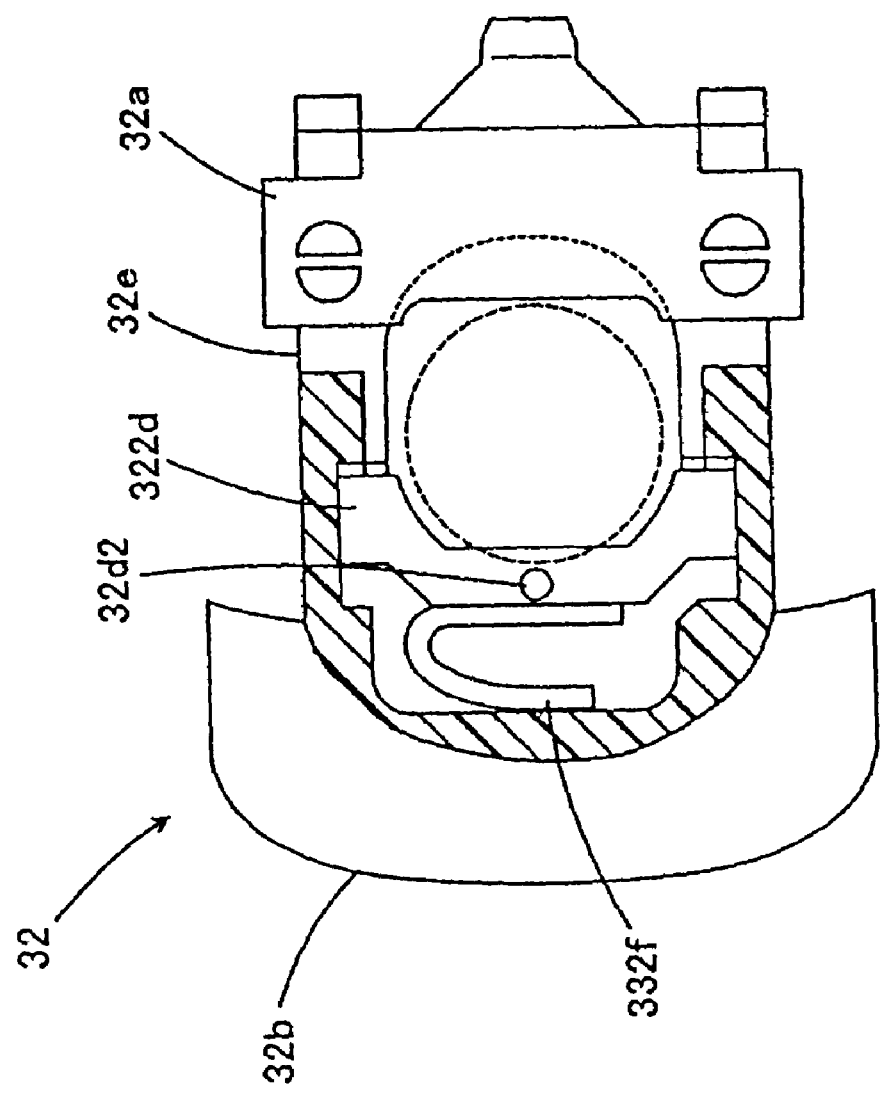
FIG. 23 shows a partially cutaway top view of a first locking member operating unit in a fourth mode of embodiment.
Figure 24:
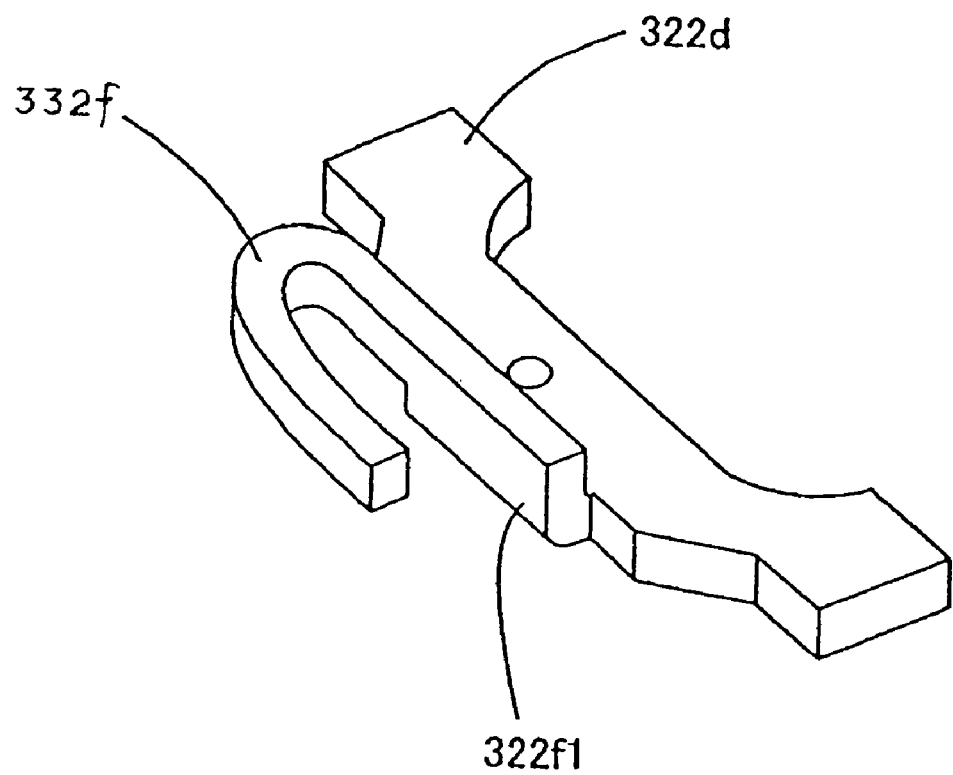
FIG. 24 shows a perspective view of a second locking member in the fourth mode of embodiment.

(7) Fourth Mode of Embodiment:

FIG. 23 is a partially cutaway top view of a first locking member operating unit in a fourth mode of embodiment, and FIG. 24 is a perspective view of a second locking member in the fourth mode of embodiment. Referring to these drawings, a second elastic member and a second locking member are made of an integral member, and the construction of the other parts is identical with that of the corresponding parts in the first mode of embodiment. The second locking member 322d is formed of a plate type member, and the shape thereof is substantially identical with that the above-mentioned second locking member 32d. However, a bent portion 322f1 and an elongated resilient portion 332f are provided in the second locking member 322d on the same side as the arcuate projection 32d1 is provided.

That is, the bent portion 322f1 is bent substantially perpendicularly to a side surface of the flat body of the second locking member 322d, and the resilient portion 322f2 is further bent substantially to the shape of the letter "U", the second locking member 322d being generally shaped as shown in FIG. 24. Therefore, when the second locking member 322d is disposed in the plane of the base member 32e with one side of the resilient portion 322f contacted with the inner surface of the first locking member operating unit, the second locking member 322d is urged toward the insertion direction of the first locking member operating unit 32 owing to the resilient force of the second elastic member 322f. Accordingly, the second slip-off preventing engagement portion 21c and second locking member 32d are engaged with each other by exerting a force independent of that of the first elastic member 32c on the second locking member 322d, and regulating the quantity of insertion of the headrest stay 21 into the headrest support 30.

(8) Fifth Mode of Embodiment:

Another example of the second locking member 322d-1 shown in FIGS. 25 to 36 will now be described. This first locking member operating unit 32 is provided with the second locking member 322d-1. This second locking member 322d-1 is provided with paired crescent holes 3200d of substantially analogous relation. The crescent holes 3200d (having a shape of a petal in plan) are formed so as to be engaged with paired guide pins 320a (These guide pins 320a are provided in different phases. Providing a pair of guide pins constitutes an example of the arrangement thereof, which enables a reliable and smooth movement of the second locking member 322d-1 to be made.) provided in the first locking member operating unit 32. The second locking member 322d-1 is moved substantially arcuately along a circumference of a headrest stay 21 and around the paired guide pins 320a. Referring to the drawings, a reference numeral 322*d*-2 denotes an engagement portion, with which an operating member is engaged, provided in a rear part of the second locking member 322*d*-1, and 322*d*-3 an engagement end portion of the second locking member 322*d*-1. This engagement end portion 322*d*-3 is engaged with or spaced from a second slip-off preventing engagement portion 21*c* of the headrest stay 21. The prevention of a slip-off of a headrest 20 or the removal thereof can be carried out through these engaged parts. The second locking member 322*d*-1 is provided with a second resilient member 32*f*, which is brought into contact with a curved surface portion 55 (that is, the largely curved surface portion of the inner surface R of the locking member operating unit) in the interior of the first locking member operating unit 32. Accordingly, this second resilient member 32*f* is moved along a curved surface portion 55 of the first locking member operating unit 32. This movement of the second resilient member 32*f* is made by a force of the operating member 100 provided in a hole 32*g* formed in the first locking member operating unit 32 or a releasing force, and a repellent force of the second resilient member 32*f*.

The crescent holes 3200*d* and/or guide pins 320*a* are not limited to these examples, and there are other following examples. For example, each of the crescent holes 3200*d* is provided with a linear portion 3200*d*-1 with the intention of making forward and rearward movements of the second locking member 322*d*-1 smoothly, or securing a smooth movement of the headrest stay 21. As shown in FIG. 35, a structure in which guide pins 320*a* are provided in crescent holes 3200*d* with clearances (tolerance) left therebetween so as to allow the second locking member 322*d*-1 to slidingly move around the headrest stay 21 is employed. In order to secure a reliable return of this second locking member 322*d*-1, it is possible to set an angle of a curved portion 55 as shown in FIG. 26, i.e., form a return slope (which will be described later); change (not shown) the repellent force and shape of, for example, the second resilient member 32*f*; provide other spring; and provide a stopper additionally. As shown in FIG. 27, the second locking member 322*d*-1 is formed so as to move (turn) along the curved portion 55 and secure a quantity L of return eccentricity with respect to the center of the headrest stay 21, a reliable and smooth return of the second locking member being thereby secured. The construction of the second locking member 322*d*-1 is not limited to that of the illustrated examples. A return structure utilizing a spring and a guide member (not shown) which display the same function as mentioned above can also be employed.

(9) Sixth Mode of Embodiment:

As shown in FIGS. 32, 33 and 34, a structure in which the second locking member 322*d*-1 is held in a recess 35 formed at a lower side of the first locking member operating unit 32 can also be employed. In this example, paired guide pins 320*a* are suspended from the first locking member operating unit 32, or provided in a neck portion 34. The position of a hole 32*g* may be changed.

(10) Seventh Mode of Embodiment:

As shown in FIG. 35, it is also possible to omit a first resilient member 6, substitute a second resilient member 32*f* therefor, reduce the number of parts, reduce the dimensions of a shock absorber, or attain the facilitation of the combining of the second locking member 322*d*-1 with the first locking member operating unit as shown in the examples of FIGS. 25A to 31.

(11) Eighth Mode of Embodiment:

The example of FIG. 36 is formed with the intention of facilitating a headrest stay moving operation by reversing the insertion direction of the operating member 100, adapting the structure to various types of vehicles and improving the convenience of use of the structure. The operating member 100 can serve the purpose as long as it is made of a rod, and even the equipment and materials provided on a vehicle, or the writing materials, such as a pencil and a pen can operate the headrest stay freely. FIG. 34 shows an example of a sectional view of a principal portion of the headrest stay support structure with a hole 32*h* having a tunnel-shape, instead of the hole 32*g*. The relation between the guide pins and the crescent holes A to D will be explained in FIG. 28. FIG. 28A shows an unlocked condition separating the second locking member from the second slip-off preventing engagement portion by using the operating member. FIG. 28B shows the condition where the first locking member is locked with the height regulating engagement portions and the condition of the second locking member is unlocked with the second slip-off preventing engagement portion. FIG. 28C shows a condition where the second locking member is locked with the second slip-off preventing engagement portion. FIG. 28D shows a condition where the first locking member is unlocked with the height regulating engagement portions.

(12) Ninth Mode of Embodiment

This embodiment is shown in FIG. 37, having a structure to broaden the width of crescent hole 3200*d*, inside which guide pin 320*a* is capable of moving freely without being restricted. This embodiment has such a structure to move freely that the engagement end portion 322*d*-3 of the second locking member 322*d*-1 is moved along the periphery of the headrest stay 21.

(13) Tenth Mode of Embodiment

This embodiment is shown in FIGS. 38–44. The several pieces of height regulating engagement portion 21*b* are provided on the headrest stay 21-1 (as shown in FIG. 4B), engaging or spaced with the first locking member 32*a* provided on the first locking member operating unit 32*b*-1. Such engagement or spacing allows the headrest 20 to adjust its height. Also, on the second slip-off preventing engagement portion 21*c* on the other headrest stay 21-2, the second locking member 322*d*-1 provided on the second locking member operating unit 32*b*-2 is engaged or spaced. This engagement or spacing allows the headrest 20 to be slip-off or removed. The headrest stay 21-1 has the headrest support 21-1 forming the holding hole 31*b* of the first locking member operating unit, having the first locking member 32*a* and the first locking member operating unit 32*b*-1 forming a hole through which the headrest stay 21-1 is passed. This headrest support 30-1 has the same structure as the headrest support 30 as described above. This first locking member operating unit 32*b*-1 is provided with the first locking member 32*a*. The hole 31*b* for holding the first locking member operating unit, provided on the headrest support 30-2 of the other headrest stay 21-2, has the second locking member 32*d* and the first locking member operating unit 32*b*-2 with a hole through which the headrest stay 21-2 is passed. This first locking member operating unit 32*b*-2 has the second locking member 32*d*. This headrest support 30-2 has the same structure as the headrest support as described above. Also, the first locking member operating unit 32*b*-2 has a hole 32*g*. That is, this embodiment is intended to adjust the height of the headrest 20 by providing the height regulating engagement portion 21*b* on the headrest stay 21-1, as well as to accomplish the first slip-off by the first slip-off preventing engagement portion 21a. The other headrest stay 21-2 utilizes the second slip-off preventing engagement portion 21c to accomplish the secondary slip-off and removing. Thus, this allows the spreading and cost-reduction of the headrest stay 21-1.

The present invention executes the regulation of the height of the headrest and a first slip-off preventing operation by providing the headrest stay 21 with the height regulating engagement portions 21b and first slip-off preventing engagement portion 21a, fixing the first locking member 32a to the first locking member operating unit 32 which can be moved forward and rearward by the first resilient member 32c, and engaging the first locking member 32a with one of the height regulating engagement portions 21b and slip-off preventing engagement portion 21a. Furthermore, a second slip-off preventing operation is carried out by engaging the second locking member 32d and second slip-off preventing engagement portion 21c with each other according to another mechanism. The engagement of parts during the second slip-off preventing operation can be released by using a special tool. Therefore, the pulling out of the headrest stay 21 becomes possible to be done as occasion demands while preventing an easy fall of the headrest stay 21 from the seat back 10.

The symbols used in FIG. 1 are summarized in 32a: FIRST LOCKING MEMBER; 32b: BUTTON MEMBER; 32c: FIRST RESILIENT MEMBER; 32d: SECOND LOCKING MEMBER; 32d1: PROJECTION; 32d2: HOLE; 32e: BASE MEMBER; 32e1: PROJECTION; 32e2: LOCKING MEMBER; 32f: SECOND RESILIENT MEMBER; 33: TOOL INSERTING PASSAGE; 40: SPECIAL TOOL.

The symbol used in FIG. 5 is summarized in A: INSERTION DIRECTION.

The symbols used in FIG. 8 are summarized in 21: HEADREST STAY; 21a: SECOND SLIP-OFF PREVENTING ENGAGEMENT PORTION, 22: TAPERING PORTION, 30: HEADREST SUPPORT, 32a: FIRST LOCKING MEMBER; 32b: BUTTON MEMBER; 32d: SECOND LOCKING MEMBER; 32d2: HOLE; 32f: SECOND RESILIENT MEMBER; and 33: TOOL INSERTING HOLE.

The symbol used in FIG. 22 is summarized in A: INSERTION DIRECTION.

The symbol used in FIG. 23 is summarized in A: INSERTION DIRECTION.

What is claimed is:

1. A headrest support structure for attaching a headrest to a car seat; comprising:
    a headrest;
    a headrest stay vertically and downwardly projecting from the headrest, the headrest stay having an outer circumferential surface;
    a height regulating engagement portion formed on the circumference surface of the headrest stay;
    a first slip-off preventing engagement portion formed below the height regulating engagement portion;
    a tubular member for engaging the headrest stay, wherein the tubular member is vertically provided in the car seat,
    a first locking member operating unit provided on the upper end of the tubular member;
    a first elastic member for forcing the first locking member toward the headrest stay, for engaging the height regulating engagement portion or the first slip-off preventing engagement portion, wherein by an pushing operation from the outside, the first locking member is moved back to release the height regulating engagement portion or the first slip-off preventing engagement portion;
    a second locking member operating unit, comprising:
        a second slip-off preventing engagement portion provided on the headrest stay and/or the tubular member,
        a second locking member engaged with the second slip-off preventing engagement portion;
        a second elastic member for forcing the second locking member toward the second slip-off preventing engagement portion; and
        an engagement releasing mechanism for releasing the second locking member from the second slip-off preventing engagement portion.

2. A headrest support structure according to claim 1, wherein the second locking member is supported in a manner to be slid substantially in the direction in which the first locking member operating unit is slid; and the second locking member is forced in the direction toward the headrest stay by the second elastic member.

3. A headrest support structure according to claim 2, wherein the engagement releasing mechanism is provided with an insertion hole, formed between the second locking member and the tubular member,
    and wherein an elongated member having a tip is inserted through the insertion hole to engage the tip with the second elastic member and/or the second locking member, so as to release the second locking member from the second slip-off preventing engagement portion.

4. A headrest support structure according to claim 2, wherein the headrest stay has a lower end portion with a tapered portion for pushing the second locking member when the headrest stay is inserted into the tubular member, thereby retracting the second locking member from the inside surface of the tuber member.

5. A headrest support structure according to claim 1, wherein the headrest stay is of a cylindrical member,
    wherein the second slip-off preventing engagement portion comprises an engagement hole provided in a circumferential wall of the cylindrical member, and an engagement portion provided in an inner circumference of the cylindrical member such that the engagement portion faces the engagement hole when the headrest stay is positioned in a predetermined height, wherein the second locking member is made of a flexible member, fitted in the interior of the cylindrical member as the second locking member is bent, and capable of being engaged with the engagement portion provided in an inner circumference of the cylindrical member with a part of the second locking member inserted through the engagement hole provided in the circumferential wall of the cylindrical member.

6. A headrest support structure according to claim 5, wherein the engagement releasing mechanism is provided with an insertion hole formed in the circumferential wall of the headrest stay, wherein a rod member bent at substantially right angles is inserted through the insertion hole, such that a free end of the rod member press the second locking member inside the headrest stay.

7. A headrest support structure according to claim 6, wherein the headrest stay is provided with a second engagement hole below the engagement hole, and wherein the second locking member is released from the engagement hole, before the second locking member is engaged with the second engagement hole, so as to prevent the second locking member from being dropped down.

8. A headrest support structure according to claim 5, wherein the headrest stay is provided with a second engagement hole below the engagement hole, and wherein the second locking member is released from the engagement hole, before the second locking member is engaged with the second engagement hole, so as to prevent the second locking member from being dropped down.

\* \* \* \* \*